(12) United States Patent
Kalenychenko et al.

(10) Patent No.: US 11,656,191 B2
(45) Date of Patent: May 23, 2023

(54) SYSTEM AND METHOD FOR NON-IONIZING NON-DESTRUCTIVE DETECTION OF STRUCTURAL DEFECTS IN MATERIALS

(71) Applicants: Oleksandr Hryhorovych Kalenychenko, Kyiv (UA); Yurii Oleksandrovych Kalenychenko, Kyiv (UA); Olena Oleksandrivna Rembach, Kyiv (UA)

(72) Inventors: Oleksandr Hryhorovych Kalenychenko, Kyiv (UA); Yurii Oleksandrovych Kalenychenko, Kyiv (UA); Olena Oleksandrivna Rembach, Kyiv (UA)

( * ) Notice: Subject to any disclaimer, the term of this patent is extended or adjusted under 35 U.S.C. 154(b) by 200 days.

(21) Appl. No.: 16/820,632

(22) Filed: Mar. 16, 2020

(65) Prior Publication Data
US 2020/0278308 A1   Sep. 3, 2020

Related U.S. Application Data

(63) Continuation-in-part of application No. 16/716,199, filed on Dec. 16, 2019, now abandoned, which is a continuation-in-part of application No. PCT/UA2018/000024, filed on Mar. 23, 2018.

(30) Foreign Application Priority Data

Jun. 16, 2017  (UA) .................... 2017006107

(51) Int. Cl.
*G01N 23/2273* (2018.01)
*G01V 3/10* (2006.01)

(52) U.S. Cl.
CPC ......... *G01N 23/2273* (2013.01); *G01V 3/107* (2013.01)

(58) Field of Classification Search
CPC ........................ G01N 23/2273; G01V 3/107
See application file for complete search history.

(56) References Cited

U.S. PATENT DOCUMENTS

| 3,872,380 A | 3/1975 | Gardiner |
| 7,231,320 B2 | 6/2007 | Papadimitriou et al. |
| 7,635,842 B2 | 12/2009 | Nasser-Ghodsi et al. |
| 2018/0024064 A1* | 1/2018 | Ho .................. G01N 21/636 250/459.1 |

FOREIGN PATENT DOCUMENTS

WO   WO-2016148657 A1 *  9/2016   ......... G01N 21/6486

* cited by examiner

*Primary Examiner* — Walter L Lindsay, Jr.
*Assistant Examiner* — Milton Gonzalez
(74) *Attorney, Agent, or Firm* — Galvin Patent Law LLC; Brian R. Galvin

(57) ABSTRACT

A means to enable the inspection of industrial materials in order to see hidden structural defects that can lead to an early failure, using electromagnetic fields and harmonic waves.

4 Claims, 28 Drawing Sheets

| Frequency, Hz | 50 | 150 | 250 |
|---|---|---|---|
| Lissajous figure at the input of the analyzer 3 |  |  |  |
| Lissajous figure at the output of the analyzer 3 |  |  |  |
| Phase shift | 90° | 90° | 180° |

SYSTEM AND METHOD FOR NON-IONIZING NON-DESTRUCTIVE DETECTION OF STRUCTURAL DEFECTS IN MATERIALS

CROSS-REFERENCE TO RELATED APPLICATIONS

| Application No. | Date Filed | Title |
| --- | --- | --- |
| Current application | Herewith | SYSTEM AND METHOD FOR NON-IONIZING NONDESTRUCTIVE DETECTION OF STRUCTURAL DEFECTS IN MATERIALS Is a continuation-in-part of: |
| 16,716,199 | Dec. 16, 2019 | SYSTEM AND METHOD FOR NON-IONIZING NON-DESTRUCTIVE DETECTION OF STRUCTURAL DEFECTS IN MATERIALS which a continuation-in-part of: |
| PCT/UA2018/000024 | Mar. 23, 2018 | SYSTEM AND METHOD FOR DETERMINING THE STRUCTURE OF ELECTROMAGNETIC FIELD AND OBJECT MATERIAL which is a PGP filing of and claims priority to: |
| UA2017006107A | Jun. 16, 2017 | System and Method for Non-Ionizing Non-Destructive Detection of Structural Defects in Materials | the entire specification of each of which is incorporated herein by reference.

BACKGROUND

Field of the Art

The disclosure relates to the field of materials science, and more particularly to the field of determining the effects of materials and their structure.

Discussion of the State of the Art

In many areas of daily life inspection of materials, especially non-destructive, is sought after as a good way to find out if an item's structure is compromised or not. X-Rays have been used now for over 100 years, but potentially have certain health side effects, limiting their usability in the field. Ultrasound has been available for about 50 years, but often requires creams or pastes to connect, which in turn requires a cleanup afterward, and may have other limitations.

What is needed is a system and method that allows the inspection of industrial materials in order to see hidden structural defects that can lead to an early failure. In some systems, such a failure may lead to death and destruction, foremost in airplane and engine parts, but not exclusively.

SUMMARY

Accordingly, a system for determining the effects of materials and their structure using electromagnetic fields and harmonic waves is needed. Said system comprises a power supply unit, at least one electromagnetic transducer, an electric wave generator (for feeding said transducer), a harmonic frequency analyzer (for measuring amplitude and phase of one or more harmonic waves reflected by the material being tested), and a control unit (that adjusts both power and frequency generated and sent into the transducer to match the preferred characteristics of the material being tested). The phase of some of the harmonics will show different phase shifts based on structural faults in the material being tested in the section between the transducer input and output couplings. A lookup table is used to facilitate a fast measurement of phase and frequency data of said harmonics. Based on a predefined table for different materials, only a small range of possible power and frequency is tested based on knowledge of the type of material being tested. The phase shift at specific harmonics is then compared to a known good sample and a very quick good/no-good determination can be made.

A group of inventions is referred to the electromagnetic analysis methods of the structure of the electromagnetic field and the material and may be widely used in various fields of science and technology, for example, for analysis of material magnetic properties, analysis of the field structure in complex electrodynamic systems in the field of non-destructive testing of physical and mechanical properties of materials, namely, in the field of magnetic measurements and eddy-current testing of materials of engines, turbines, vehicles and others, objects of diagnostics of technical state of metal structures in operation, for magnetic materials testing, measuring of magnetic induction of grain-oriented electrical steel in eddy-current testing, etc.

Electromagnetic structuroscopic devices with encircling coil included in bridge or differential schemes are known from the state of art. Similar testing and experimental devices may be assembled from usual standard measuring apparatus. The functions of singular device nodes are as follows:

"Exciting magnetic field of the winding of coil is supplied by current of industrial frequency from the regulating autotransformer through a condenser and an ammeter. The signal withdrawn from the counter windings of coils of the sensor is balanced by compensators in phase and amplitude, amplified by amplifier and applied to the vertical deflection plates of electronic tube. A sawtooth voltage is applied to the horizontal deflection plates of electronic tube. The generator of this voltage is activated by the spike pulse produced from the signal of industrial frequency" [1, p. 105].

The drawbacks of structuroscopes is that the structure of product is estimated by displacement and curvature of the sinusoid on the oscilloscope screen.

Device for measuring amplitudes and phases of harmonic of measured signal, which is assembled from structuroscope and harmonic analyzer or selective amplifier is also known.

" . . . Behaviour of amplitude and phases of harmonic of the signal depends on the terms of elements magnetization. This effect can be observed at structuroscopes . . . , for which the harmonic analyzer is connected to the device through the filter . . . or a selective amplifier . . . . With this installation . . . attempts to relate harmonic amplitude with changes of grain size, development of cementite particles, non-magnetic impregnations were made. Specific ratios between the amplitudes of the harmonic were used for high-chromium steel" [1, p. 105].

The drawbacks of the device: "Decoding of electromagnetic structuroscope readings is complicated by the fact that according to the magnetic characteristics of the materials determined in constant electromagnetic field it is impossible to count magnetic parameters in full and, accordingly, to predict their behavior in alternating electromagnetic fields" [1, p. 106].

Device known from the state of art is described in the U.S. Pat. No. 4,058,762 (filing date of patent application Jun. 6, 1976, IPC G01N27/84, G01N27/72, G01N27/83), for magnetic inspection of areas of interest in ferromagnetic material by means of both alternating and direct current induced magnetic fields. The drawbacks is that the device does not allow to determine the connection between magnetic fields and electronic structure of crystal lattice.

Device for nondestructively inspecting elongated objects for structural defects, described in the U.S. Pat. No. 5,414,353 (filing date of patent application May 14, 1993, IPC G01N27/82, G01N27/90) is also known. The drawbacks is a limited use of the device: only for testing elongated objects.

Electromagnetic structuroscope, which is known from the state of art (authorship certificate SU No 894545, IPC G01N27/90, date of publication Dec. 30, 1981), contains series-connected generators, eddy-current transducer, selective amplifier of the third harmonic of generator, and phase detector connected with its reference input through the reference voltage producing unit with the output of generator and with signal input with selective amplifier output, summator connected by its inputs with the corresponding outputs of phase detectors, and by its outputs with recorder. The drawbacks of this device is the limitation: determination of material structure may be carried out only by the third harmonic—the use of other harmonics for such determination is impossible.

Electromagnetic structuroscope for determining physical and mechanical properties of ferromagnetic objects, which is known from the state of art (invention application RU No 94023276, IPC G01N27/90, date of publication Jun. 6, 1996) contains generator of harmonic voltage, two electromagnetic transducers, compensator, signal processing unit, scaling amplifier and indicator, in which excitation windings of electromagnetic transducers are connected in series and linked up to the generator, and the measurement windings are connected in series and counter-currently, which is different in that to allow a possibility of testing the structure of the large-sized objects and objects with a flat surface, electromagnetic transducers are provided with C-like cores with different inter-pole distances, the cores have strong connection with each other, and their working ends lies in one plane, signal processing unit is made in form of two amplitude detector, square-law generator, calculator of voltage ratio, which is linked up with the input of divided to the output of the first amplitude detector, with the input of divider through square-law generator to the output of the first amplitude detector and with the input through the series-connected compensator and the scaling amplifier to the indicator, first amplitude detector is linked up to the output of the differentially-included measurement windings, and the second amplitude detector to the output of one of the measurement windings.

The drawbacks of this device is that the decoding of voltage being measured is not performed by frequency spectrum (harmonic) and the phase of spectrum components, as a result of which this device has limitations in the determining physical and mechanical parameters of ferromagnetic objects.

The closest analogue to the first present technical decision is the device for measuring coercivity of magnetic materials (Patent RU No 2186381, IPC G01N27/72, G01R33/12, date of publication Jul. 27, 2002), which contains series-connected source of magnetizing current, first commutator and electromagnet with field of sensor, series-connected second switch and analog-to-digital transducer, first and second comparators, reference voltage source, current generator, controllable power amplifier, control unit and indicator connected properly. Device is supplemented with series-connected third commutator, current-to-voltage transducer and first amplifier, series-connected second amplifier, circuit with controllable time constant and third amplifier, and also series-connected fourth amplifier, third comparator and delay line. These three groups of components are placed in proper manner in scheme of device.

The drawbacks of the known device is the impossibility of measuring electronic structure of crystal lattice and, accordingly, greater spectrum of physical and mechanical parameters.

Known methods of determining the intensity or force of electric current of electromagnetic field at each point of space by the vector of magnetic induction B: "Force interaction and electromagnetic induction are fundamental developments of magnetic field and may be the basis for determining physical magnitude, which is characterized by intensity or force at each point of space".

The number of magnetic flux density lines, which is "passing through a certain surface, characterizes the value of magnetic flux. The number of lines related to unit of surface area, obviously, will characterize magnetic flux density value. In other words, magnitude B may be considered as the density of magnetic flux" [2, p. 5].

These methods do not determine number of spectral lines in electromagnetic spectrum and spectral line structure.

There are many methods of analyzing the structure of electromagnetic field by measuring two magnitudes E and H depending on space and time. Strength of electric component E of electromagnetic field is measured by electric probe, and magnetic probes or probes of an inductive type are used to measure strength of magnetic component H of electromagnetic waves.

The drawbacks of known methods is that discrete structure of electromagnetic field cannot be determined by strength E and H.

A known method for determining the change in photons frequency after elastic collision with electrons, which is about a monochromatic X-ray radiation with a wavelength $\lambda$ is directed to a scattering target substance (graphite, aluminum) and spectral separation of the intensity of scattered radiation at different scattering angles $\vartheta$ is measured, and then wave deflection $\Delta\lambda$ of scattered radiation is determined by Compton formula:

$$\Delta\lambda = \lambda' - \lambda = \lambda_0(1 - \cos\vartheta)$$

Here $\lambda'$—is wavelength of scattered radiation.

$\lambda_0 = h/m_0 c = 2.426 \cdot 10^{-10}$ cm $\approx 0.024$ Å—is so-called Compton wavelength of electron. It follows from Compton formula that deflection $\Delta\lambda$, . . . is determined only by the scattering angle of photon $\vartheta''$ [3, p. 231].

The drawbacks of the method are as follows: 1) frequency of the photons wave bombarding the target and the photons producing scattering radiation are not determined; 2) the method is not used for determining length of deflection (frequency changes) of the photons wave, which form the low-frequency spectrum of electromagnetic waves.

A well-known method for determining combination n of electromagnetic plane waves (intensity), each of which is corresponded with its wave vector and its polarization state, and which are equivalent to combination of non-interacting photons whose energy levels are determined by the ratio $E = nh\nu$ (h—Planck constant, $\nu$—photons frequency), which is about this photons combination is used to irradiate a plate (photocathode) and measure electric current (photocurrent)

of saturation in the circuit $I_s=eN_eS$ (e—electron charge, $N_e$—number of electrons leaving the metal, S—surface area of cathode), and then by magnitude of current saturation a conclusion on the intensity of photons flux, based on the second law of the photo-effect is made: "at the fixed frequency of incident light, the force of the photocurrent (that is, the total number of electrons leaving the metal in 1 second) is proportional to the intensity of light flux" [3, p. 454].

However, this method does not determine number n of photons, which produce spectra of electromagnetic field, and structure of photons wave.

A known method for analyzing the domain structure and hysteresis loops of thin ferromagnetic films on a magneto-optical device using the Kerr effect. "When reflecting a plane-polarized light from a magnetized mirror (a ferromagnetic film), polarization surface area is rotated to a certain angle $\varphi=kJd$, where k—Kundt constant, J—magnetization of matter, d—thickness of the mirror coating on which the polarized light falls. This phenomenon is called as Kerr effect. Rotation direction of polarization surface area on the direction of magnetization of ferromagnetic mirror, which allows using this effect to observe the domain structure of ferromagnetic samples.

In the process of remagnetization of such a sample, it may appear that the magnetization vectors of two neighboring domains are antiparallel. Then the rotation of surface area of polarization of light beams reflected from domains with different magnetization directions will occur in mutually antithetic directions. By placing the analyzer in the trace of the reflected light beams, it is possible to observe domain structure of sample in the form of dark and bright areas. Such method of analyzing the domain structure of ferromagnetic sample allows not only to investigate the process of remagnetization, but also to measure with the use of a photomultiplier such magnetic characteristics of thin-film samples as a field of coercivity and a field of magnetic anisotropy.

. . . A field which is necessary in order to transfer sample from the state of residual magnetization to a demagnetized state is generally called as a field of coercivity ($H_c$) of ferromagnetic sample.

The field required for rotation of magnetization vector from the position parallel to the easy magnetization axis to the position parallel to the hard magnetization axis is called as a field of anisotropy ($H_h$)" [4, p. 120-121].

The method has limitations in its applying—only magnetic characteristics specially prepared for thin-film samples, the domain structure of which is represented in the form of dark and light areas, may be measured.

Method for local measuring coercivity of ferromagnetic objects involves magnetization of the object followed by its demagnetization, measuring magnetic field strength and tangential component of magnetic field is known (Patent RU No 2483301, IPC G01N27/72 (2006), date of publication May 27, 2013).

The drawbacks of this method is the fact that, while magnetization and demagnetization of the object, the magnetic field which represents the process of irreversible displacement of transient layers between domains (Bloch walls), can not be measured. Therefore, the method has limited use only for testing products whose physical and mechanical characteristics have a connection with the coercivity or magnetization of the object material.

Method of estimating bending stresses in element of structure in operating state, which is made of a homogeneous ferromagnetic material and has a symmetrical cross section geometric shape is known (invention patent RU No 2590224, IPC G01N27/72 (2006), date of publication Jul. 10, 2016).

At the tested section of sample (analogue) of element (or at the operating element) in case of the absence of external bending force and with application of external bending force (within limits of element elastic properties) magnetization is performed each time in purpose of producing symmetric magnetic field relatively to axle (axes) of symmetry of geometric shape of element cross section; magnitude of magnetic field induction is measured in characteristic points on boundaries of element cross sections, symmetrical to each other relativly to axle (axes) of symmetry of element cross sections; mean difference of absolute magnitudes of magnetic flux density is determined in characteristic points at tested section; then analytical dependency is found at the tested section of the sample (analogue) of element (or at the operating element) by experimental dependency of bending force (or mean intensity in material) from mean difference of absolute values of magnetic flux density in characteristic points; at the tested section of structural element in operating state, symmetric magnetic field relatively to geometrical figure section element is produced, magnitude of magnetic field induction is measured in specific points of sections, average absolute difference values of magnetic flux density is determined in analogous characteristic points and at earlier obtained analytical dependency, mean estimated value of stress in material at the tested element section in operating structure is found.

The drawbacks of this method is its complexity, measuring only one physical magnitude—magnetic flux density, which characterizes ferromagnets. As a result, the method is applicable only for testing products whose physical and mechanical characteristics have a connection with magnetic flux density.

Known methods of spectroscopy: determination of structure of electromagnetic field and material "by measuring the position, intensity and width of spectral lines, as well as by observing changes in the spectrum arising from the action of electric and magnetic fields and other external influences, for example, temperature, or during moving of the sample as a whole. These data allow to reproduce the picture of quantum transitions between energy levels and structure of quantum system levels (atom, molecule, crystal). When system passing from the energy level $\varepsilon_k$ to level $\varepsilon_l$, electromagnetic radiation with frequency $$v_{kl} = \frac{1}{h}(\varepsilon_k - \varepsilon_l),$$

where h—Planck constant, is radiated or absorbed" [3, p. 386].

It is impossible to determine at what energy level electrons are present at the moment of photon radiation or absorption by applying of this method.

A known method for subsurface flaw defect in ferromagnetic objects (invention patent RU No 2442151, IPC G01N27/90, date of publication Feb. 10, 2012), includes magnetization of tested object with a magnetization system, eddy currents are incited with the eddy-current transducer, the surface of tested object is scanned, and while scanning the change of parameters induced into the eddy-current transducer is registered. Furthermore, according to the invention, the eddy currents frequency is selected on the basis of their penetration into the thin surface layer of the tested object, at least one component ΔB of the magnetic flux induction is measured, and presence of subsurface flaw defect is determined by combining the received change infomation $\Delta U_{in}$ and ΔB.

The drawbacks of known method is that the combination of received changes $\Delta U_{in}$ and ΔB does not provide susceptibility and informativeness potentially achievable in the eddy-current and magnetic method of defectoscopy.

A known method for "observing individual quantums of magnetic flux $\Phi_0=h/2e$, where $\Phi_0$—quantum of magnetic flux is equal to $2.07 \cdot 10^{-15}$ Wb"; h—Planck constant; e—electron charge, by measuring the period of Josephson current, which is that in the circle of a material in superconducting state, which has two weak links—Josephson nodes (Clarke type transducer), they excite electrons, which produce a current. "When passing through current nodes l larger than a certain current $l_m$ (Josephson current), weak superconductivity is destroyed, and a voltage drop u appears on the transition. When a pair of electrons transits through the barrier with a potential, the additional energy acquired by electron is radiated in the form of photons with energy $\hbar\omega=2eu$, that is, current of high frequency $i=I_m \sin \omega t$ (so-called non-stationary Josephson effect) and a certain DC flow through the transition . . . . One period of AC is equal to the quantum of magnetic flux $\Phi_0$. While calculating the number of AC periods, it is possible thereby to determine the growth of the magnetic flux (or induction) in the superconductive annulus cross section" [2, p. 19].

The drawbacks of this method is that individual energy quanta hv—that is photons, producing the structure of electromagnetic field, are not observed.

The applicant did not find the closest technical solution in its technical essence to the present method, the determination of the structure of electromagnetic field and the material of analyzed object from the state of art.

The object of the present invention is creation of a system for determining the structure of electromagnetic field and the object material and the method for determining structure of electromagnetic field and material using said system, in which, due to the proposed elements, their interconnections and technical solutions, increasing of accuracy and integrity of the results of measuring electronic structure of the crystal lattice, which determines the physical and mechanical parameters of objects, is provided, ability of measuring magnetic characteristics of analyzed object materials, which are determined in constant fields, is performed in constant electromagnetic field, band expansion of physical magnitudes being measured, by which frequency and polarization of the photons, number of spectral lines of electromagnetic field, number of photons forming spectral lines per unit time is determined.

This object is solved through the use of present system for determining the structure of the electromagnetic field and the object material containing power supply unit, electromagnetic transducer, which are connected in series; harmonic frequency analyzers; measuring instruments, and additionally containing comparator unit, measurement unit, manipulator connected with electromagnetic transducer, second and third harmonic frequency analyzers, power supply unit, comparator unit, and measurement unit, while comparator unit is connected with power supply unit, wherein power supply unit contains:

the first voltage generator, the first harmonic frequency analyzer, voltage regulator, power amplifier, the first ampere meter, which are designed to produce and measure AC in circuit of the magnetizing winding of the electromagnetic transducer;

DC power supply and the second ampere meter, which are designed to produce and measure DC in circuit of the magnetizing winding of the electromagnetic transducer and in the second voltage generator;

and phase shifter designed to measure the phase of photons of electromagnetic spectrum by measuring the phase of reference voltage supplied from the second voltage generator through the third harmonic frequency analyzer and selector switch of the manipulator to input of the comparator unit.

Moreover, the system further includes a device for analysis of material samples containing energy transducers connected in series, which are connected to the unit of regulated power supplies of DC and AC through a band-stop filter for higher-order harmonics in the AC circuit and DC and AC measuring unit, wherein flip coil with the sample being analyzed is located between the energy transducers.

This object is solved through the use of present method for determining the structure of the electromagnetic field and the object material wherein the quantum system of the analyzed material, is excited, physical magnitudes characterizing properties of excitation source and the electromagnetic field of radiating source are measured, and according to the observed connections, dependencies and relations between them, photons are isolated from the electromagnetic waves and their wavelike structure within the calibration length in the interval of the calibration time, photons frequency, photons polarization, number of spectral lines of the electromagnetic field, number of photons forming spectral lines per unit time, and regularity of the relations between the structure of the electromagnetic field and the structure of the quantum system is determined: atom, atomic nucleus, molecule, crystal:

energy level, on which elementary particles exist in the quantum system and radiate photons, is determined by photons frequency;

the number of excited elementary particles in the quantum system is determined by number of spectral lines;

spatial position of the orbits of the elementary particles in the quantum system and the connection between this state and its structure are determined by photons polarization (phase);

residual induction representing the number of electrons that overcame the energy barrier is determined by the magnitude of magnetic flux density of the electromagnetic field of radiation measured at the moment of the end of abrupt change of photons phase forming this radiation;

the coercivity is determined by the magnitude of electron excitation energy, which is measured at the moment of the end of abrupt change of photons phase radiated by excited electrons that overcame the energy barrier;

the structure of the analyzed material is determined by analyzing the results of all measurements and definitions.

In present method amplitude, frequency, phase of the voltage spectrum, which is induced by the electromagnetic field of the radiating source, are measured, and the structure of oscillation of the photon wave within the limits of the calibration length and in the interval of the calibration time, photons frequency, photons polarization, number of spectral lines of the electromagnetic field, number of photons forming spectral lines per unit time are determined with the following ratio:

$$u_s = \sum_n U_{mn} \sin\left(\frac{2\pi t_0}{T_n} + \alpha_n\right) =$$

-continued $$\sum_n k_U n_{Bn} \Phi_0 f v_n \sin(n\pi + \alpha_n) = = \frac{k_U n_{B1} f h v_1}{2e} \sin(\pi + \alpha_1) + \frac{k_U n_{B2} f h v_2}{2e}$$

$$\sin(2\pi + \alpha_2) + + \frac{k_U n_{B3} f h v_3}{2e} \sin(3\pi + \alpha_3) + \ldots + \frac{k_U n_{Bn} f h v_n}{2e} \sin(n\pi + \alpha_n),$$

here:

$$U_{mn} \sin\left(\frac{2\pi t_0}{T_n} + \alpha_n\right)$$ – the expression characterizing voltage oscillation within scaled calibration length and scaled calibration time, where $u_s$—voltage spectrum induced in measurement winding by spectrum of electromagnetic radiation;

$U_{mn}$—voltage amplitude of the n-th harmonic;

$(n\pi+\alpha_n)$—phase of the wave of an individual photon of the n-th harmonic;

$\pi$—argument of trigonometric function expressed in radians: $\pi$ rad=180°;

$t_0$—calibration time of Planck scale equals to the time of production of amplitude of the photon wave of the first harmonic $t_0=\frac{1}{2} T_0$;

$$\frac{2t_0}{T_n} = \frac{t_0}{\frac{1}{2}T_n} = \frac{t_0}{t_n} = n = 1, 2, 3, \ldots$$

—frequency of division of the calibration time value $t_0$ into a finite number of time intervals $t_n=\frac{1}{2} T_n$, during which the phase of harmonic oscillations varies by $\pi$;

$T_n$—period of the harmonic oscillations within the calibration length of the photon wave which form n-th harmonic;

$k_U$—dimensionless numeral coefficient, which correlates number of spectral lines reflected in voltage and magnetic flux density;

$n_{Bn}$—number of spectral lines of the n-th harmonic;

f—frequency of excitation of elementary particles of the quantum system radiating photons;

h—Planck constant;

e—elementary charge;

$\Phi_0$—quantum of magnetic flux;

$v_n$—frequency of photon of the n-th harmonic;

$\alpha_n$—initial phase of the photon wave.

In the context of this description, any solid, liquid and gaseous substances or mediums are considered to be "material", of which analyzed object is manufactured, and in the specific examples of invention embodiment, material of analyzed object is specified.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
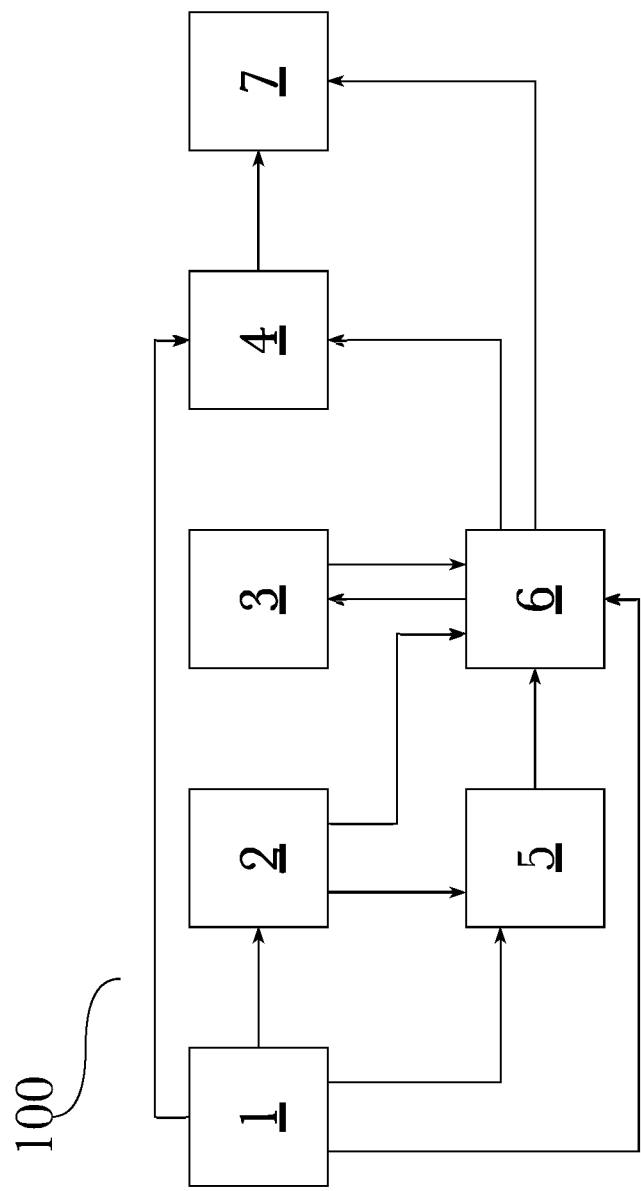
FIG. 1 shows overview of a functional scheme of present system.

The inventor has conceived, and reduced to practice, a new design for an invertible container for display and dispensing of product, that uses a lid with a raised surface or solid plug that aligns with the interior of the container neck, such that when closed the lid forms a flat surface with the interior of the container and no product is permitted to enter the neck of the container where it would be obscured from view.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Figure 2A:
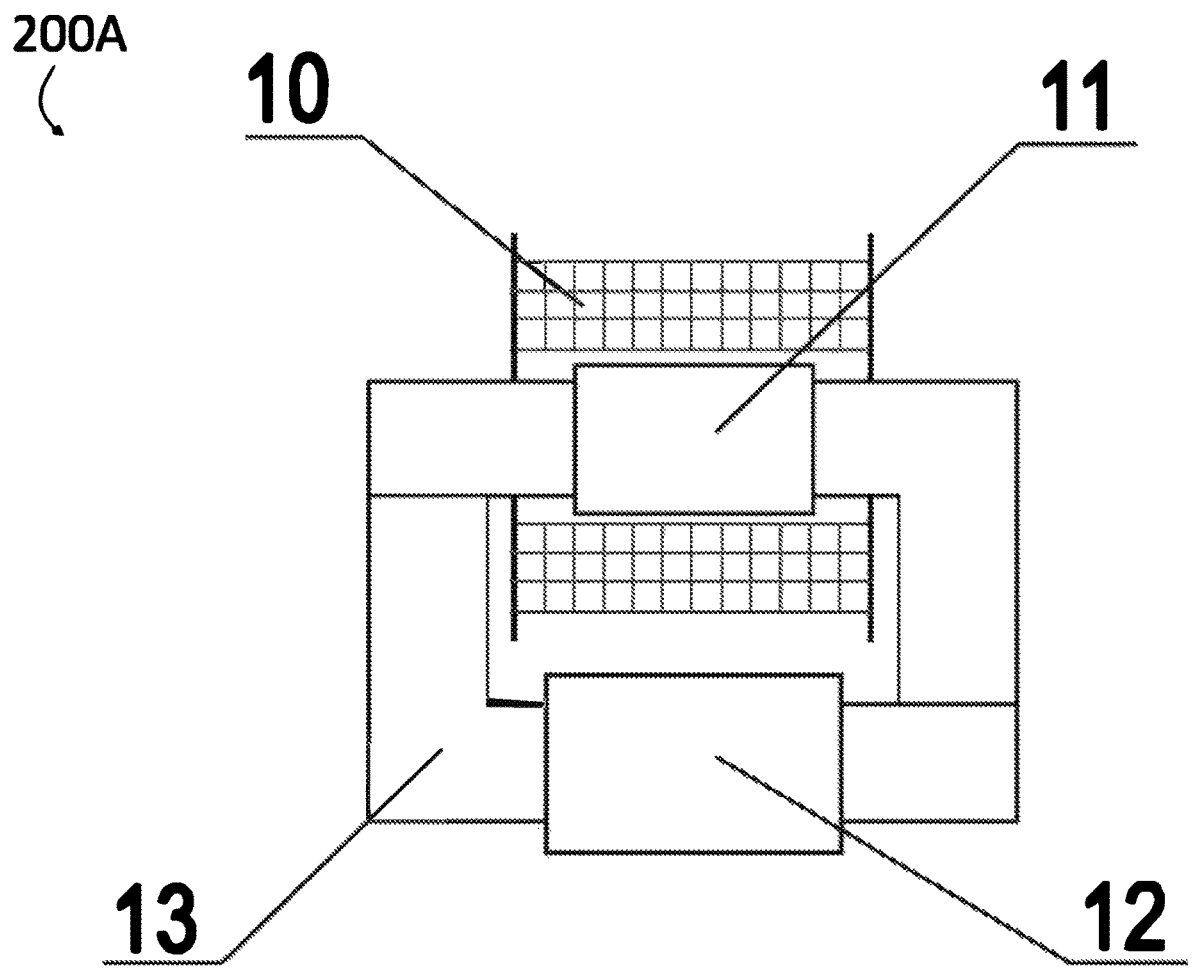
FIG. 2A shows overview of a schematic of an electromagnetic transducer.
Figure 2B:
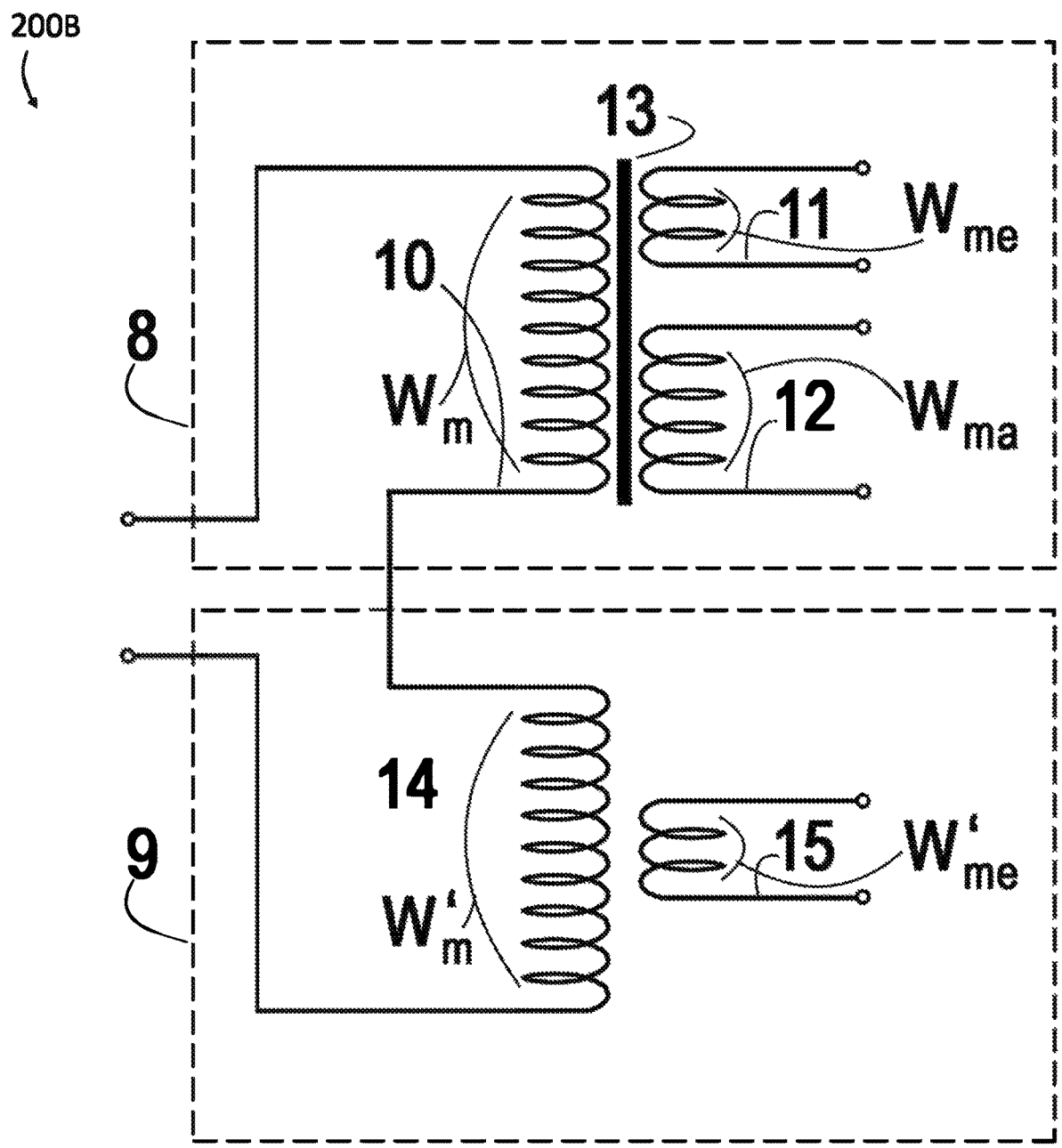
FIG. 2B shows overview of a schematic of an electromagnetic transducer.
Figure 3:
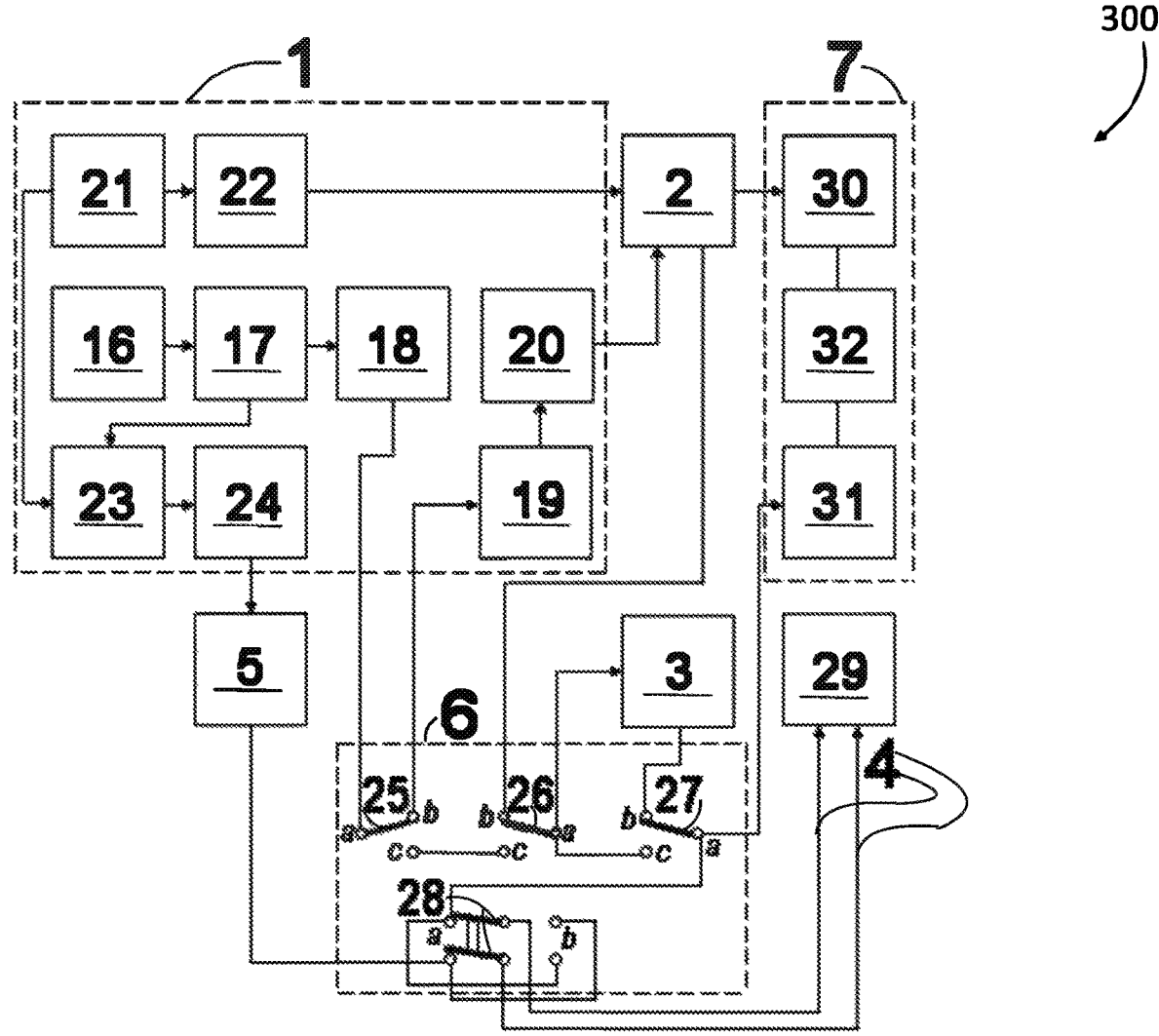
FIG. 3 shows overview of a design-functional scheme of present system.
Figure 4:
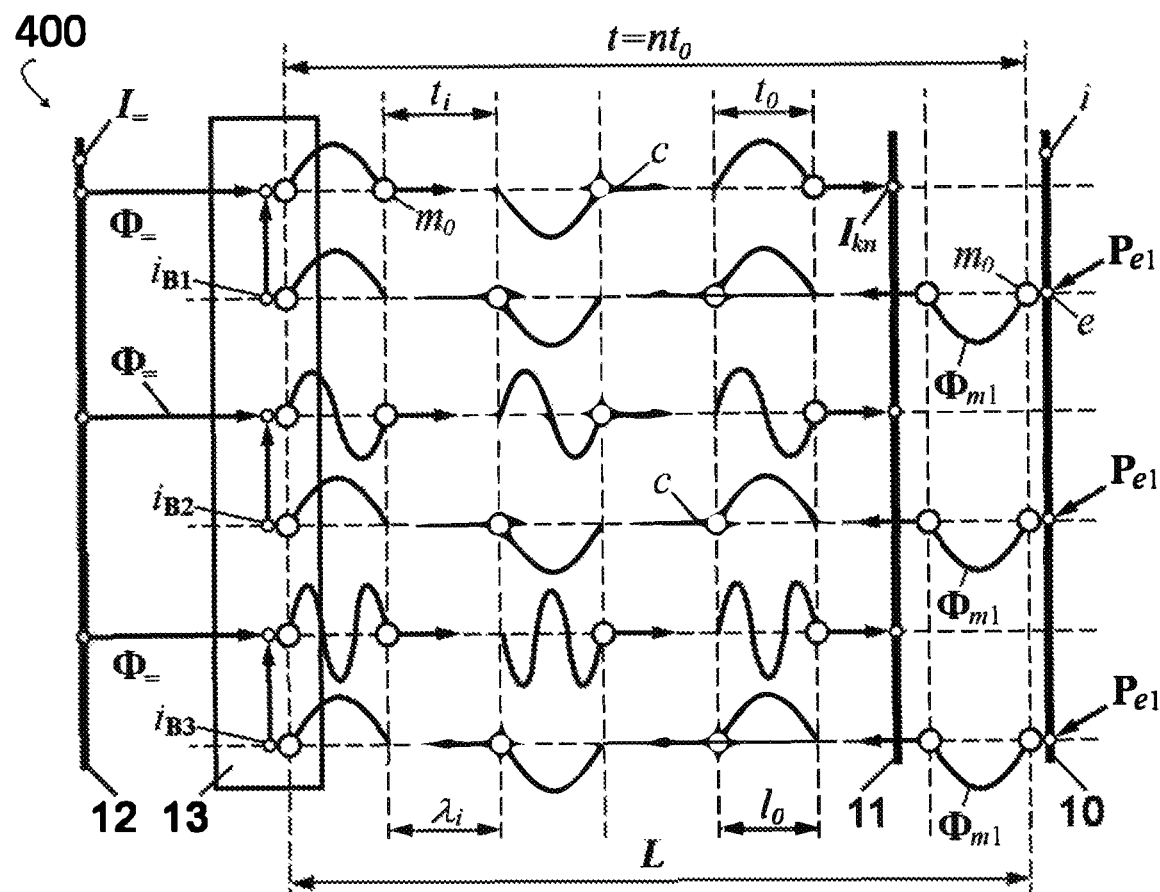
FIG. 4 shows overview of a space-time structure of crystal lattice system—electromagnetic field, produced by electromagnetic transducer.
Figure 5A:
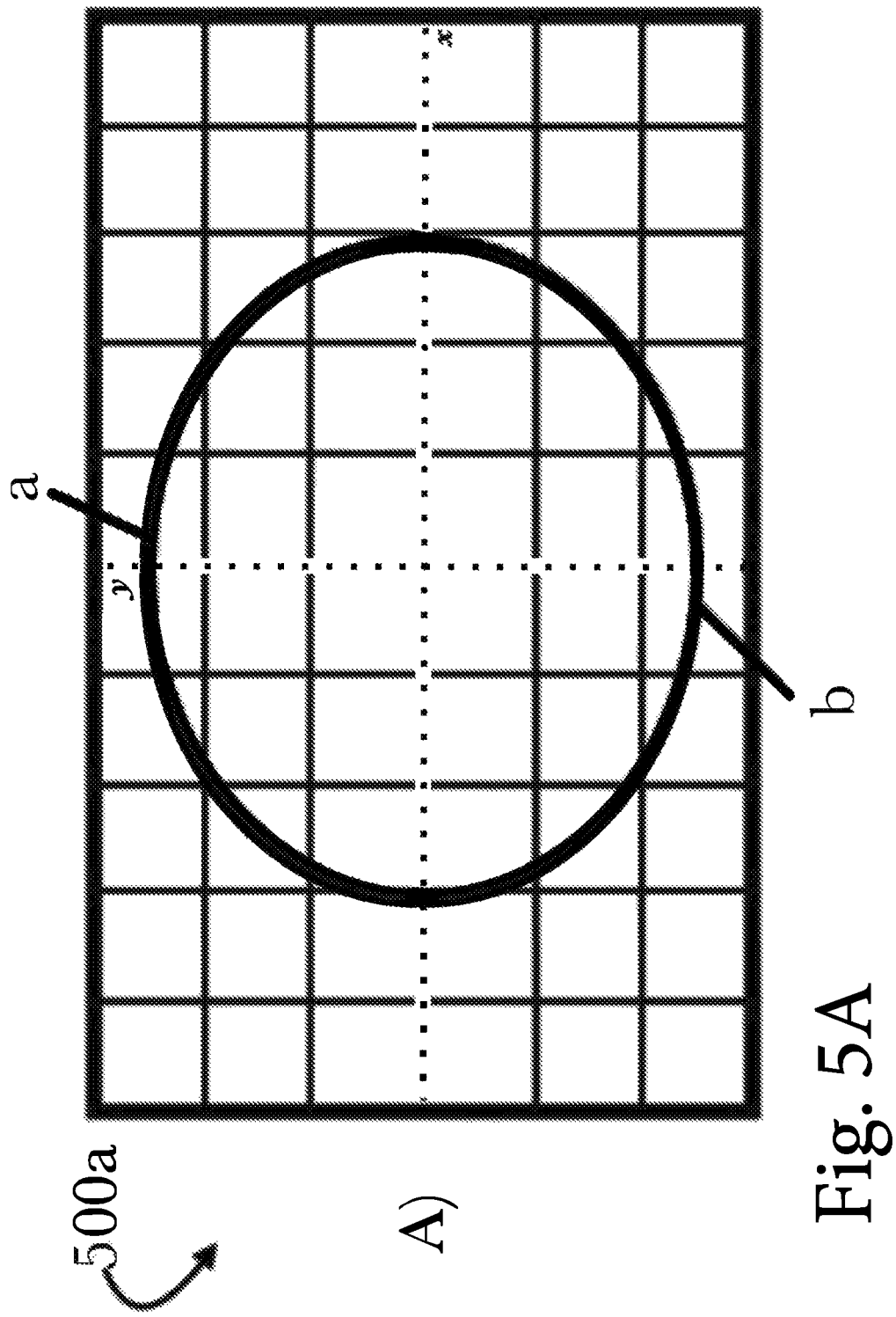
FIG. 5A shows overview of an oscillogram of the scaled photon waves of first harmonic photon, an oscillogram of the scaled photon waves of second harmonic, and an oscillogram of the scaled photon waves of third harmonic is shown in FIG. 5C.
Figure 5B:
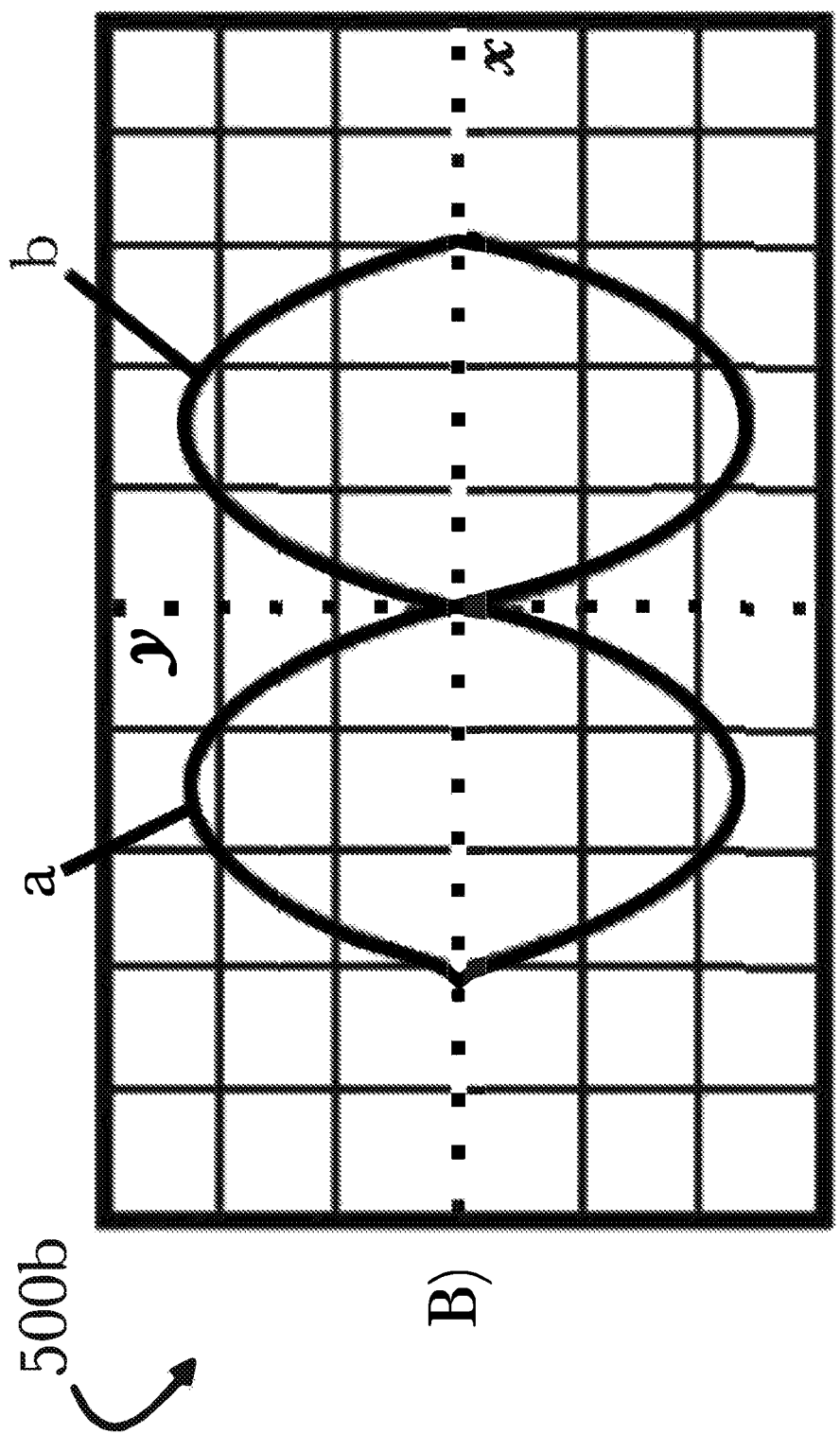
FIG. 5B shows overview of an oscillogram of the scaled photon waves of second harmonic.
Figure 5C:
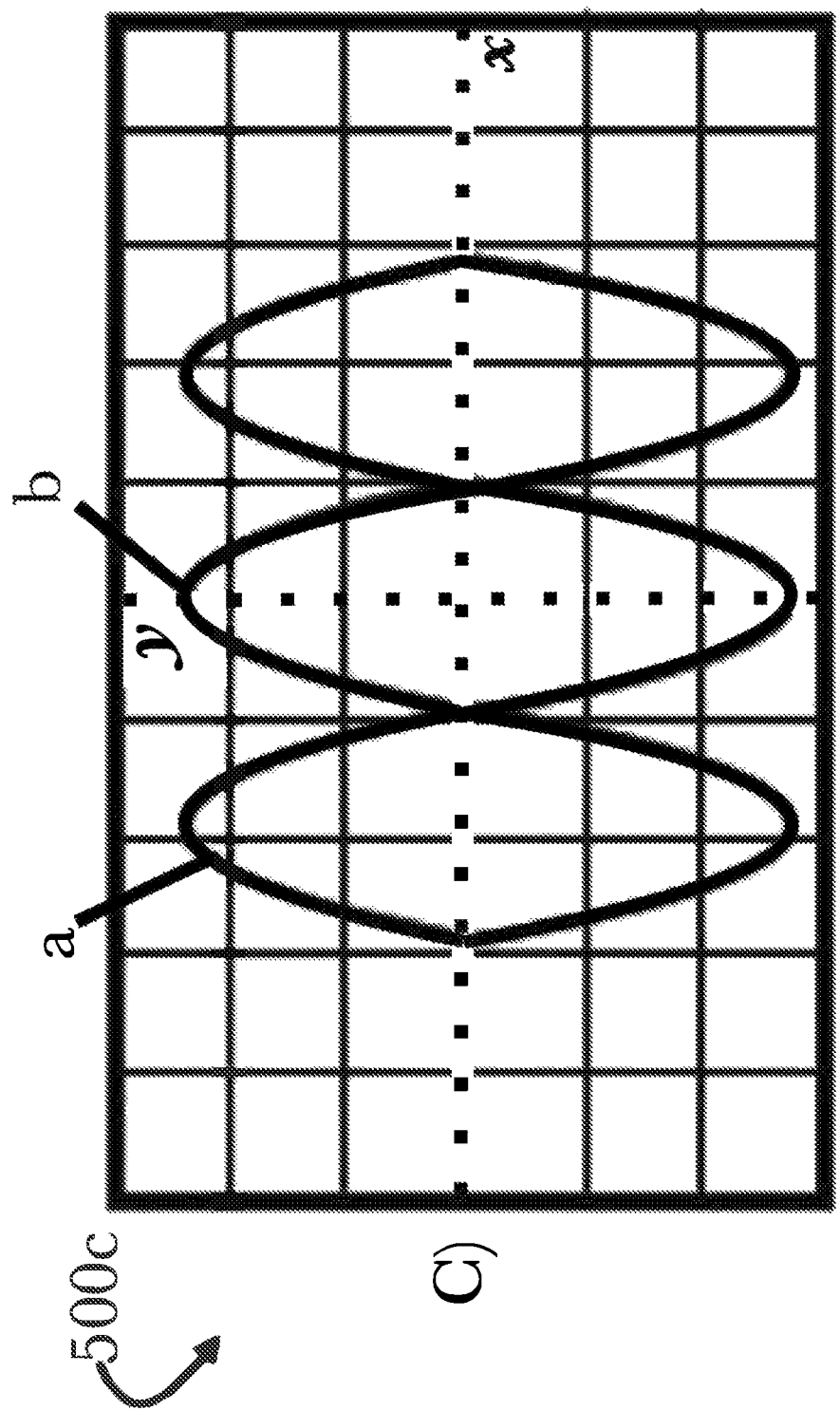
FIG. 5C shows overview of an oscillogram of the scaled photon waves of third harmonic.
Figure 6:
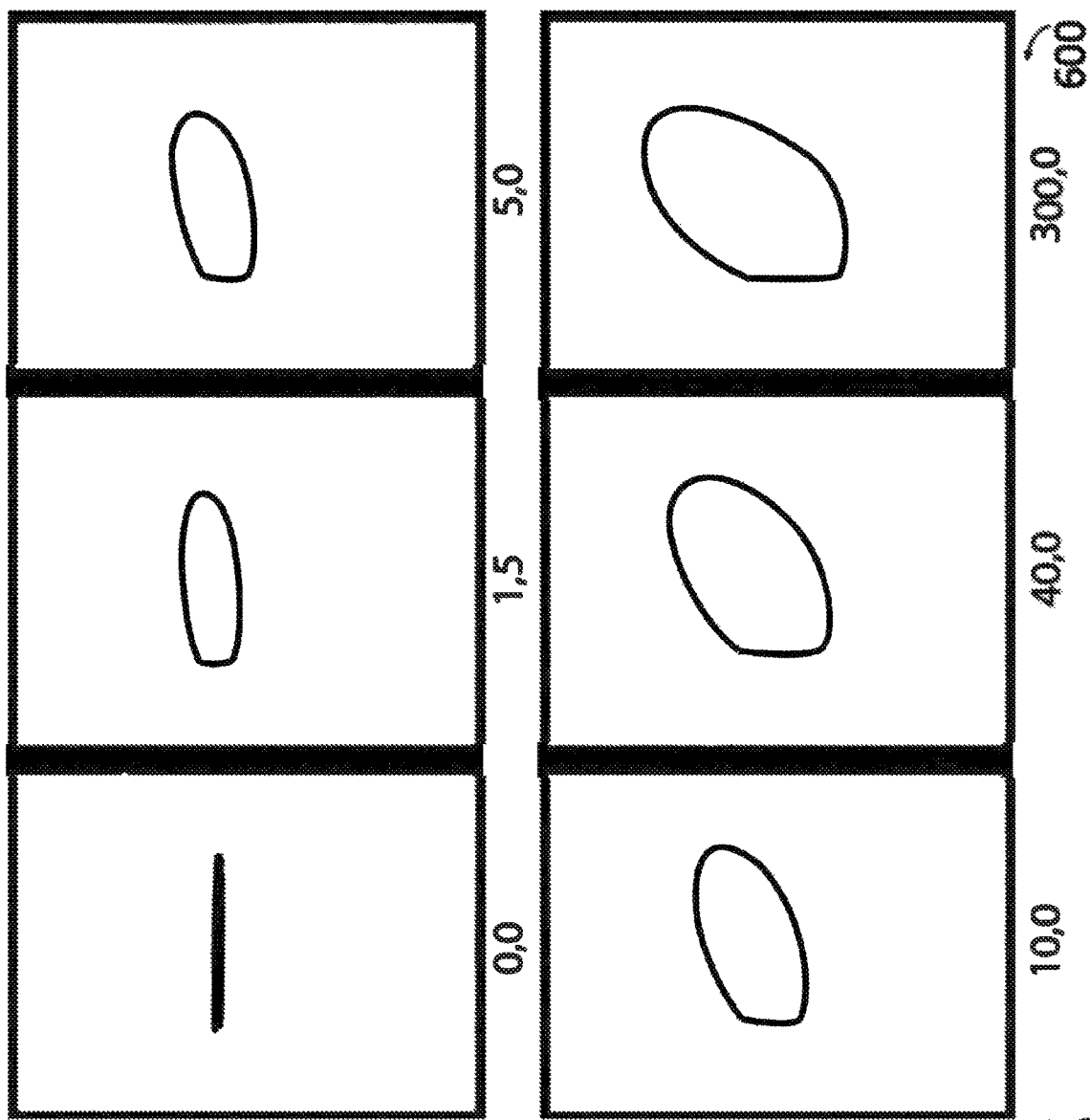
FIG. 6 shows overview of Lissajous figures of the scaled photon waves of the first harmonic electromagnetic wave.
Figure 7:
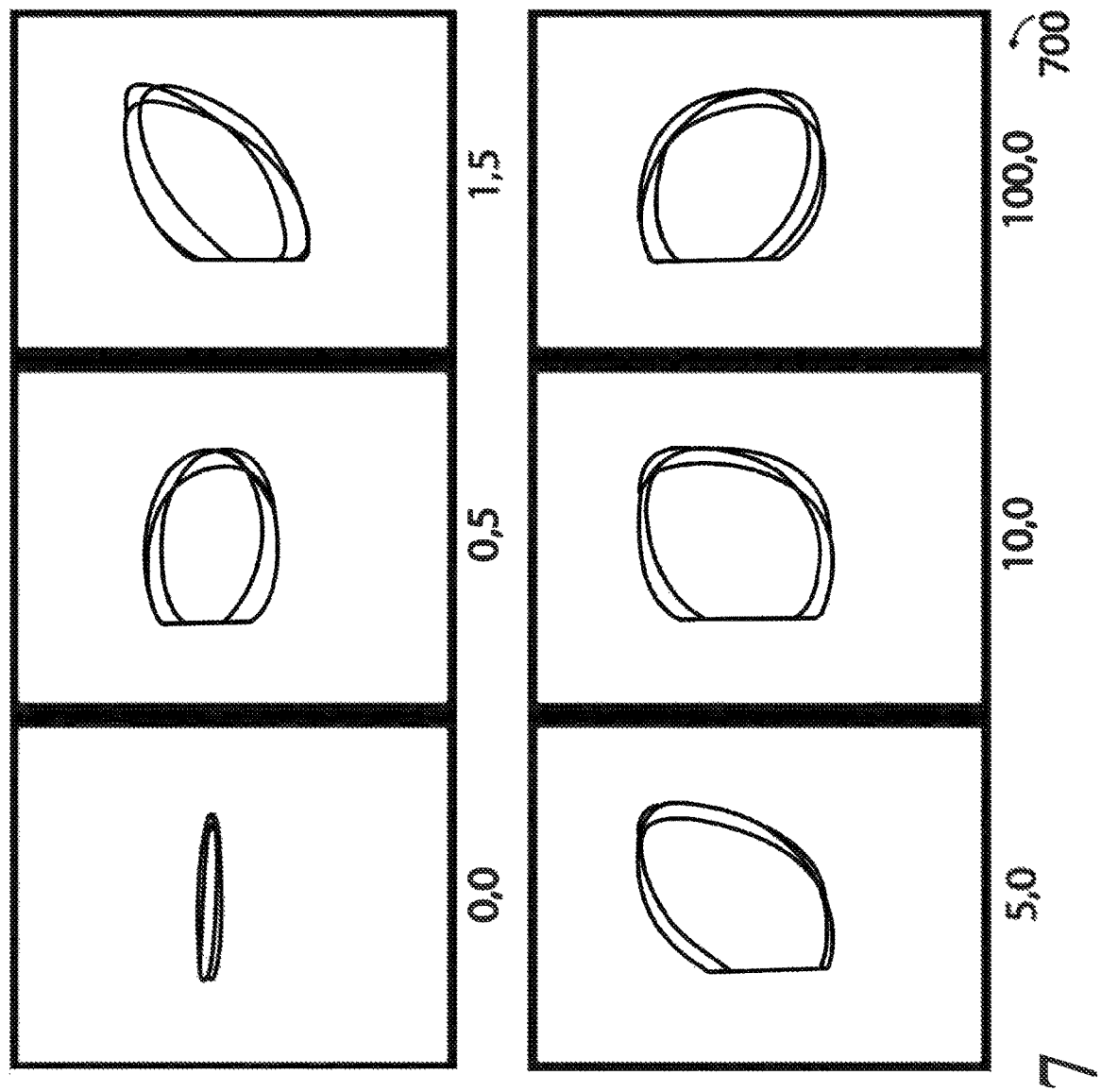
FIG. 7 shows overview of Lissajous figures of the scaled photon waves of the third harmonic electromagnetic wave.
Figure 8:
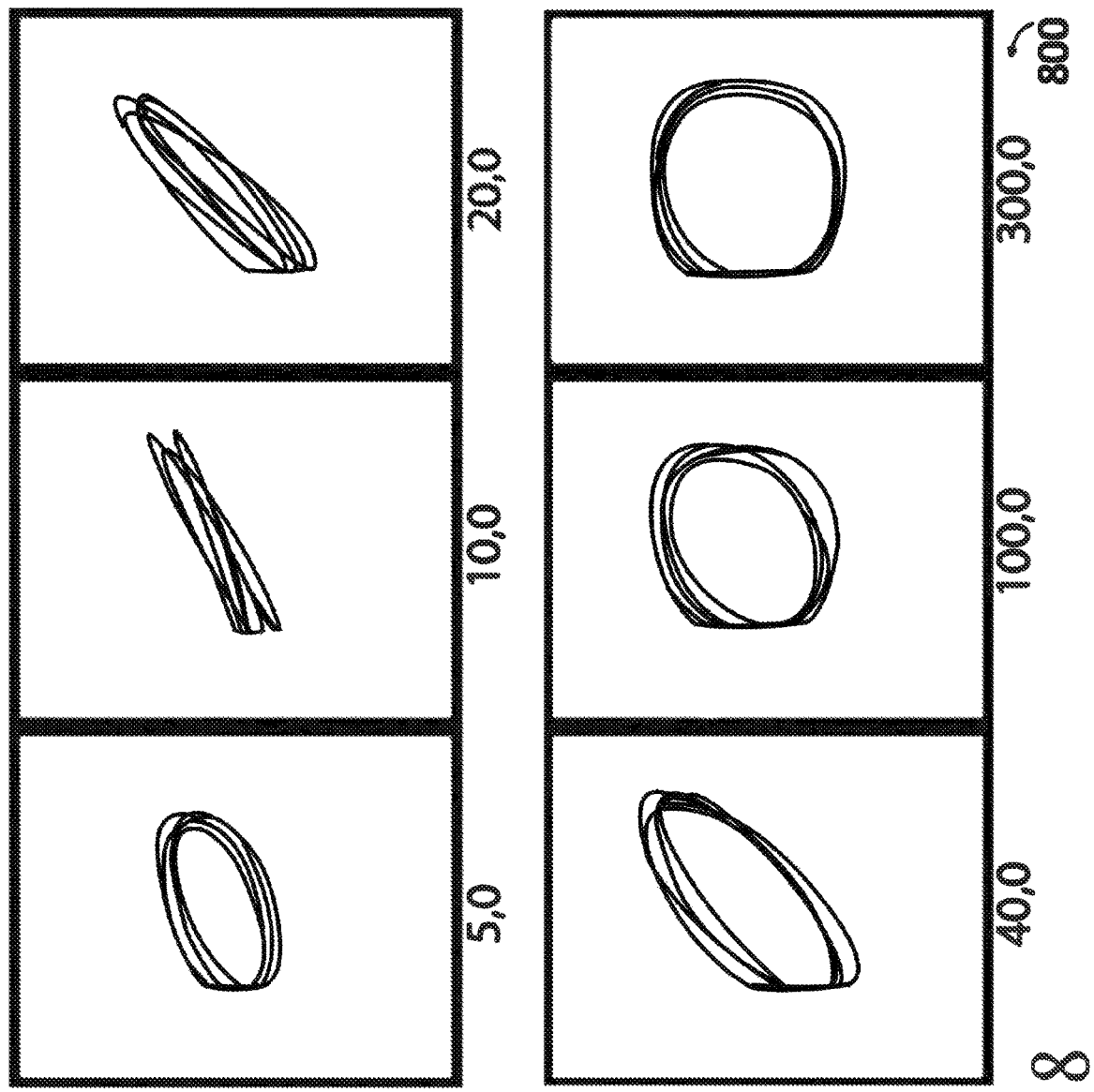
FIG. 8 shows overview of Lissajous figures of the scaled photon waves of the fifth harmonic electromagnetic wave.
Figure 9:
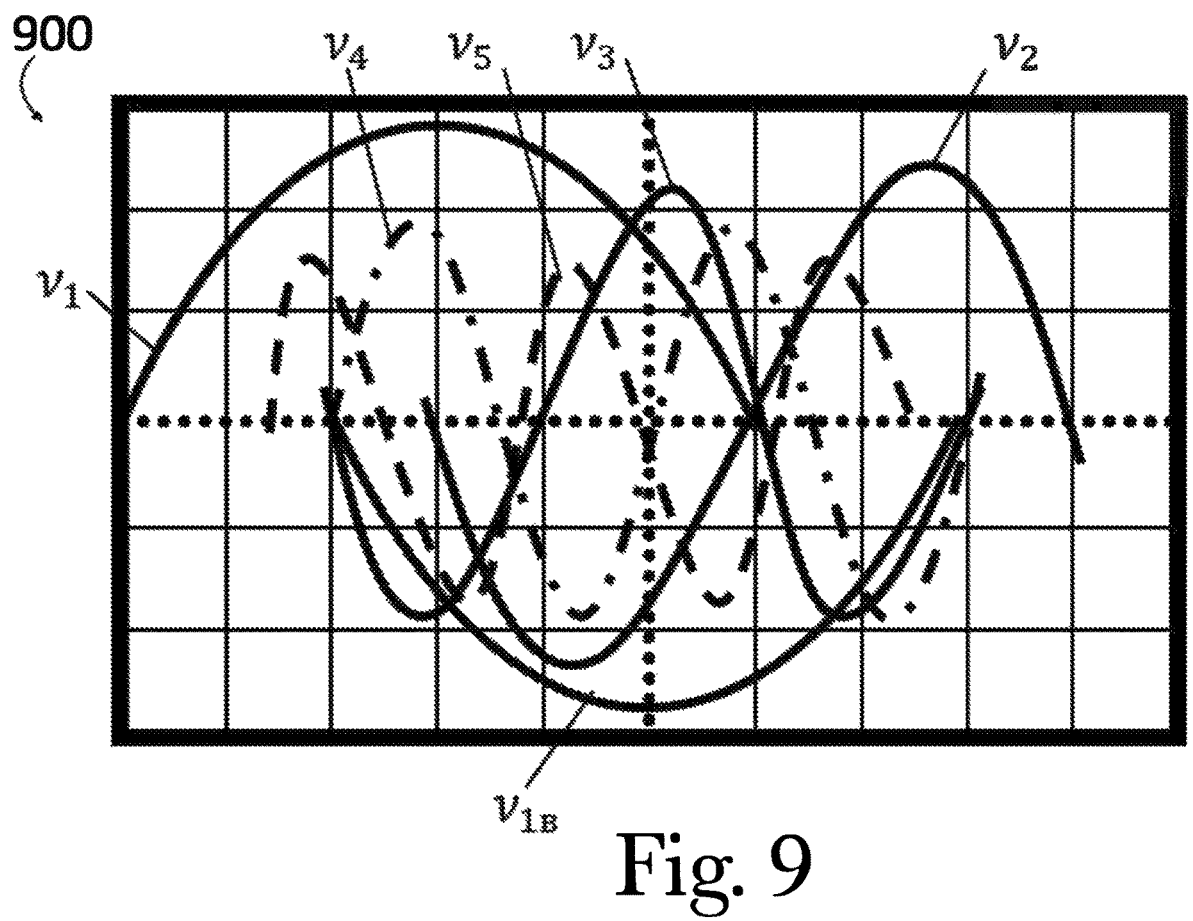
FIG. 9 shows overview of a structure of the photon waves in the boundaries of scaled calibration length and the calibration time.

The present invention is explained by drawings, in which a functional scheme of present system 100 is shown in FIG. 1, an electromagnetic transducer is shown schematically in FIGS. 2A and 2B; a design-functional scheme of present system is shown in FIG. 3; a space-time structure of crystal lattice system—electromagnetic field, produced by electromagnetic transducer is shown in FIG. 4, oscillogram of the scaled photon waves of first harmonic photon is shown in FIG. 5A; oscillogram of the scaled photon waves of second harmonic is shown in FIG. 5B, oscillogram of the scaled photon waves of third harmonic is shown in FIG. 5C; Lissajous figures of the scaled photon waves of the first harmonic electromagnetic wave are shown in FIG. 6; Lissajous figures of the scaled photon waves of the third harmonic electromagnetic wave are shown in FIG. 7; Lissajous figures of the scaled photon waves of the fifth harmonic electromagnetic wave are shown in FIG. 8, structure of the photon waves in the boundaries of scaled calibration length and the calibration time is shown in FIG. 9, functional dependency of magnetic flux density of harmonic on DC increment is shown 900A in FIG. 9A; oscillograms of photons waves structure are shown 900B in FIG. 9B, harmonic phase measurement is shown 1000A-H in FIG. 10, oscillograms of the first, the third, the fifth harmonic of the sinusoidal time base, which represent polarization of scaled photons waves are shown 1100A-C in FIG. 11, oscillograms of wave structure of scaled photons waves of the first, the third, the fifth harmonic at invariable reference current and current reduced in stepwise manner in a circuit of magnetizing winding are shown 1200 in FIG. 12, device 1300 for experimental analysis of samples is schematically shown in FIG. 13, changes in phase of the fifth harmonic are shown 1400 in FIG. 14, dependency of coercivity and magnetic flux density on tempering temperature of samples is shown 1500 in FIG. 15.

Detailed Description of Exemplary Embodiments and Aspects

As shown in FIG. 1, the system 100 for determining the structure of electromagnetic field of analyzed material contains series-connected power supply unit 1 and the electromagnetic transducer 2; analyzers of harmonic frequencies 3 and 5; the measuring instruments; the manipulator 6, interrelated comparator unit 4 and measuring unit 7. The manipulator 6 connected to electromagnetic transducer unit 2, the second 3 and the third 5 harmonic frequency analyzers, the power supply unit 1, the comparator unit 4 and the measuring unit 7, and the comparator unit 4 is connected to the power supply unit 1.

FIG. 2A and FIG. 2B schematically illustrate the electromagnetic transducer 2—unit of system (FIG. 1).

The electromagnetic transducer 200A consists of the electromagnetic transducer 8 and the electromagnetic transducer 9, whose scheme of windings 200B is shown in FIG. 2B. The transducer 8 consists of the magnetizing winding 10, the measurement winding 11, the bias winding 12 and a ferromagnetic core being an analyzed sample 13. The transducer 8 transforms AC and DC in the magnetizing 10 and bias 12 windings into alternating and constant magnetic fields, which excite electrons in the ferromagnetic core 13, and the latter radiate a spectrum of electromagnetic waves, which changes into a voltage spectrum. The transducer 8 is designed to determine the structure of the object 13 by the parameters of the measured voltage spectrum.

The transducer 9 consists of the primary winding 14 and a measurement winding 15 wounded on a frame of dielectric, which has same dimensions as the ferromagnetic core 13.

A scheme of series connection of the magnetizing winding 10 of the transducer 8 and primary winding 14 of the transducer 9 is shown in FIG. 2B. There is no ferromagnetic core in the transducer 9, therefore, EMF representing the energy of the electromagnetic field, which is produced by AC in the winding 14, will be induced in the measurement winding 14. The windings 10 and 14 executed as equal, and energy of the electromagnetic field produced by AC in the winding 10 may be judged on by the magnitude of EMF, given in the measurement winding 15. In other words, a transducer without a ferromagnetic sample 9 transforms AC in the winding 14 in the alternating magnetic field, which changes in the measurement winding 15 into the voltage at which the magnetic flux density of the electromagnetic field, which remagnetizes sample 13, is determined.

As shown in FIG. 1, the system for determining the structure of the electromagnetic field and the material of analyzed object includes the power supply unit 1, the electromagnetic transducer 2, the second analyzer of harmonic frequencies 3, the third analyzer of harmonic frequencies 5, the measuring instruments, the manipulator 6, the comparator unit 4 and the measuring unit 7.

FIG. 3 shows a design-functional scheme 300 of the system. The power supply unit 1 contains AC source and DC source. AC source is the first voltage generator 16, the first harmonic frequency analyzer 17, voltage regulator 18, power amplifier 19, the first ampere meter (milliamperemeter) 20, which are designed to produce and measure AC in the circuit of the magnetizing winding 10 and the primary winding 14 of the electromagnetic transducer 2.

DC source 21 and the second ampere meter (milliamperemeter) 22, which serve to produce and measure DC in a circuit of the magnetizing winding 12 of the electromagnetic transducer 2 and in the second voltage generator 23 being a transformer working in a magnetic saturation mode.

The power supply unit 1 also contains a phase shifter 24 designed to supply the reference voltage from the second voltage generator 23 through the third harmonic frequency analyzer 5 and selector switch 28 of the manipulator 6 to the input of the oscilloscope 29 of the comparator unit 4. The functions and destinations of the present system components are given below.

DC source 21 produces a DC in the circuit of the bias winding 12 of the electromagnetic transducer 8 and in the bias winding of the second voltage generator 23. The destination is to produce a continuous magnetic field for the ferromagnetic core (invested object) 13 bias and to obtain pair harmonics, which arise only when simultaneously magnetization by the alternating magnetic field and bias by continuous magnetic field of the core 13.

AC power source—the generator 16 generates voltage of different frequency intended for excitation in the circuit of the magnetizing winding 10, the primary winding 14 of the transducer 2 and in the magnetizing winding of the generator 23 of AC, which produces an alternating electromagnetic field of a certain frequency for remagnetization of the ferromagnetic core (sample) 13.

The first analyzer 17 serves to obtain a stability in terms of frequency of voltage of allocated harmonic, in order to reduce the frequency error to a minimum. The voltage regulator 18 serves to change the voltage from zero to maximum. The power amplifier 19 amplifies the voltage required to produce in magnetizing winding 10 and in the primary winding 14 of the current transducer 14, which produce the alternating electromagnetic field.

The generator 23 is the source of the voltage spectrum induced in the secondary winding of the transformer by the spectrum of the electromagnetic field of the transformer core. The voltage spectrum serves as a reference signal supplied to the oscilloscope 29 by oscilloscopic measurement method.

The second analyzer of harmonic frequencies 3 allocates the harmonics from the voltage spectrum, which is induced in the measurement winding 11 of the transducer 8 by the spectrum of the electromagnetic field of the analyzed object 13 and is an intermediate link in the measuring circuit. The allocated voltage of a certain frequency arrives at the comparator unit 4 and the measurement unit 7 from the output of the analyzer 3.

The third analyzer of harmonic frequencies 5 allocates the harmonics from the voltage spectrum, which is induced in the secondary winding of the transformer (voltage generator 23) by the spectrum of the electromagnetic field of the transformer core and is an intermediate link in the circuit of the reference voltage production. The voltage arrives at the manipulator 6 and then at the comparator unit 4 from the output of the analyzer 5.

The function of manipulator 6 is switching of measured and reference voltage. The manipulator 6 is designed to measure the gain of analyzer 3 for different harmonic, namely, with selector switch 25 and 26 the voltage of a certain frequency is supplied into the input of the analyzer 3 from the output of the analyzer 17, and with selector switch 27 the voltmeter 31 is connected to the input and output of the analyzer 3 and the voltage is measured, and gain—for each harmonic is determined with the ratio of the voltage at the output to the voltage at the input.

Also, the function of the manipulator 6 is the phase measuring. With the selector switch 28, link-up of measured and reference voltage to the vertical deflection and horizontal deflection plates of the oscilloscope 29 is changed, which is necessary when measuring the harmonic phase.

The selector switches 25-27 are designed to determine the gain of analyzer 3 and phase displacement, which is introduced by this analyzer into the measuring circuit. Selector switch 28 is designed for alternate link-up of measured and reference signal to the input of the oscilloscope 29.

The comparator unit 4 includes an electron-beam oscilloscope 29 used for visual observation and photographing of oscillograms, Lissajous figures, which represent the structure of photons waves, by which the structure of analyzed object (sample) 13 is determined.

The measuring block 7 contains measuring instruments, namely: the voltmeter 30 designed to measure the voltage in the measurement winding 15 of the transducer 9 without a ferromagnetic core. The voltmeter 31 is designed to measure the voltage allocated by the analyzer 3 from the voltage spectrum of the measurement winding 11 of the transducer 8.

Phase shifter 24 and analyzer 5 are designed to allocate the components from the spectrum of EMF, and their displacement in order to obtain a reference signal (measure) for measuring the phase with an oscilloscope 29.

Description of System Operation (as Shown in FIG. 1, FIG. 2A, FIG. 2B)

The alternating electric current of the power supply unit 1 produces in transducer 2 an alternating electromagnetic field, which excites the electrons of different energy bands in the crystals of analyzed object (sample) 13. Excited electrons radiate a spectrum of electromagnetic waves of different frequency, the latter cross the loops of the measurement winding 11 and induce in it the voltage spectrum (EMF) arriving at the input of the analyzer 3. The voltage of a certain frequency (component of the spectrum), which is allocated by the analyzer, arrive at the manipulator 6, then at the comparator unit 4 and the measurement unit 7. At the same time, a signal from the analyzer 5 arrives at the manipulator 6, it allocates the component of the voltage (EMF) from the spectrum, which is induced in the secondary winding of the transformer by electromagnetic field, which serves as a measure. With the manipulator 6 and the comparator unit 4, spectrum components of analyzed electromagnetic radiation, spectrum of electromagnetic radiation of the measure, excitation energy and absorption energy in the form of ratios, or the functional dependency or solution of equations, etc., are comprised and matched, which is carrying out with the help of information and measuring apparatuses of the measurement unit 7 and oscilloscope 29.

Description of System Operation (as Shown in FIG. 3)

EMF generator 16, arrives at the analyzer 17 from the output of which a sinusoidal signal is separated into the generator 23 and voltage regulator 18. The voltage (EMF) arrives at the power amplifier 19 from the regulator 18, through the selector switch 25.

Amplified voltage (EMF) produces AC of a given frequency in the circuit of the magnetizing winding of the transducer 2. As a result, an electromagnetic field exciting the physical system is generated—electrons in the energy bands of the sample 13, and the latter radiate quanta of energy—photons of different frequencies. Photons fluxes cross the loops of the measurement winding 11 and induce the spectra of the EMF of different frequency in it, which appear as voltage spectra at the ends of the winding.

Through the selector switch 26 the voltage spectrum arrives at the input of the analyzer 3, which allocates the component of the voltage spectrum. The amplitude of the voltage is measured by the voltmeter 31, and the phase and frequency of the photons—with the oscilloscope 29. For this purpose, the reference voltage is supplied into a circuit from the generator 23: the phase shifter 24, the analyzer 5, the selector switch 28, and into the input oscilloscope 29.

Measurement of the components of the EMF spectrum at the ends of the winding of measurement winding 11 is carried out with the use of the analyzer 3, the manipulator 6, the voltmeter 31, the oscilloscope 29 and the phase-sensitive voltmeter 32. The voltage at the ends of the measurement winding 15, the transducer 9 without the ferromagnetic core is measured by the voltmeter 30.

Bias of ferromagnetic core 13 by magnetic field (FIG. 2A) is used for receiving the spectra of electromagnetic radiation in a wide frequency band in the electromagnetic transducer 2 (FIG. 3). To obtain the reference higher-order harmonics of current and voltage, a generator of higher harmonics of current 23—a transformer having an additional winding, which is actuated in the circuit of DC, is used. DC arrives at the transducer 2 and the generator 23 from the source 21.

The physical model of the electromagnetic transducer 2 (FIG. 2A, FIG. 2B the transducer 8) is shown in FIG. 4. It serves to make disclosure of the invention.

FIG. 13 shows a block diagram of a device for conducting an experimental analysis of the samples. List of units: 36—unit of regulated power supply of DC and AC; 37—band-stop filter for higher-order harmonic in AC circuit; 38—DC and AC measuring units; 39, 40—electromagnetic energy transducers (magnetizing and bias coils); 41—analyzed sample; 42—flip coil, number of loops W=30, wire PEL—0.21; 43—measurement unit.

The purpose of the second invention is achieved by measuring and determining the physical magnitudes representing the structure of the electromagnetic field: oscillation structure of photon wave within the calibration length and in the interval of the calibration time, the polarization of the photons, the number of spectral lines, the number of photons forming spectral lines per unit time, and the observation of the regularities of the relation between the structure of the electromagnetic field and the electronic structure of the atoms of the material, by which the structure and physical and mechanical properties of the material is determined.

The technical result at the implementation of the present invention is achieved by transition to a new level of measurement with the use of calibrating the quantum system within the scale of the Planck magnitudes and determining the structure of the electromagnetic field and the analyzed object material, namely:

the measurement of parameters or characteristics of magnetic fields, for example, vector projection of magnetic induction B, the module of this vector |B|, the projection of the vector grad |B|, direction cosines of vector B in a certain coordinate system, are supplemented by measurement and determination of oscillation structure of photon wave within the calibration length and in intervals of calibration time, the frequency of the photons, the polarization of the photons, the number of spectral lines, the number of photons forming the spectral lines per unit time.

The foregoing, for example, may provide:

the measurement of the characteristics of magnetic materials or the characteristics of their magnetic state, such as magnetic polarization J, magnetic susceptibility ϰ, magnetic permeability μ, coercivity, etc., with the disclosure of their regularities of connection with the electronic structure of materials and the state of electrons;

in non-destructive testing—increasing the reliability and integrity of testing the structure of product material, the possibility of mechanization and automation of testing processes, the application of step-by-step testing of the product complex form, the application of testing the material of the products directly in the process of their operation;

in measuring technologies—the transition from the probable determination of the presence of an electron in one or another section of space around atomic nucleus, to computation at any time an accurate trajectory with the definition of location, velocity, direction of motion of the electron;

the development of measuring and computation technologies based on the interconnection between macro-world phenomena and quantum-mechanical magnitudes, including increasing the accuracy of computations in high-speed computing methods.

Substantiation of the Invention

A well-known feature, which is based on that Planck constant h is the main physical constant that connect magnitude of energy quantum of any oscillating system with its frequency, while the oscillator energy is always factor of frequency:

"there is an equivalence between energy and frequency E=hv. From the standpoint of classical theory this equivalence is completely incomprehensible . . . . The number of oscillations is a local magnitude: it has a certain meaning for some given place, no matter what oscillations is about—mechanical, electrical or magnetic, it is necessary to observe this place for a long time. Talking about energy in a certain place, according to the classical theory, makes no sense; the first thing to do is to specify the physical representation whose energy is meant.

Therefore, according to classical mechanics, the simplest motion is the motion of a single material point; according to quantum mechanics—the motion of a simple periodic wave. And just as by the first—the most general motion of the body is considered as a set of its singular points, according to quantum mechanics, it is considered as the interaction of all possible types of periodic waves of matter" [5, p. 417-421].

The manifestation of the properties of a photon was proved by Einstein, who related the energy and the frequency of quanta of light to the ratio ε=h ν, in which the electromagnetic waves consist of inseparable "energy quanta, which are absorbed or radiated only in total" [6, p. 93]. Compton's investigations on X-rays scattering at electrons (1922) showed that photon has an impulse $p_\gamma$ and it became the basis to consider the quantum of light as an elementary particle, which is subject to the same kinematic laws as particles of matter. In 1929, G. N. Lewis called it a "photon". In the Standard model of photons interactions—gauge bosons of electromagnetic interaction, massless.

For example, a known method (the last analogue) of "observing single quanta of magnetic flux $\Phi_0$=h/2e" by measuring the period of the Josephson current wave are characterized by the above features.

It is known from Bohr postulates:

"1. The dynamic equilibrium of the system in a stationary state may be considered with the help of ordinary mechanics, whereas the transition of a system from one stationary state to another can not be interpreted on this basis.

2. The specified transition is accompanied by the emission of monochromatic radiation, for which the state between the frequency and the amount of energy radiated is exactly what Planck theory provides [7, p. 88].

In accordance with the postulates, Bohr derived the equation of radiated (absorbed) energy in passing of the quantum system out the state corresponding $\tau_1$ to the state corresponding to $\tau_2$:

$$E_{\tau_2} - E_{\tau_1} = h\nu$$

A known method of spectroscopy (analogue) characterized by a feature based on the Bohr equation of radiation. The method allows "to represent the picture of quantum transitions between energy levels and the structure of quantum system levels (atom, molecule, crystal). In the transition of the system from the energy level $\varepsilon_k$ to level $\varepsilon_l$ emission or absorption of electromagnetic radiation with a frequency is occurring:

$$\nu_{kl} = \frac{1}{h}(\varepsilon_k - \varepsilon_l)$$

The Drawbacks of Prototypes which are Eradicated by the Invention

"For complete definition of quantum of light, more precise additional description is required, . . . the main purpose of which was to rely on solving the seeming contradiction between the corpuscular and wave presentations. In experimental physics, this paradox is solved by the fact that in the investigation either corpuscular properties, such as blackening on a photographic film or track in a track chamber is always established, or wave properties are observed. In the latter case, many events are needed (we are talking about a set of events), so that an interference figure may arise. The statistical distribution for a set of events is described by the Schrodinger wave function, more precisely, by the square of its absolute magnitude.

. . . When trying to give such an interpretation, which would combine the corpuscular and wave figure and simultaneously considering both pictures symmetrically, the following difficulty arises . . . it is fundamentally impossible to draw a clear distinction between the behavior of atomic systems and their interaction with macroscopic measuring apparatus . . . . This means that the wave function of quantum mechanics does not describe any such physical phenomenon that could be considered regardless of the observation problem. If we are talking about a single case, then the wave function allows only probable judgings about the result of measurement" [8, p. 212-215].

The present invention is based on new essential features: photons are allocated from out the electromagnetic wave and determining the structure of their waves within the calibration length and in the interval of the calibration time of Planck scale.

Essential features of new technical solutions involves a new mathematical relationship between physical magnitudes characterizing electromagnetic radiation spectra and the state of a quantum system of a material radiating photons in any influence on the system: by thermal collisions, interactions with adjacent particles or the influence on the system by electromagnetic waves and etc. Mathematical tools are also used to systematize measured data, to identify and formulate a numerical relationship between them.

New technical solutions of determining electromagnetic wave structure are characterized by the equation of the energy flux destiny of electromagnetic wave, which is derived by the author:

$$W_n = f\varepsilon_n = fh\nu_n \sin(\omega_n t_0 + \alpha_n) \quad (1)$$

where $W_n$—energy of the magnetic component of a single electromagnetic wave of n-th harmonic;
f—frequency of photon radiation by elementary particle;
$\varepsilon_n$—photon energy of n-th harmonic;
h—Planck constant;
$\nu_n$—photon frequency of n-th harmonic;
$\omega_n$—angular velocity of photon wave;
$t_0$—calibration time;
$\alpha_n$—initial phase of photon wave.

Equation (1) describes "electromagnetic radiation—in the classical electrodynamics of production of electromagnetic waves is accelerated by moving charged particles or by ACs, and in quantum electrodynamics—the generation of photons in change of the quantum system state" [3, p. 176].

The equation (1) was verified by comparing it with the data of known investigations: "investigations of the photoelectric effect, the investigation of the light scattering at electrons (Compton effect), and the results of other investigations convincingly established that light is an object which, according to the classical theory, has a wave nature, and is similar to the flux of particles. "Particle" of light—the photon has an energy $\varepsilon$ and impulse p, which are related to the frequency $\nu$ and wavelength $\lambda$ of light in the ratios: $\varepsilon = h\nu$, $p = h/\lambda$, where h—Planck constant" [3, p. 234].

The fidelity of equation (1) is confirmed by its correspondence with the above-mentioned investigations (photoelectric effect study, Compton effect and others), which means that equation (1) represents a single electromagnetic wave having the following structure: f—frequency of photon radiation per unit of time, which determines energy flux destiny (of photons) of an electromagnetic wave, $h\nu_n$—energy of photon of n-th harmonic, $(\omega_n t_0 + \alpha_n)$—phase representing structure of wave photon of n-th harmonic. Thus, equation (1) expresses real features of a method that exhaustively describes the structure of a singular electromagnetic wave.

The essential difference of the equation (1) from the known equations of electromagnetic radiation in classical and quantum physics is the new mathematical dependency between energy of magnetic component of a single electromagnetic wave and frequency of photons radiation, their energy and the structure of photons waves, which is established experimentally. Using a new mathematical dependency (1), experimentally, in one investigation, number of photons radiated by excited elementary particles of a material per unit time is determined, and their corpuscular and wave properties are determined. This eradicates drawbacks of known methods when in one investigation the corpuscular properties are determined, for example, blackening on a photographic film or trace in a track chamber, while in the second investigation, the wave properties are observed at the interference sample.

The equation (1) is the basis of the method developed by the author for determining the structure of the electromagnetic field and the objects material.

The sum of harmonic oscillations of singular photons of the same frequency produces harmonics. The harmonic frequency $f_n$ is:

$$f_n = f\nu_n \quad (2)$$

The spectral line is a harmonic, which is described by the equation (1) as the flux of photons acting on a singular electric charge, which moves in a magnetic field with a force equal to Lorentz force. The set of harmonic frequencies forms a spectrum of frequencies.

Isolation of a photon out from the electromagnetic wave is carried out by isolation of the oscillations of its energy, which is described by the equation, which is singled out from the expression (1):

$$\varepsilon_n = h\nu_n \sin(\omega_n t_0 + \alpha_n) = h\nu_n \sin\left(\frac{2\pi t_0}{T_n} + \alpha_n\right) = h\nu_n \sin(n\pi + \alpha_n) \quad (3)$$

Therein the angular velocity is:

$$\omega_n = \frac{2\pi}{T_n} \quad (4)$$

Phase of the harmonic oscillations is represented in the equation (3) with the expression:

$$(\omega_n t_0 + \alpha_n) = \left(\frac{2\pi t_0}{T_n} + \alpha_n\right) = (n\pi + \alpha_n) \quad (5)$$

where $T_n$—period of the photon wave of the n-th harmonic, $$\omega_n t_0 = \frac{2\pi t_0}{T_n} = n\pi - \text{division of calibration time } t_0 \text{ into the}$$

finite number of half-periods $\pi$ of radians, within the calibration length and in the interval of the calibration time.

The number of half-periods (amplitudes) of photon wave is determined by the quantum number:

$$n = \frac{t_0}{t_n} = 1, 2, 3, \ldots \quad (6)$$

where $t_n = \frac{1}{2}T_n$—time of production of the amplitude of photon wave of the n-th harmonic.

Photon frequency of n-th harmonic is equal:

$$\nu_n = \frac{\ell_0}{ct_n} = \frac{n\ell_0}{ct_0} = n \quad (7)$$

Equation (3) describes (represents) the structure of a photon wave (mathematical image) in the form of harmonic energy oscillations within the calibration length and in the interval of calibration time $t_0$ of Planck scale.

Structure of Photon Wave, Expressed by Physical Magnitudes

Calibration length of the photon wave.

Compton found that X-rays scattered in paraffin have a larger wavelength than the incident ones.

" . . . Compton effect in quantum theory is considered as an elastic collision of two particles—the bombarding photon and the stationary electron. In each such act of collision (as in the case of an elastic collision of two billiard layers) the laws of conservation of energy and impulse are kept. When faced with an electron, the photon transfers part of his energy and impulse to it and changes the direction of motion (scatters); reducing of photon energy means increasing of wavelength of the scattered light. The electron, which was stationary before, receives from the photon energy and impulse and comes into motion—it suffers repulse" [3, p. 230].

As it appears from the Compton effect, wavelike energy process demonstrating itself as a photon, runs in an elastic particle. Therefore, any change in the photon frequency, when its energy is changed, occurs within the calibration length of the photon wave; it is considered as a standing wave that occurs when reflected from the obstacles. Then the minimum distance between the neighboring nodes of the amplitude of the oscillations of the first harmonic photon is equal to the calibration length of the photon wave:

$$\ell_0 = \frac{h}{\pi P_{\tau 1}} \quad (8)$$

therein: Planck constant $h=6.6260755 \cdot 10^{-34}$ J·s;
impulse of the first harmonic photon $P_{\tau 1}=25.69401079$ kg·m/s.
Dimension and unit of calibration length by equation (8):

$$dim\ell_0 = \frac{L^2 M T^{-2} T}{LMT^{-1}} = L$$

$$[\ell_0] = \frac{1 \text{ kg} \cdot 1 \text{ m}^2 \cdot 1 \text{ s}^{-2} \cdot 1 \text{ s}}{1 \text{ kg} \cdot 1 \text{ m} \cdot 1 \text{ s}^{-1}} = m$$

Number value of the calibration length of the photon wave of the first harmonic by equation (8):

$$\ell_0 = \frac{6.6260755 \cdot 10^{-34}}{3.141592678 \cdot 25.69401079} = 0.82087041 \cdot 10^{-35} \text{ m} \quad (9)$$

Number value of the calibration length of the photon wave of the first harmonic has meaning of the number value of Planck length order $L_0 \approx 10^{-35}$ m.

Calibration time of Planck scale $t_0$—is the time, in the interval of which the physical process of photon wave producing at the light velocity c within the limits of the calibration length $\ell_0$ takes place:

$$t_0 = \frac{\ell_0}{c} = \frac{0.820870407 \cdot 10^{-35}}{2.99792458 \cdot 10^8} = 2.7381289 \cdot 10^{-44} \text{ s} \quad (10)$$

Structure of the Photon Wave within the Calibration Length

The photon wave of the first harmonic in the form of one amplitude is formed within the limits of the calibration length $\ell_0=0.8208704 \cdot 10^{-35}$ m by the physical process, which is accompanied by the production of energy quantum of the magnetic field $h=6.6260755 \cdot 10^{-34}$ J·s for half-period, which is equal to the calibration time $t_0=2.7381289 \cdot 10^{-44}$ s, the photon frequency is equal to one amplitude $v_1=1$.

The photon wave of any higher-order harmonic of an electromagnetic field is produced within the calibration length $\ell_0=0.8208704 \cdot 10^{-35}$ m and during the calibration time $t_0=2.7381289 \cdot 10^{-44}$ s. The photon frequency is equal to the number of antinode (amplitudes) $v_n=n=1, 2, 3, \ldots$ that is placed within the calibration length $\ell_0$ during the calibration time $t_0$, each amplitude is equal to the quantum of energy h, and the total photon energy is equal to the product of the energy quantum to the photon frequency $\varepsilon_n=hv_n$.

The calibration length of the photon wave is the wavelength of a fixed Planck scale size. It is consistent with global and local symmetry.

The complex wave function of each photon may be represented as a vector, whose direction determines the phase of the quantum particle. In accordance with global symmetry, if the vectors of all quantum particles, which are filling the space in equal size in the same direction, are rotated, the laws of physics do not change. Calibrating symmetry is a local transformation, an individual turn of the phase of each photon.

Distinction between the demonstrations of the properties of atomic systems and their interaction with the measuring apparatus (macro level) is carried out with the help of combination and sequence of operations, which constitute the complete process of measurement and testing of readiness, reliability, and compliance with the given parameters of the objects material:

Frequency of photons waves $v_n$ radiated by the physical system is determined at the relation of the harmonic frequencies according to equality (2): $v_n=f_n/f$, or by the structure of the photon waves, according to equality (7): $v_n=n$, and the separation of elementary particles into energy levels in the quantum system is determined by the frequency depending on the equivalence between the energy and frequency of the photon $$v_n = \frac{\varepsilon_n}{h}.$$

Polarization (phase) of the photons is determined by the structure of the photons waves (equation (5), and the spatial position of orbits of elementary particles in the quantum system and the relation between this state and its structure are determined by polarization (phase) on account of the fact that the state and the transitions of quantum system from one stationary state to another is described by the equation of harmonic oscillator: $x=A \sin(\omega t+\alpha)$.

Number of spectral lines of an electromagnetic field is determined by the following physical magnitudes:
current in the conductor is measured, and according to the number value of the current, the number of electrons $n_e$ is calculated by using the equation (44):

$$n_e = 6.2415063 \cdot 10^{18} I \frac{1}{I_A}$$

where 1—value of measured current;
$I_A=1A$—current in one ampere, and number of spectral lines in electromagnetic spectrum around the conductor with current is equalized to number of electrons;
Number value of the magnetic flux density module of the harmonic $B_n$ is determined, then the number of spectral lines $n_{B_n}$ is calculated by using the formula (45):

$$n_{B_n} = 6.2415063 \cdot 10^{18} B_n \frac{1}{B_T}$$

where $B_n$—number value of the measured magnetic flux density in tesla;
$B_T$=1T—magnetic flux density, the value of one tesla,
and in the number of spectral lines the number of excited elementary particles in a quantum system radiating photons is determined;

Harmonic voltage $U_n$ is determined, and the number of spectral lines $n_{U_n}$ of the electromagnetic field inducing the voltage is calculated by the number value, using the formula (46):

$$n_{U_n} = \frac{U_n}{K_N f v_n k_U \Phi_0 W S}$$

where $K_N$—is gain of analyzer by n-th harmonic;
$k_U$=0.77480923—coefficient, which coordinates the number of spectral lines determined by measured magnetic induction and voltage;
$\Phi_0$=1.153725·10$^{17}$ Wb—quantum of magnetic flux;
W—number of loops of the measurement winding;
S—surface area of one loop perpendicular to magnetic flux.

number of excited elementary particles in a quantum system radiating photons is determined by the number of spectral lines.

Number of photons producing spectral lines $n_f$ of electromagnetic field per unit time is determined by the equality (20):

$$n_f = 2ft$$

where f—frequency of photon radiation carried out by quantum system, t—time, and growth of magnetic flux (energy) crossed by conductor for each singular spectral line is determined by the number of photons.

Residual induction presenting the number of electrons, which overcame energy barrier, is determined by the magnitude of the magnetic flux density of electromagnetic field of radiation, measured at the moment of the end of abrupt change of photons phase producing this radiation.

Coercivity is determined by the magnitude of the electron excitation energy measured at the moment of end of abrupt change of the phase of photons radiated by excited electrons that overcame the energy barrier.

Structure of analyzed object material is determined by analyzing the results of all measurements and definitions.

A Specific Form of Measurement and Testing of Readiness, Reliability, and Compliance with the Given Parameters of the Objects Material The technical problem, which solution is directed by the second invention, consists in the creation of a process (method) as an object of technology, characteristics of which correspond to the requirements specified above combination and sequence of operations). The process (method) of the process is based on the method of eddy currents, or eddy-current testing, which is realized in the system electromagnetic transducer (FIG. 2A and FIG. 2B) relating to induction converters.

"Eddy-current testing includes materials sorting on grades, evaluating of chemical purity degree, identification and evaluation of nonhomogeneous structure bands, evaluating of the depth and quality of chemical-thermal and other surface-hardened layer, control of thermal and mechanical processing accuracy, evaluation of internal tensions and also other problems associated with the structure of the surface layers" [2, p. 5].

At the core of eddy-current testing, there is a connection between the structure of the material and the structure of the electromagnetic field, which is radiated by this material. Detailed disclosure of the relation between the phenomena in quantum systems of materials and phenomena of electromagnetism is carried out using a physical model of the electromagnetic transducer system (FIG. 2B, transducer 8). The model represents a system of crystal lattice—electromagnetic field.

Brief Description of the System

"When crystals are produced, metal atoms give off one or more electrons from the electron sheath (depending on chemical valency) and are transferred into positively charged ions . . . . Electrons given off by atoms move freely inside the crystal; . . . they produce a kind of cement that firmly fastens crystalline structure of metal. Metal crystals . . . usually have cubic or hexagonal lattices [9, p. 251].

. . . A rather important consequence of the close packing of atoms in the crystal and due to this intense interaction between adjacent atoms is the spallation of close energy levels (terms) that are characteristic of atoms in energy bands having an extremely close structure" [9, p. 256].

When external electromagnetic field has an effect on free electrons, excited electrons radiate photons containing information about the state of the electrons in the energy bands. Such interaction leads to the production of a crystal lattice system—an electromagnetic field. In this system, there are regular relations between the structure of the crystal lattice and the physical magnitudes that characterize the electromagnetic field, which is shown in FIG. 4.

In a copper wire of the magnetizing winding 400 (FIG. 4), AC $i=1_m \sin \omega t$, produced by free electrons e (circles of small diameter), which have extremely minimal energy and impulse $P_{e1}$ in the physical system. With each change in the direction of oscillation in the conductor, the electrons radiate photons that have the same amplitude. The fluxes of the first harmonics (half-wave) $\Phi_{m1}$ of photons are emitted from transducer of winding 10 in space at light velocity c, and cross a ferromagnetic sample 13. This sample crosses constant magnetic flux $\Phi_=$, produced by DC, which flows in the circuit of the bias winding 12 (FIG. 4).

A simultaneous effect on sample 13 of constant magnetic flux $\Phi_=$ and alternating magnetic flux $\Phi_{m1}$, leads to the production of eddy currents $i_{ec1}$, $i_{ec2}$, $i_{ec3}$ (shown by the vector of switching in FIG. 4) by electrons of different energy levels. With each change of the direction of oscillation, electrons of material radiate secondary photons of different frequency. Secondary photons, which are spreading in space, produce spectral lines of the spectrum of electromagnetic radiation of material. In FIG. 4, the upper series of secondary photons $v_1$=1 produces the spectral line of the first harmonic, the third series of secondary photons $v_2$=2—the spectral line of the second harmonic, and the fifth series of secondary photons $v_3$=3—the spectral line of the third harmonic. Vector of light velocity c indicates the direction of transition of photons from the sample 13 to the measurement winding 11. When crossing loops of the measurement winding 11, the photons excite free electrons in a copper conductor; as a result, a spectrum of induction currents and a spectrum of alternating currents, which contain information on the spatial-temporal structure of the electromagnetic field, are produced.

The wavelike motion of the electrons in the physical system (elementary current) calibrates photons waves, in the process of their influence on the electrons when interacting calibration length of elementary current wave $\ell_{0e}$ is determined from the ratio of the single quantum of magnetic flux to the impulse of the first harmonic photon:

$$\ell_{0e} = \frac{2\Phi_0 e}{\pi P_{\tau 1}} \quad (11)$$

where $\Phi_0 = 2.06783461 \cdot 10^{-15}$ Wb—quantum of the magnetic flux;
e—elementary charge;
$P_{\tau 1}$—quantized impulse of the photons that produce the first harmonic.
Impulse of the first harmonic photon $P_{\tau 1} = 25.69401079$ kg·m/s.
Dimension and unit of calibration length of the elementary current are determined by using the equation (3):

$$dim\ell_{0e} = \frac{L^2 M T^{-2} I^{-1} TI}{MLT^{-1}} = L$$

$$[\ell_{0e}] = \frac{1 WB \cdot 1 KL}{1 \text{ kg} \cdot 1 \text{ m} \cdot 1 \text{ s}^{-1}} ==$$

$$\frac{1 \text{ kg} \cdot 1 \text{ m} \cdot 1 \text{ s}^{-2} \cdot 1 KL^{-1} \cdot 1 \text{ m}^{-1} \cdot 1 \text{ s} \cdot 1 \text{ m}^2 \cdot 1 KL}{1 \text{ kg} \cdot 1 \text{ m} \cdot 1 \text{ s}^{-1}} = m$$

Computation of the number value of calibration length of wave elementary current by formula (11):

$$\ell_{0e} = \frac{2 \cdot 2.06783461 \cdot 10^{-15} \cdot 1.60217733 \cdot 10^{-19}}{3.141592678 \cdot 25.69401079} == \quad (12)$$

$$0.820870407 \cdot 10^{-35} \text{ m}$$

Number value of calibration length wave of elementary current has meaning of the number value of Planck length order $L_0 \approx 10^{-35}$.

Thus, calibration length of Planck scale, which is connected with the quantum of the magnetic flux, is isolated in the electric current.

Calibration length of elementary current wave (12) and the calibration length of photon wave (9) are equalized:

$$\ell_{0e} = \ell_0$$

$$0.82087040 \cdot 10^{-35} \text{ m} = 0.82087041 \cdot 10^{-35} \text{ m}$$

Equality of number values of calibration length of elementary current and photon wave means that in interaction process of photon and electron of quantum system, photon wavelike motion transits into electron wavelike motion within the calibration length and calibration time of Planck scale.

In the system of a crystal lattice—electromagnetic field, there is a logical connection between photons and electrons, which is carried out through the interaction and the exchange of wavelike motion within the calibration length and calibration time of Planck scale.

The logical connection between photons and wavelike motion of the electrons is the basis for determining the structure of photons waves within the calibration length and calibration time by the structure of electrons waves in quantum system.

Scaling of the waves of the photons by the quantum system. The description of this process is carried out through the instrumentality of the concept of quasiparticle.

"Quasiparticles—elementary excitation of condensed matter (solid state, liquid), which behaves in some interconnections as quantum particle. Such an excitation is generally related not to the oscillation of a singular particle, but to the coordinated oscillation of many (or all) particles of the system.
. . . The interaction of particles does not lead to the excitement of one of them in localized way, but it is transferred to neighboring atoms—it is emitted as a wave of excitement with some frequency ω and wave vector k (ω is a function k). In accordance with the corpuscular-wave dualism, a quasiparticle having impulse p=ℏk and energy ε=ℏω, and is compared with this wave, . . . . (State of quasiparticles in a the crystal is characterized with quasiimpulse p and quasiparticles energy is a periodic function p)" [3, p. 195].

The concept of "quasiparticle" explains the process of scaling the photons waves by quantum system. When photons of electromagnetic field excites electrons of quantum system, wavelike motion of many free particles is coordinated in accordance with the principle of superposition:

"This principle, particularly well known for electromagnetic waves, may be called as "the principle of waves imposing without their mutual distortion". For example, if two electromagnetic waves are superposed, then density of electric (magnetic) field at any value in space is the sum of destiny of electric (magnetic) fields" [3, p. 17].

Thus, in accordance with the principle of superposition quantum systems of material increment the size of photons waves by increasing the number of calibration waves of identical electrons "without their mutual distortion", which means that ACs and alternating voltages, which are induced by electromagnetic field, are the increased image of calibration photons flux.

Change of the image size with the preservation of proportions is called scaling of image. Change of size of calibration waves of photons and electrons occurs in electromagnetism phenomenon: scaling of photons and electrons waves—change of calibration waves size with the preservation of proportions. By the scaling is meant both an increment and a decrement in the size of the calibration waves.

Combination of Essential Features of the Invention, Based on the Scaling of the Waves of Photons and Electrons When excitation of analyzed material electrons, its quantum system radiates scaled waves of photons, which excite scaled waves of electrons (current, voltage) in electromagnetic transducers with preservation of the proportions of photons scaled waves, i.e. the transduction of wavelike motion of the photons to electrons is performed without scaling, thus single photons waves are isolated from scaled waves of photon-electron within calibration length and in the interval of calibration time of Planck scale; extracted from scalable waves photon-electron; state of the electrons in the quantum system is determined by the structure of waves of single photons, and their properties determine the structure of analyzed material radiating electromagnetic field. This combination of essential features of the method is new and eradicates following drawbacks of the prototype:

"The theoretical description and explanation of the properties of a condensed matter based on properties of molecules, atoms, ions and electrons of which it is composed, is a considerable difficulty due to the fact that the number of particles is huge ($10^{22}$-$10^{23}$ B 1 sm$^3$) and they strongly interact with each other" [3, p. 195].

Actions of the Isolation of Single Waves of Photons from Scaled Waves of the Photons Transition to a particular form of measurement and testing of availability, reliability, compliance with given parameters of objects material by proposed method, are performed by describing actions of isolation of singular waves of the photons from scaled waves of the photons in the electromagnetic transducer 2 of system, block diagram of which is shown in FIG. 1. To this effect, physical magnitudes are determined characterizing macro-phenomena used to describe combination and sequence of operations.

According to the physical model of the electromagnetic transducer shown in FIG. 4, the following concepts are used to describe scaled waves of the photons.

In some cases, Eddy currents or Foucault currents—eddy inductive bulk electrical current occurring in the ferromagnetic sample (FIG. 2A) as a result of the wavelike motion of electrons between the energy levels, which conditioned by the change of flux, which influence on the ferromagnet of the magnetic field, in time. In other cases, this can be avoided by using (1) a ferrite core of the sensor and (2) a direct sample of any material (e.g., aluminum, titanium, steel alloys, etc.). Because ferrites were invented to eliminate the effect of eddy currents, they only occur in electrically conductive type '2' samples that is being investigated.

Inductive sinusoidal current—a periodic electric current occurring in a conductor of measurement winding 11 (FIG. 2B) while changing of magnetic flux density running through this conductor, whose value varies according due to sinusoidal law. In this case, the potential of each conductor end varies with respect to the potential of conductor second end, alternately from the positive to the negative and conversely.

Alternating voltage—difference of potentials, in which its value and direction of electric potentials differential (polarity) varies over considered flow of time, and its changes are periodic in nature, which is conditioned by the inductive sinusoidal current.

In view of the foregoing, connection between the concepts describing the state of the quantum system and the concepts of eddy current method, stated differently—induction method, is established.

Vertically Scaled Photon Wave

As it follows from Josephson effect $\hbar\omega=2eu$ (the last prototype of the list of the invention analogues), electron, which interacts with photon, produces an elementary voltage (potential), whose amplitude equals:

$$U_{mni} = \frac{\hbar\omega_n}{2e} = \frac{2\pi\hbar}{2eT} = \frac{f_n h}{2e} = \frac{fh\nu_n}{2e} \qquad (13)$$

where: $h=2\pi\hbar$—Planck constant, energy quantum characterizing amplitude of the photon wave;
$\hbar$—Dirac constant;
$\omega_n$—angular velocity of constrained oscillations of an electron in conductor due to interaction with photon.

Angular velocity is equal to the product of alternating voltage frequency $f_n$—on $2\pi$:

$$\omega_n = 2\pi f_n = 2\pi f\nu_n \qquad (14)$$

where $f_n$—frequency of voltage oscillations, which is equal to the product of excitation frequency of electron f on photon frequency $\nu_n$:

$$f_n = f\nu_n \qquad (15)$$

Amplitude of single electromagnetic wave, which is expressed in terms of voltage, is determined by using the equation (13):

$$U_{mni}2e = fh\nu_n \qquad (16)$$

Proceeding from equation (16), product $U_{mni}2e$ is substituted instead of product $fh\nu_n$ in the equation (1), this change gives the equation of energy of magnetic component of single electromagnetic wave (of the i-th spectral line), which is expressed in terms of voltage amplitude:

$$W_{ni} = f\varepsilon_{ni} = fh\nu_{ni}\sin(n\pi + \alpha_{ni}) = U_{mni}2e\sin\left(\frac{2\pi t_0}{T_{ni}} + \alpha_{ni}\right) \qquad (17)$$

Dividing of expression (17) by 2e gives the equation of voltage, which varies in time according to the periodic sinusoidal regularity:

$$u_{ni} = \frac{W_{ni}}{2e} = U_{mni}\sin\left(\frac{2\pi t_0}{T_{ni}} + \alpha_{ni}\right) = \frac{fh\nu_{ni}}{2e}\sin(n\pi + \alpha_{ni}) \qquad (18)$$

In expression (18) ratio of two constants is equal to the quantum of the magnetic flux—to the fundamental physical constant:

$$\Phi_0 = \frac{h}{2e} = 2.06783461 \cdot 10^{-15}\,\text{Wb}$$

Quantum of the magnetic flux $\Phi_0$ is substituted in the equation (18):

$$u_{ni} = \qquad (19)$$
$$U_{mni}\sin\left(\frac{2\pi t_0}{T_{ni}} + \alpha_{ni}\right) = f\Phi_0\nu_{ni}\sin(n\pi + \alpha_{ni}) == \frac{fh\nu_{ni}}{2e}\min(n\pi + \alpha_{ni})$$

Comparison of equation (3) with equation (19) shows that the expression in the brackets $(n\pi+\alpha_n)$—wave phase of photon (3) and phase of alternating voltage (19) is identical, and amplitudes differ in the measure characterizing oscillations value: in individual photon—energy quantum h, in alternating voltage—frequency of photons radiation (excitation) f.

Equation (19) describes the induction of alternating voltage in the measurement winding by photon flux according to the law of electromagnetic induction. In the brackets of equality (19) there is the representation of the structure of: 1) alternating voltage wave; 2) wave of quantum of the magnetic flux; 3) wave of single photon, and the structure of these waves is the same, it does not change in the process of induction of alternating voltage by photons flux. This means that equality (19) presents the vertical scaling of individual photons wave. The first (left) expression of equality (19) represents the vertical scaling of wave of the single photon by voltage amplitude $U_{mni}$ proportional to the frequency of AC f in the circuit of the measurement winding. The second expression of equality (19) $f\Phi_0\nu_{ni}$ represents scaling of photon determined by the frequency f of the interaction of photons with electrons, which is presented by quantum of magnetic flux. The third expression of equality (19) represents the vertical scaling of individual photon wave, proportional to the increment of frequency of photons excitation fhv$_{ni}$, for example, proportional to the increment of AC frequency in the circuit of the magnetizing winding 10 (FIG. 2A and FIG. 2B).

Thus, vertical scaling of the photon wave, with the preservation of wave structure, is carried out by increasing the number of photons in the spectral line per unit time. And isolation of photons from the spectral line may be carried out by measuring voltage and frequency of current in the measurement winding, as well as the current frequency in magnetizing winding.

Photon isolation is performed by measuring current frequency in magnetizing winding 10 of electromagnetic transducer 8 (FIG. 2B).

Equation of harmonic current oscillation in the circuit of magnetizing winding 10:

i=l$_m$ sin ωt where l$_m$—amplitude of current;

ωt—phase of harmonic oscillations.

Angular frequency ω—value equals to the product of current oscillations frequency on 2π ω=2πf.

Frequency of periodic oscillations f—number of oscillation periods per unit time:

$$f = \frac{1}{T}.$$

Oscillations frequency T—time interval during which the phase of harmonic oscillations varies by 2π.

Phase of oscillation is expressed in terms of physical magnitudes that characterize oscillations:

$$\omega t = 2\pi f t = \frac{2\pi t}{T}$$

When single amplitude of AC is generated, electrons radiate photons, so the number of photons producing spectral lines per unit time is equal to the number of half-times of the current oscillations n$_f$, which is computed by using the formula:

$$n_f = 2ft = \frac{t}{T/2} \qquad (20)$$

Horizontally Scaled Photon Wave

Each spectral line of the primary electromagnetic field derives from individual electrons that produce a current in conductor of magnetizing winding (FIG. 4). Accordingly, the number of spectral lines of the primary electromagnetic field is determined by the number of electrons radiating photons fluxes Φ$_{m1}$ that produce this field.

Each spectral line of the secondary electromagnetic field is derived out excited electrons in the energy bands of the material producing eddy currents (FIG. 4). Accordingly, the number of excited electrons in quantum systems is determined by the number of spectral lines of the electromagnetic field produced by photons fluxes radiated by the material.

Horizontal scaling of the photon wave is performed by multiplication of all parts of equation (19) by n$_{Bn}$—number of spectral lines crossing loops of measurement winding. Voltage generated at the ends of measurement winding has the value which is equal to current l$_{mn}$ multiplied by the total resistance of the winding R: U$_{mn}$=l$_{mn}$R. Thus, voltage u$_n$ of n-th harmonic consists of n$_{Bn}$—number which is the sum of n-th quantized voltage u$_{ni}$ generated by single electrons, which perform oscillatory motions over time with harmonic regularity (19):

$$u_n = k_U n_{Bn} u_{ni} = k_U n_{Bn} U_{mni} \sin\left(\frac{2\pi t_0}{T_n} + \alpha_n\right) = \qquad (21)$$

$$U_{mn} \sin\left(\frac{2\pi t_0}{T_n} + \alpha_n\right) = = k_U n_{Bn} f \Phi_0 v_n \sin(n\pi + \alpha_n)$$

where: u$_n$—voltage of n-th harmonic;

k$_U$—coefficient for coordination of the number of spectral lines corresponding to one volt, with the number of spectral lines corresponding to one tesla and one ampere;

n$_{Bn}$ number of measured spectral lines;

U$_{mn}$=n$_{Bn}$U$_{mni}$—amplitude of n-th harmonic;

v$_n$—photon frequency of n-th harmonic;

(nπ+α$_n$)—phase of photon wave n-th harmonic;

f—current frequency in magnetizing winding;

ΦP$_0$—quantum of magnetic flux.

Thus, equation (21) represents the scaling of photon wave by voltage increment, which is due to increment of the number of spectral lines.

On the basis of equation (21), structure of the photon wave is isolated from alternating voltage (scaled photon wave) by comparing the relations of components of the alternating voltage spectra:

$$\frac{[U_{mn}\sin(n_n\pi + \alpha_n)]_{met}}{[U_{mn}\sin(n_n\pi + \alpha_n)]_{ref}} = \qquad (22)$$

$$\frac{[k_U n_{Bn} f v_n \Phi_0 \sin(n_n\pi + \alpha_n)]_{met}}{[k_U n_{Bn} f v_n \Phi_0 \sin(n_n\pi + \alpha_n)]_{ref}} = = \frac{[2k_U n_{Bn} f e h v_n \sin(n_n\pi + \alpha_n)]_{met}}{[2k_U n_{Bn} f e h v_n \sin(n_n\pi + \alpha_n)]_{ref}}$$

The left part of (22) shows the relation of harmonic oscillations of voltage being measured, to reference, the middle part shows the relation of harmonic oscillations of quanta of magnetic flux, and the right part shows the relation of oscillation of photons waves interacting with electrons in the quantum system.

Thus, as it is clear from equation (22), the particular form of measurement and testing of availability, reliability, compliance to the given parameters of objects material, contains elements (left and middle part of (22)), which develop and refine some aspects of the features.

One of the methods discussed earlier, which differs in the fact that combination an sequence of operations are performed with the physical magnitudes characterizing physical phenomena in electromagnetic transducer: DCs and ACs in magnetizing and bias windings, magnetic flux density, strength, residual magnetic flux density, coercivity, spectrum of AC, which is induced in the measurement winding by electromagnetic radiation spectrum of material, and connection between basic values characterizing voltage and structure of electromagnetic field is determined by the following ratio:

$$u_s = \sum_n U_{mn} \sin\left(\frac{2\pi t_0}{T_n} + \alpha_n\right) = U_{m1}\sin(\pi + \alpha_1) + + U_{m2}\sin(2n + \alpha_2) + \qquad (23)$$

$$U_{m3}\sin(3\pi + \alpha_3) + \ldots + U_{mn}\sin(n\pi + \alpha_n)$$

Present method is implemented by using system devices as follows.

Current is excited in magnetizing and primary windings of the electromagnetic transducer and magnitude and frequency of voltage current, which induced by primary electromagnetic field without ferromagnet in the measurement winding, amplitude, frequency, phase of spectrum components of voltage induced by secondary electromagnetic radiation spectrum with ferromagnet in measurement winding, and magnetic flux density of the primary magnetic field and components of electromagnetic radiation spectrum of ferromagnet are determined by true value of the voltage spectrum.

Number of electrons radiating photons of the primary electromagnetic field is determined by the value of current in the conductor; this number presents the number of spectral lines deriving from current conductor.

Number of spectral lines of components of ferromagnetic radiation spectrum is determined by magnetic flux density, and number of excited electrons in ferromagnetic energy bands is determined by number of spectral lines.

Density of the photons is determined by frequency of excitation of the photons (frequency of tact) during the production of spectral lines.

On the basis of relation of the voltage of electromagnetic radiation spectrum to reference voltage of corresponding frequency, scaled waves of photons of electromagnetic waves are determined by parameters specifying frequency, energy, photons polarization, by which the state of free electrons in the energy bands of crystal material are judged on.

Then regularity of the connection between crystal lattice structure and state of free electrons in the energy bands is determined, and determination of structure and physical and mechanical properties of tested objects, diagnostics of technical state of constructions in working condition, etc. are conducted on the basis of regularities of connection.

Examples of Definite Application (Embodiment) of the Invention

The basis of experimental investigation of the phenomenon of production, emission and disappearance of energy quanta which produce the space-time structure of electromagnetic field is eddy current method based on eddy current excitation in sample and measurement of secondary electromagnetic fields excited by these currents. This method is implemented with the help of an electromagnetic transducer 2 (FIG. 1), which consists of two elements—electromagnetic transducers 8 and 9 (FIG. 2B). An element construction 8 is shown in FIG. 2A. Designations: 10—magnetizing winding, 11—measurement winding, 12—bias winding, 13—ferromagnetic core. An element scheme 9 is shown in FIG. 2B, it consists of two windings: 14—primary winding, 15—measurement winding. A scheme of a sequential connection of magnetizing winding 10 of element 8 and primary winding 14 of element 9 having the same number of loops is shown in FIG. 2B.

Transducer 9 does not have ferromagnetic core, and as the number of loops of windings 10 and 14 is the same, energy of the electromagnetic field produced by an AC in the magnetizing winding 15 may be judged by the value of EMF provided in measurement winding 15.

Table 1 represents the structural data of the electromagnetic energy transducer 2.

TABLE 1

Electromagnetic transducer 2: elements 8 and 9

| Numbering in FIG. 2A, FIG. 2B | Construction | Number of loops | Material |
|---|---|---|---|
| 10, 14 | Magnetizing and primary windings $W_m = W'_m$ | 490 | PEL- 0, 33 |
| 11, 15 | Measurement winding $W_{me} = W'_{me}$ | 30 | PEL- 0, 22 |
| 12 | Bias winding $W_{ma}$ | 830 | PEN- 01 |
| 13 | Ferromagnetic sample | — | Alloy 80NSC |

Analyzed sample is two standard L-shaped alloy plates 80NSC: $\delta$=0.35 mm, b=5.93 mm, L=51 mm. Plates produce a closed core. When passing AC in a magnetizing winding 10, alternating electromagnetic field is produced, which produces eddy currents in the ferromagnetic sample—the motion of the electrons in the energy bands between the energy levels. Excited electrons produce the spectrum of electromagnetic radiation, which intersects the turns of the measurement winding 11 and leads to a voltages spectrum.

Measurement of components of voltages spectrum at the ends of the winding 11 is carried out with the help of analyzer 3, manipulator 6, voltmeter 31, oscilloscope 29 and phase-sensitive voltmeter 32. Voltage at the ends of the measurement winding 15, in a winding without a core, is measured by a voltmeter 30 (FIG. 3).

Basic concepts and measurements definitions.

The following concepts are related to the measurements.

1. True value of the measured value is a value that is free from error (error).
2. Valid value of measured value is the value obtained as a result of measurement with a permissible error.
3. Measuring transducer is a device by which the functional transformation of the measured value into an additional more convenient for further transduction and measurement of the value is carried out.
4. Measuring instruments are known devices and apparatus, by means of which measurements of physical magnitudes are carried out. The exemplary measuring instruments used in the present invention are shown in Table 2.

In the experimental study of the phenomena of electromagnetism, three groups of measurements were used: direct, indirect, compatible.

In direct measuring, measured value was directly determined; in indirect measurements, desired value was represented as an explicit function of directly measured values; in compatible measurements, the desired values were represented as implicit functions of directly measured values.

By the accuracy of the measurements of individual parameters, for example, the photon frequency, the measurements were accurate. When measuring other parameters, the error of measurement was determined by the characteristics of the measuring apparatus, and these measurements are related to the technical ones.

Measurement Errors

Difference $\Delta$ between measurement result $X_n$ and true value of measured value X is called the absolute error:

$$\Delta = X_n - X \quad (24)$$

TABLE 2

List of technical instruments provided in the produce of an example for implementation of the claimed invention

| Nos. | Designations in FIG. 3 | Name of devices, transducers, additional apparatus | Factory-manufacturer |
|---|---|---|---|
| 1 | 16 | Generator F578 | Kiev factory "Tochelektropribor" |
| 2 | 17, 5 | Transistorized null meter of AC F582 | Kiev factory "Tochelektropribor" |
| 3 | 3 | Electronic null indicator of AC F550 | Kiev factory "Tochelektropribor" |
| 4 | 30, 31 | Electronic voltmeter ammeter F563 | Kiev factory "Tochelektropribor" |
| 5 | 29 | Oscilloscope S1-13A Oscilloscope S1-74 | |
| 6 | 19 | Transistorized amplifier of device power VS-10P | "Elecktrotochpribor", Chisinau |
| 7 | 20, 22 | Device Ts4312 | — |
| 8 | 24 | Selsyn motor SS-405 | — |
| 9 | 18 | Potentiometer | — |
| 10 | 21 | Autotransformer RNO-250-2 with rectifier | — |
| 11 | 25-27 | Selector swith | — |
| 12 | 28 | Reversing switch | — |
| 13 | 32 | Phase-sensitive voltmeter | — |

Error $\Delta$ is a random value and is represented as:

$$\Delta = \Delta_s + \Delta° \quad (25)$$

where $\Delta_s$—systematic error, mathematical expectation of value $\Delta$, and $\Delta°$—random error with zero mathematical expectation.

To take into account systematic errors, discover of their generation causes was implemented, and then either their exclusion (if possible) or an appropriate correction was made. The final result is accepted as $X_{cor}$—corrected measurement result:

$$X_{cor} = X_n - \Delta_s \quad (26)$$

The random error $\Delta°$ is not implemented because specific value of the random value $\Delta$ is unknown in this measurement.

Exclusion of Systematic Errors
1. Error, which is conditioned by structural parameters of analyzer of voltages spectra.
2. Error introduced by analyzer 3 in the circuit of measurement consists of two systematic errors: amplitude and phase.

Determination of amplitude and phase error of the analyzer 3 (FIG. 3) was implemented as follows.

Contacts a-c of transducers 25 and 26 were closed, and transducer 27 was initially set at the position c for measuring amplitude and phase of standard voltage at the analyzer input 3, and then at the position b, in a purpose of measuring these parameters at the analyzer output 3. Standard voltage was derived out of generator 23, its frequency was chosen equal to the frequency of EMF spectrum components, which is induced by of electromagnetic waves spectrum in the measurement winding.

Amplitude error is equal to the gain $K_n$ of analyzer 3 for n-th harmonics. Analyzer input receives the true value of the harmonic voltage directly from the measurement winding 11 (FIG. 2B), and the analyzer 3 amplifies it in $K_n$ times. To determine the true value of harmonic voltage, the gain of analyzer 3 was determined for each harmonic, which is measured:

$$K_n = \frac{U_{nout}}{U_{nin}} \quad (27)$$

where $U_{nin}$—voltage of n-th harmonic at analyzer 3 input, $U_{nout}$—voltage at analyzer 3 output.

Table 3 shows value of the gain $K_n$, which are computed by the formula (27).

TABLE 3

Gain of analyzer 3 at sensitivity 40 dB for different frequencies, harmonic voltage, which are measured.

| f | Hz | 50 | 100 | 150 | 200 | 250 | 300 | 350 | 450 |
|---|---|---|---|---|---|---|---|---|---|
| $K_n$ | — | 273 | 260 | 260 | 508 | 508 | 610 | 610 | 580 |
| f | Hz | 500 | 750 | 1000 | 1250 | 1500 | 2500 | 3000 | 5000 |
| $K_n$ | — | 625 | 630 | 266 | 370 | 250 | 508 | 640 | 660 |

Analyzer 3 has discrete switching of sensitivity limit: 10 dB, 20 dB, 30 dB, 40 dB, 60 dB. The results of measurements carried out with sensitivity 10 dB, 20 dB, 30 dB, and 40 dB, were accounted relatively sensitivity 40 dB then the true value of voltage at analyzer 3 input is determined by using the formula:

$$U_{nin} = \frac{U_{n40}}{K_n} \quad (28)$$

Phase Error

Figure 24:
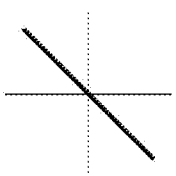
FIG. 24 shows a comparison of signal phase at the input and output of an analyzer.
Figure 24:
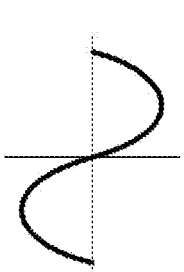
Figure 24:
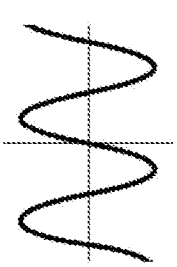
Figure 24:
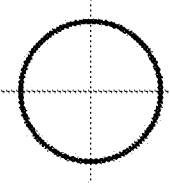
Figure 24:
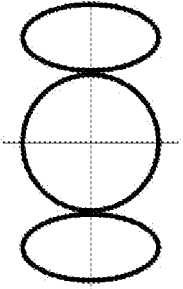
Figure 24:
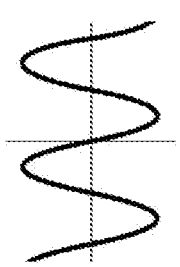

Phase error is the phase shift introduced by analyzer 3 into the measuring circuit (FIG. 24).

The phase shift introduced by analyzer 3 into the measuring circuit is determined by using Lissajous figures which are presented in FIG. 24. Oscillograms at analyzer 3 input were put by using phase shifter 24 (FIG. 3) in straight line for the first harmonic, and in fitted curves for each higher harmonic, whereof it follows that the phase shift between voltage and reference voltage harmonics is equal to zero. Voltage of each of these harmonics measured at the analyzer 3 output relatively to the same reference voltage, troduced Lissajous figures, which presents phase shift for the first and the third harmonics on 90° and for the fifth harmonic on 180°. This is the phase error of analyzer 3.

Phase error of analyzer 3 is constant, since switching of frequencies in it is carried out discretely. Such an error is taken into account in the process of analyzing the measurement results.

Error of Measuring Instruments

1. Generator of frequency F578 is a source of electrical harmonious sinusoidal oscillations in frequency band from 20 Hz to 10 kHz.

Frequency setting is performed with error ±2% at most during rebuilding, and ±0.5% at most at fixed setting.

Frequency withdrawal after 15 min of previous heating does not exceed ±(2%÷1 Hz) of the set frequency value at any time of work. The coefficient of nonlinear distortion of the generator at rated resistance to load and output power 1 W does not exceed 2% in frequency band from 100 Hz to 5 kHz.

To exclude the error of the nonlinear distortions of generator in excitation circuit of electromagnetic transducer, between the generator and the power amplifier, actuated analyzer 17 (FIG. 3), which allocates sinusoidal voltage of the main frequency, is included. The analyzer 17 has an oscillographic indicator, by using of which generator frequency is tested, and thereby error of frequency setting is removed.

2. The electronic indicator of zero of AC F550 is a highly sensitive electronic selective amplifier of AC operating in the frequency band 20÷100000 Hz. Specified frequency band is divided into three subbands. Subband frequency setting is performed discretely. Error of frequency setting does not exceed ±2.5% at frequency band 20 Hz÷20 kHz. The instability of the frequency of adjustment of the device does not exceed ±0.3%.

The device has a stepped regulation, which weakens sensitivity at symmetric and asymmetric inputs "Y" not less than 120 dB.

3. The selective electron-beam zero-indicator of AC F582 was used as a preliminary selective amplifier for transformation with small output levels of signal.

Operating band of device frequencies is from 20 Hz to 200 kHz.

Error of frequency setting is not greater than ±5% of set frequency.

4. Voltmeter ammeter F563 portable with a light pointer measures the current value of altering voltage and currents of the sinusoidal curve with a significantly curved produce in the frequency band from 10 Hz to 0.2 MHz.

The current (effective) voltage value is equal to the root-mean-square value of the instantaneous values for the period:

$$U_{nin} = \frac{U_{n40}}{K_n} \quad (29)$$

For a certain form of voltage being measured, there are transfer coefficients determining a connection between the three voltage values: amplitude, active, and half-period mean. These coefficients include the amplitude coefficient, which is equal to the relation of the peak value to active value:

$$K_a = \frac{U_m}{U} \quad (30)$$

and the coefficient of the form equal to relation of active value to half-period mean value:

$$K_{sf} = \frac{U}{U_{av}} \quad (31)$$

For sinusoidal voltage $K_a$=1.41, and $K_{sf}$=1.11.

Amplitude of components of voltage spectrum was determined in investigation proceeding from equation (30):

$$U_m = K_a U \quad (32)$$

The limits of the basic permissible error of voltmeter ammeter F563 in the frequency band from 40 Hz to 20000 Hz, expressed as a percentage of the final value of operating part of the scale, do not exceed ±5% for all measurement bands.

5. Multifunctional impulsed oscilloscope S1-1 is a laboratory device and is intended for visual observation of impulsed and periodic electrical signals, measurement of amplitudes and duration of analized signals.

Pass band of vertical deflection from 20 Hz to 15 MHz with non-uniformity 3 dB, and with incidence of no more than 6 dB till 20 MHz. Pass band of vertical deflection from 1 Hz to 1.5 MHz with non-uniformity of frequency response no more than 3 dB.

6. Two-beam general-purpose oscilloscope S1-74 designed to analyze the form of two single or periodic electrical signals by visual observation or photographing.

The basic error of coefficients of time bases of horizontal deflection channel is 4%.

Methods of Measurement of Physical Magnitudes Determining the Structure of Electromagnetic Field AC in circuit of the bias winding (FIG. 3): 6-17-18-25-19-20-2-10 increased by the instrumentality of voltage regulator 18 from zero degrees till getting the saturation of magnetic ferromagnets. At each degree current value was measured with millimeter 20, and modulus and phase corresponding to this current of the first, third and fifth harmonic induced in the measurement windings of electromagnetic radiation spectrum and which comes from measurement winding to measuring device circle-wise: 11-6-3-31-32, were measured simultaneously.

Remagnetization of a ferromagnet was carried out by AC of voluntary-selected frequency: 50 Hz, 150 Hz, 250 Hz, 500 Hz, 1000 Hz.

Analyzer 3 has a discrete switching of sensitivity limits: 10 dB, 20 dB, 30 dB, 40 dB, 60 dB. The results of measurements carried out at sensitivity 10 dB, 20 dB, 30 dB, 60 dB and were re-counted relative to sensitivity 40 dB. At small AC values in remagnetization winding, voltage at analyzer output was measured at sensitivity 30 dB. In this case, voltage modulus, which was measured, amplified $k_1$ times with relation to sensitivity 40 dB. Therefore, measured voltage value was corrected with relation to sensitivity by using the formula:

$$U_{40} = \frac{U_{30}}{k_1} \quad (33)$$

When ferromagnet is remagnetized is a scope of magnetization saturation, voltage measurement of the spectrum components was carried out at analyzer sensitivity 60 dB and more. In this case, the measured voltage module $k_2$ times less than value of the measured sensitivity. Therefore, measured voltage values were corrected with the relation to sensitivity 40 dB by using the formula:

$$U_{40} = U_{60} k_2 \quad (34)$$

Voltage values of harmonic $U_n$ measured at analyzer 3 output and brought to sensitivity 40 dB were used to compute active value of voltage $U_{nin}$ at analyzer 3 input by using the formula:

$$U_{nin} = \frac{U_n}{K_N} \quad (35)$$

where $K_N$—gain of analyzer by n-th harmonic.

Determination of Magnetic Flux Density

Magnetic flux density of electromagnetic field produced by current in magnetization winding and the components of electromagnetic radiation spectrum of ferromagnet was determined by the equation:

$$B_n = \frac{U_n}{4.44 f_n S W} \quad (36)$$

The number of loops of the measurement winding W=30, conductor PEL—0.22 in diameter d=0.22 mm. Winding loops are wound in one layer on a plate with permalloy 80NSC δ=5.93 mm wide, so one side of winding is determined taking into account wire diameter $2d$, the thickness of insulating pad $2\delta_{in}$=0.37 mm and the width of plate 6:

$$b_1 = 2d + 2\delta_{in} + b = 0.44 + 0.37 + 5.93 = 0.00674 \text{ m}$$

The second side of winding a is equal to two wire diameters, because only electromagnetic field flux which crosses winding loops is taken into account:

$$a = 2d = 2 \cdot 0.22 = 0.00044 \text{ m}$$

Then surface area of cross section of loops inter-crossed by the electromagnetic field is equal to:

$$S = b_1 a = 0.00674 \cdot 0.00044 = 2.965 \cdot 10^{-6} \text{ m}^2$$

Substituting values S and W in equation (36) gives magnetic flux density value:

$$B_n = \frac{U_n \cdot 10^6}{394.9 \cdot f_n s} \quad (37)$$

where s=1 m²—the unit area that coordinates the dimension.

Equation (37) determines the magnetic flux density of magnetizing field and components of electromagnetic radiation spectrum by substituting the values of the voltage $U_{nin}$ and frequency $f_n$ of harmonics.

Examples of the results of magnetic flux density computation according to the described method for one measurement are given in Table 5 and Table 6.

Values of AC i in the magnetizing winding 10 and primary winding 14 (FIG. 2B) are given in Table 5 in the first column, and in the second column includes values of voltage at analyzer output of harmonic 3 frequency which are measured in the absence of ferromagnetic sample in electromagnetic transducer. Frequency of remagnetization is indicated near the voltage symbol, for example, the voltage measured at frequency of remagnetization 150 Hz is indicated as $U_{150}$. Voltage measured at the ends of the measurement winding 15 of element 9 of electromagnetic transducer without a ferromagnetic sample (FIG. 2B) is necessary to determine true value of energy of electromagnetic field that remagnetizes the ferromagnet in element 8 with a different frequency of this field.

TABLE 5

Magnetic flux density of an electromagnetic field without a ferromagnet

| i | $U_{0out}$ | $U_{0in} = \frac{U_{0out}}{K_n}$ | $B_{0in} = \frac{U_{0in} \cdot 10^6}{394.9 \cdot f_n s}$ |
|---|---|---|---|
| 1 | 2 | 3 | 4 |
| 200 mA | $1954 \cdot 10^{-4}$ V | $715750 \cdot 10^{-9}$ V | $362460 \cdot 10^{-8}$ T |

In the third and the fourth columns of Table 5, computation values of voltage $U_{0in}$ and magnetic flux density $B_{0in}$ at the analyzer input are given.

Magnetic flux density of harmonic of electromagnetic field that radiates ferromagnetic in the process of remagnetization by alternating electromagnetic field produced by a current in circuit of the winding 10 was determined by the method shown in Table 6.

Table 5 prepared subsequent to the results of measuring EMF spectrum induced in measurement winding 11 by electromagnetic spectrum radiated by ferromagnetic sample in process of its remagnetization by electromagnetic field produced by AC flowing in magnetizing winding 10 (FIG. 2B).

TABLE 6

Magnetic flux density of radiation spectrum of the ferromagnet

| i | $B_{0in}$ | $U_{out}$ | $U_{nin} = \frac{U_n}{K_n}$ | $B_{nin} = \frac{U_{nin} \cdot 10^6}{394.9 \cdot f_n s}$ | $B_{nin} - B_{0in}$ |
|---|---|---|---|---|---|
| 1 | 2 | 3 | 4 | 5 | 6 |
| 200 mA | $362460 \cdot 10^{-7}$ T | $32 \cdot 10^{-1}$ V | $117216 \cdot 10^{-7}$ V | $593589 \cdot 10^{-6}$ T | $557343 \cdot 10^{-6}$ T |

The first column includes the same values of current remagnetization as in Table 5.

In the second column, calculated values of magnetic flux density, values of which are taken from the fourth column in Table 5, are given.

The third column of Table 6 includes measured active voltages of the first, the third, the fifth harmonics at analyzer 3 output for five frequency saturation modes of remagnetization of ferromagnetic sample.

The fourth column of Table 6 includes calculated values of voltage of $U_{nin}$ harmonic at analyzer 3 input.

In the fifth column of Table 6, values of magnetic flux density of harmonic $B_{nin}$ of electromagnetic field of radiation, which are calculated by the formula.

In the sixth column of Table 6, values of difference in magnetic flux density $(B_{nin}-B_{0in})$ of first harmonic measured in the presence of ferromagnetic sample in winding 10 of element 8 and in the absence of ferromagnetic sample in winding 14 of element 9 are given (FIG. 2B).

Examples of the Implementation of the Present Invention

Example 1. Determination of the Number of Spectral Lines of the Electromagnetic Field Produced by Current in the Winding without the Ferromagnet The regularity of the connection between the increment in current in the primary winding 14 and magnetic flux density of the electromagnetic field, which is produced by this current. Pulsating magnetic field crosses the loops of measurement winding 15 of the element 9 (FIG. 2B) and induces a voltage (EMF) in it, in magnitude of which induction of magnetic field is determined for five frequency saturation modes of remagnetization. The index of the symbol for the indication of magnetic flux density specifies the frequency of alternating electromagnetic (pulsating) field, which produces AC in the primary winding without ferromagnet, for example, the voltage measured at the frequency of remagnetization 150 Hz is indicated as $U_{150}$.

TABLE 7

Induction of magnetic field crossing the loops of the measurement winding 15 of the element 9 without the ferromagnet for different frequencies of electromagnetic field

| I mA | $B_{50}$ T | $B_{150}$ T | $B_{250}$ T | $B_{500}$ T | $B_{1000}$ T |
|---|---|---|---|---|---|
| 10.0 | 180785 · 10⁻⁸ | 180636 · 10⁻⁸ | 180290 · 10⁻⁸ | 179731 · 10⁻⁸ | 180211 · 10⁻⁸ |
| 100.0 | 184828 · 10⁻⁷ | 181935 · 10⁻⁷ | 181307 · 10⁻⁷ | 181311 · 10⁻⁷ | 180878 · 10⁻⁷ |
| 500.0 | 895839 10⁻⁷ | 892794 · 10⁻⁷ | 893279 · 10⁻⁷ | 891370 · 10⁻⁷ | 888832 · 10⁻⁷ |

For example, in Table 7, three values of current 10 mA, 100 mA and 500 mA are given, and, for each current, the number value of magnetic flux density computed according to the method of Table 5 is subscribed.

Proceeding from data of Table 7 it follows that with the increment of the frequency of electromagnetic field in three, five, ten, twenty times, magnetic flux density of this field for the same current in the winding 14 (FIG. 2B) remains unchanged and, accordingly, determination of the mean value of induction for each current is carried out by using the formula:

$$B_{av} = \frac{1}{5}(B_{50} + B_{150} + B_{250} + B_{500} + B_{1000}) = \frac{1}{5}\sum_{k=1}^{5} B_k \tag{38}$$

Current in the winding 10 mA: $B_{av10}=180330\cdot 10^{-8}$ T
Current in the winding 100 mA: $B_{av100}=182055\cdot 10^{-7}$ T
Current in the winding 500 mA: $B_{av500}=892422\cdot 10^{-7}$ T Then Table 8 provides a comparative analysis of increments of current and magnetic flux density.

Determination of the error of measurement of magnetic flux density increment.

1. Band of current increment $\Delta I_1=10\div 100$ mA

Absolute error of measurement result of magnetic flux density increase:

$$\Delta_1 = X_{\Delta B_1} - X_{\Delta I_1} = 10.09 - 10 = 0.09 \tag{39}$$

TABLE 8

Comparison of increments of current and magnetic flux density

| Current increment, mA | Current increment in times | Magnetic flux density increase by times |
|---|---|---|
| $\Delta I_1 = 10 \div 100$ | $X_{\Delta I_1} = \frac{100}{10} = 10$ | $X_{\Delta B_1} = \frac{182051\cdot 10^{-7}}{180330\cdot 10^{-8}} = 10.09$ |
| $\Delta I_2 = 100 \div 500$ | $X_{\Delta I_2} = \frac{500}{100} = 5$ | $X_{\Delta B_2} = \frac{892422\cdot 10^{-7}}{182051\cdot 10^{-7}} = 4.9$ |

Relative error of measurement of magnetic flux density increment:

$$\delta_1 = \frac{\Delta_1}{X_{\Delta I_1}} 100\% = \frac{0.09}{10} 100\% = 0.9\% \tag{40}$$

3. Band of current increment $\Delta I_2=100\div 500$ mA

Absolute error of measurement result of magnetic flux density increment:

$$\Delta_2 = X_{\Delta B_2} - X_{\Delta I_2} = 4.9 - 5 = -0.1 \tag{41}$$

Relative error of measurement result of magnetic flux density increment:

$$\delta_2 = \frac{\Delta_2}{X_{\Delta I_2}} 100\% = -\frac{0.1}{5} 100\% = -2\% \tag{42}$$

In the band of current increment $\Delta I=10\div 500$ mA relative error of measurement of magnetic flux density increment $\delta=\pm(0.9\div 2\%)$.

Error of devices is involved in investigation for the purpose of comparison.

Generator F578. Setting the frequency with the error is no more than ±(2%÷1 Hz).

Electronic zero indicator F550. Frequency setting error does not exceed ±2.5% in the frequency band 20 Hz÷20 kHz.

Voltmeter ammeter F563. Limits of admissible basic error do not exceed ±5% for all measurements bands.

Thus, in the band of AC increment ΔI=10÷500 mA flowing in the winding, relative error of measurement of magnetic flux density increment of electromagnetic field inside the winding, depending on current increment, does not exceed the error of the measuring devices used in the investigation. This means that the following regular connection is experimentally established:

the number of spectral lines of alternating electromagnetic field inside the winding, which is produced by AC, changes in direct proportion to the change in the modulus of this current, i.e, is directly proportional to the number of excited electrons in wire of the winding.

Determination of the Number of Electrons by the Magnitude of Current and by the Number of Spectral Lines of Electromagnetic Field An experimentally established regular connection between current in the winding and magnetic flux density (Table 8) empirically confirms the equality between the number of lines of magnetic flux density $n_T$ and the number of excited electrons $n_A$ producing current in conductor:

$$n_T = n_A = 6.2415063 \cdot 10^{18} \quad (43)$$

Proceeding from the regularity of the connection between current and magnetic flux density, as well as from equation (43), it follows that absolutely all electrons producing current in the conductor excite a magnetic flux in a physical vacuum, and as a result the number of spectral lines of magnetic flux density of electromagnetic radiation is equal to the number of electrons producing current in the conductor. This fact is the basis for determining the number of excited electrons, and, accordingly, the number of spectral lines of electromagnetic field of radiation, according to the equations given below.

The number of electrons $n_e$ producing current in wire of the winding is determined by the equation:

$$n_e = n_A I \frac{1}{I_A} = 6.2415063 \cdot 10^{18} I \frac{1}{I_A} \quad (44)$$

where: I—measured current value;
$I_A$=1A—current in one ampere.
As a result of computations performing:

current in the winding 10 mA: $n_{e10} = 6.2415063 \cdot 10^{18} \cdot 0.01 =$
$= 6.2415063 \cdot 10^{16}$ current in the winding 100 mA: $n_{e100} = 6.2415063 \cdot 10^{18} \cdot 0.1 =$
$= 6.2415063 \cdot 10^{17}$ current in the winding 500 mA: $n_{e500} = 6.2415063 \cdot 10^{18} \cdot 0.5 =$
$= 3.12075315 \cdot 10^{18}$ The number of spectral lines $n_{B_n}$ of electromagnetic field produced in the measurement winding is determined by the equation:

$$n_{B_n} = n_T B_n \frac{1}{B_T} = 6.2415063 \cdot 10^{18} B_n \frac{1}{B_T} \quad (45)$$

where: $B_n$—measured magnetic flux density value;
$B_T$=1T—magnetic flux density in one tesla.
As a result of computations performing:

magnetic flux density $B_{av10}$: $n_{B_{10}} = 180330 \cdot 10^{-8} \cdot 6.2415063 \cdot 10^{18} =$
$= 1.125530 \cdot 10^{16}$ magnetic flux density $B_{av100}$: $n_{B_{100}} = 182055 \cdot 10^{-7} \cdot 6.2415063 \cdot 10^{18} =$
$= 1.136301 \cdot 10^{17}$ magnetic flux density $B_{av500}$: $n_{500} = 892422 \cdot 10^{-7} \cdot 6.2415063 \cdot 10^{18} =$
$= 5.570057 \cdot 10^{17}$ Determination of the Number of Spectral Lines of Electromagnetic Field by Voltage Magnitude Induced in the Measurement Winding The number of spectral lines $n_{U_n}$ of electromagnetic field, expressed in terms of voltage $U_n$ is determined by using the formula:

$$n_{U_n} = \frac{U_n}{3.949 \cdot 10^{-4} f v_n k_U \Phi_0} \quad (46)$$

where: $k_U$=0.77480923—coefficient, which makes consistent the number of spectral lines measured by magnetic flux density and voltage;
$\Phi_0$=1.153725·$10^{17}$ Wb—quantum of magnetic flux.

As an example, the determination of the number of spectral lines of electromagnetic field produced by current 100 mA in circuit of the primary winding without ferromagnetic core is considered. Frequency of AC f=50 Hz, photon frequency $v_1$=1, voltage at the ends of the measurement winding (at the input of the selective amplifier) $U_{0in}$=3.64981·$10^{-4}$V. Substituting the number value of indicated physical values, quantum of the magnetic flux and coefficient $k_U$ to equation (46) gives:

$$n_{U_0} = \frac{3.64981 \cdot 10^{-4}}{3.949 \cdot 10^{-4} \cdot 50 \cdot 0.77480923 \cdot 10^{-4} \cdot 2.06783461 \cdot 10^{-15}} = 1.153725 \cdot 10^{17}$$

Similarly, the number of spectral lines of electromagnetic field at the current frequencies in the circuit of the primary winding specified in Table 8 (first column) is determined. The obtained values of the number of spectral lines $n_{U_0}$ are entered in the fourth column of Table 9.

Mean value of the number of spectral lines:

$$n_{U_{0av}} = \frac{1}{5} \sum_1^5 n_{U_0} = 1.136302 \cdot 10^{17}$$

TABLE 9

Determination of the number of spectral lines by voltage magnitude
Current in the primary winding 100 mA

| f<br>Hz | $U_{0in}$<br>V | $\dfrac{U_{0in}}{f}$<br>V/Hz | $n_{U_0}$ |
|---|---|---|---|
| 50 | 3.64981 · 10$^{-4}$ | 7.29962 · 10$^{-6}$ | 1.153725 · 10$^{17}$ |
| 150 | 1.07769 · 10$^{-3}$ | 7.18460 · 10$^{-6}$ | 1.135546 · 10$^{17}$ |
| 250 | 1.78996 · 10$^{-3}$ | 7.15984 · 10$^{-6}$ | 1.131632 · 10$^{17}$ |
| 500 | 3.58000 · 10$^{-3}$ | 7.16000 · 10$^{-6}$ | 1.131658 · 10$^{17}$ |
| 1000 | 7.14286 · 10$^{-3}$ | 7.14286 · 10$^{-6}$ | 1.128949 · 10$^{17}$ |

Comparison of the number of spectral lines, computed by voltage at current 100 mA with the number of spectral lines previously computed by magnetic flux density at current 100 mA:

$$n_{B_{0av}} = \frac{(1.153725 + 1.135546 + 1.131632 + 1.131658 + 1.128949) \cdot 10^{17}}{5} = 1.136301 \cdot 10^{17}$$

Compliance to the fifth digit after the comma of the number of spectral lines $n_{U_{0av}} = n_{B_{0av}}$ gives grounds to assert that experimentally established equality between the number of spectral lines computed by measured voltage $n_{U_n}$ and magnetic flux density $n_{B_n}$:

$$n_{U_n} = n_{B_n}$$

which represents the principle of superposition for magnetic field: field B generated by several elementary charges moving (by currents) is equal to the vector sum of fields B=ΣB$_i$ generated by each elementary charge (by current) separately, and this vector sum of magnetic fields is determined quantitatively as the sum of the spectral lines—by measured current (44), module of magnetic flux density (45) and voltage (46) separately.

The full magnetic flux connected to the winding is equal to:

Ψ=BWS where: W—number of the loops of the measurement winding;

S—surface areas of one loop, which is perpendicular to the vector of magnetic induction.

Thus, the in the number of spectral lines occurs in surface area of each loop. Since each spectral line is produced by photons, the change in the number of spectral lines means the horizontal scaling of photon wave.

From the experimentally established fact which is given in Table 9, follows: horizontal scaling of photon wave occurs by changing the number of single structural components—the spectral lines of electromagnetic field whose structure is concurred.

Example 2. Determination of the Number of Electrons of Conductivity in Quantum System by the Number of Spectral Lines of Individual Harmonic of Electromagnetic Radiation of the Ferromagnet Remagnetization of the core was carried out by sinusoidal current. Pulsating magnetic field of the winding 10 is a flux of photons of the first harmonic $\Phi_{m1}$ of different polarity (FIG. 4), most of which is locked on a ferromagnetic core. As a result of the interaction of photons with electrons of the ferromagnet quantum system, the latter pass into the excited state and radiate photons of different frequencies (FIG. 4). Thus, the magnetic flux of the winding 10 with the core represents a photons flux of different frequencies, which produce harmonic spectrum of electromagnetic field of radiation.

As an example, the structure of electromagnetic field of the ferromagnet is analyzed at the maximum current of remagnetization, when all electrons are excited and current increment does not cause changes in the first harmonic induction and each higher harmonic. In this case, current influence on the structure of electromagnetic field of the ferromagnet is excluded.

The first harmonic. Table 10 presents the results of measurements and computations of magnetic flux density of the first harmonic at the magnetic saturation that occurs at the current of remagnetization i=200÷400 mA (in Table 5, column 6, as an example, the result of such measurement and computation at the current of remagnetization i=200 mA was given).

TABLE 10

| | Magnetic flux density of the first harmonic | | | | |
|---|---|---|---|---|---|
| i<br>mA | $B_{50} - B_{0\,in}$<br>T | $B_{150} - B_{0\,in}$<br>T | $B_{250} - B_{0\,in}$<br>T | $B_{500} - B_{0\,in}$<br>T | $B_{1000} - B_{0\,in}$<br>T |
| 200.0 | 0.557343 | 0.554505 | 0.557836 | 0.555077 | 0.555996 |
| 300.0 | 0.558141 | 0.562310 | 0.564057 | 0.563687 | 0.564331 |
| 400.0 | 0.555377 | 0.551330 · | 0.556788 | 0.552038 | 0.552457 |

To compute the mean magnetic flux density of the first harmonic, the results of fifteen measurements for three current values were used: 200 mA, 300 mA, and 400 mA, which are given in Table 10.

The closest to the true value of measured magnetic flux density is the arithmetic mean of the results given in Table 10:

$$B_{1av} = \frac{B_1 + B_2 + \ldots + B_{15}}{15} = 0.557418 T$$

Absolute error of measurements of magnetic flux density of the first harmonic.

Absolute error of individual measurements is equal to the difference between the module of mean value of magnetic flux density $B_{1av}$ and the module of separately measured magnetic flux density $B_i$ given in Table 10:

$\Delta_1 B_1 = 0.557418 - 0.557343 = 0.75 \cdot 10^{-4} T, \ldots$ $\Delta_1 B_i = B_{1av} - B_i$ Mean absolute negative error is determined as the arithmetic mean of the absolute values (modules) of the individual negative errors:

$$-\Delta_{1av} = \frac{1}{6}\sum_1^6 -\Delta_1 B_i$$

$$-\Delta_{1av} = \frac{-(723+4892+6639+6269+6913+418)\cdot 10^{-6}}{6} == -0.0043T.$$

Mean absolute positive error is determined as the arithmetic mean of the absolute values (modules) of individual positive errors:

$$\Delta_{1av} = \frac{1}{9}\sum_1^9 \Delta_1 B_i$$

$$\Delta_{1av} = \frac{(75+2913+2341+1422+2041+6088+630+5380+4961)\cdot 10^{-6}}{9} =$$
$$= 0.002872 \; T$$

Mean absolute error is determined as the arithmetic mean of the absolute values of negative and positive errors:

$$\Delta_1 = \pm\frac{0.0043+0.002872}{2} = \pm 0.003586 \; T$$

Relative error of measurement of magnetic flux density of the first harmonic in percentage terms is equal to the ratio of mean absolute error of the result $\Delta_1$ to its mean value $B_{1av}$:

$$\delta_1 = \frac{\Delta_1}{B_{1av}}100\% \quad (47)$$

$$\delta_1 = \pm\frac{0.003586}{0.557418}100\% = \pm 0.64\%$$

Error of measurement of magnetic flux density of the first harmonic $\delta_1=\pm 0.64\%$ is within limits of error of the measurement instruments. This gives grounds for asserting that when the current of remagnetization changes in the interval 200÷400 mA, number value of magnetic flux density of the first harmonic does not change. Thus, maximum magnetic flux density of the first harmonic (magnetic saturation) is equal to the mean value measured in the frequency band 50÷1000 Hz:

$$B_1=(0.57418\pm 0.003)T \quad (48)$$

The number of spectral lines of the first harmonic is determined by the equation (45):

$$n_{B_1} = \frac{n_T B_1}{B_T} = 6.2415063\cdot 10^{18}\cdot 557418\cdot 10^{-6} = 3.479127\cdot 10^{18} \quad (49)$$

With an increment in the current of remagnetization within i=200÷400 mA the number of spectral lines does not change and equals to:

$$n_{B_1}=3.479127\cdot 10^{18}$$

Each spectral line of the first harmonic corresponds to the excited individual electron of the quantum system of ferromagnet, whereof follows that the finite number of excited electrons in the quantum system of ferromagnet corresponds to the same finite number of spectral lines of electromagnetic field produced by the first harmonics photons radiated by the electrons.

The fact that with increasing of current in the winding 10, magnetic flux density of the first harmonic does not change, means that all free electrons in the quantum system are excited—this state is called magnetic saturation. Accordingly, the number of electrons $n_{e_1}$ in the first energy band radiating photons of the first harmonic is equal to the number of spectral lines of the first harmonic, computed by the magnetic flux density of saturation (44):

$$n_{e_1}=n_{B_1}=3.479127\cdot 10^{18}$$

The third harmonic. The results of measurements of magnetic flux density of the third harmonic in the magnetic saturation mode are given in Table 11.

Mean value of the result of the fifteen measurements of magnetic induction given in Table 11 is determined: arithmetic mean values given in Table 11 is the nearest to the true measured value of magnetic flux density.

$$B_{3av} = \frac{B_1+B_2+\cdots+B_{15}}{15} = 0.184481 \; T$$

TABLE 11

| | Magnetic flux density of the third harmonic | | | | |
|---|---|---|---|---|---|
| i mA | $B_{150}$ T | $B_{450}$ T | $B_{750}$ T | $B_{1500}$ T | $B_{3000}$ T |
| 300.0 | 0.183103 | 0.183372 | 0.184897 | 0.181649 | 0.180689 |
| 400.0 | 0.185051 | 0.183469 | 0.186504 | 0.186376 | 0.184645 |
| 500.0 | 0.185051 | 0.183566 | 0.186504 | 0.186376 | 0.185964 |

Absolute Error of Measurements of Magnetic Flux Density of the Third Harmonic

Absolute error of individual measurements is equal to the difference between the module of mean value of magnetic flux density $B_{3av}$ and the module of separately measured magnetic flux density $B_i$ given in Table 11:

$$\Delta_3 B_1=0.184481-0.183103=0.1378\cdot 10^{-2}T, \ldots$$
$$\Delta_3 B_i=B_{3av}-B_i$$

Mean absolute negative error is determined as the arithmetic mean of the absolute values (modules) of the individual negative errors:

$$-\Delta_{3av} = \frac{1}{9}\sum_1^9 -\Delta_3 \; B_i$$

$$-\Delta_{3av} = \frac{-(416+570+2023+1895+164+570+2023+1895+1483)\cdot 10^{-6}}{9}$$
$$== -0.001226 \; T$$

Mean absolute positive error is determined as the arithmetic mean of the absolute values (modules) of individual positive errors:

$$\Delta_{3av} = \frac{1}{6}\sum_1^6 \Delta_3 \; B_i$$

$$\Delta_{3av} = \frac{(1378+1109+2832+3792+1012+915) \cdot 10^{-6}}{6} = 0.002872 \ T$$

Mean absolute error is determined as the arithmetic mean of the absolute values of negative and positive errors:

$$\Delta_3 = \pm \frac{0.00126 + 0{,}002872}{2} = \pm 0.002066 \ T$$

Relative error of measurement of magnetic flux density of the third harmonic in percentage terms is equal to the ratio of mean absolute error of the result $\Delta_3$ to its mean value $B_{3av}$:

$$\delta_3 = \frac{\Delta_3}{B_{3av}} 100\% \tag{50}$$

$$\delta_3 = \pm \frac{0.002066}{0.184481} 100\% = \pm 1.12\%$$

Error of measurement of magnetic flux density of the third harmonic $\delta_3=\pm1.12\%$ is within limits of error the measurement instruments. This gives grounds for asserting that when the current of remagnetization changes in the interval 300÷500 mA number value of magnetic flux density of the third harmonic does not change. Thus, maximum magnetic flux density of the third harmonic (magnetic saturation) is equal to the mean value measured in the frequency band 50÷1000 Hz:

$$B_3 = (0.184481 \pm 0.002) T \tag{51}$$

The number of spectral lines of the third harmonic is determined by the equation (45):

$$n_{B_3} = 6.2415063 \cdot 10^{18} \ B_3 \frac{1}{B_T} = \tag{52}$$
$$= 6.2415063 \cdot 10^{18} \cdot 184481 \cdot 10^{-6} = 1151439 \cdot 10^{12}$$

With an increment of the current of remagnetization within i=300÷500 mA the number of spectral lines does not change and equals to:

$$n_{B_3} = 1.151439 \cdot 10^{18}$$

This fact shows that the ferromagnet has an energy band (the third) with a finite number of electrons radiating photons of the third harmonic producing the spectral lines of the third harmonic. Since the number of electrons in the energy band is finite, current increment in the circuit of the magnetizing winding does not cause magnetic flux density increment. And this means that the finite number of excited electrons in the third energy band corresponds to the same number of spectral lines of the third harmonic:

$$n_{e_3} = n_{B_3} = 1.151439 \cdot 10^{18}$$

The fifth harmonic. The magnetic saturation of ferromagnet for magnetic flux density of the fifth harmonic is achieved in the band of current of remagnetization 400÷500 mA. The results of measurements of magnetic flux density of the fifth harmonic at two current values and five frequency modes of remagnetization are given in Table 12.

TABLE 12

| | Magnetic flux density of the fifth harmonic | | | | |
|---|---|---|---|---|---|
| i mA | $B_{250}$ T | $B_{750}$ T | $B_{12500}$ T | $B_{2500}$ T | $B_{5000}$ T |
| 400.0 | 0.109665 | 0.107186 | 0.106766 | 0.109665 | 0.108888 |
| 500.0 | 0.109665 | 0.109544 | 0.109504 | 0.109665 | 0.108888 |

Determination of mean value of the result of the ten measurements of magnetic flux density given in Table 12. The closest to the true value of measured magnetic flux density is the arithmetic mean of the results given in Table 12:

$$B_{5av} = \frac{B_1 + B_2 + \cdots + B_{15}}{15} = 0.108943 \ T$$

Absolute error of measurements of magnetic flux density of the fifth harmonic.

Absolute error of individual measurements is equal to the difference between the module of mean value of magnetic flux density $B_{5av}$ and the module of separately measured magnetic flux density $B_i$ given in Table 12:

$$-\Delta_5 B_1 = 0.108943 - 0.109665 = -0.722 \cdot 10^{-3} T \ldots$$
$$\Delta_5 B_i = B_{5av} - B_i$$

Mean absolute negative error is determined as the arithmetic mean of the absolute values (modules) of the individual negative errors:

$$-\Delta_{5av} = \frac{1}{6} \sum_1^6 -\Delta_5 \ B_i$$

$$-\Delta_{5av} = \frac{-(722+722+722+601+561+72) \cdot 10^{-6}}{6} = -0.000566 \ T$$

Mean absolute positive error is determined as the arithmetic mean of the absolute values (modules) of individual positive errors:

$$\Delta_{5av} = \frac{1}{4} \sum_1^4 \Delta_5 B_i$$

$$\Delta_{5av} = \frac{(1757+2177+55+55) \cdot 10^{-6}}{4} = 0.001011 \ T$$

Mean absolute error is determined as the arithmetic mean of the absolute values of negative and positive errors:

$$\Delta_5 = \pm \frac{0.000566 + 0{,}001011}{2} = \pm 0.000788 \ T$$

Relative error of measurement of magnetic flux density of the fifth harmonic in percentage terms is equal to the relation of mean absolute error of the result $\Delta_5$ to its mean value $B_{5av}$:

$$\delta_5 = \frac{\Delta_5}{B_{5av}} 100\% \tag{53}$$

-continued $$\delta_5 = \pm \frac{0,000788}{0,108943} 100\% = \pm 0.72\%$$

Error of measurement of magnetic flux density of the fifth harmonic $\delta_5=\pm 0.72\%$ is within limits of error of the measurement instruments. This gives grounds for asserting that number value of magnetic flux density of the first harmonic does not change when the current of remagnetization changes in the interval 400÷500 mA. Thus, maximum magnetic flux density of the fifth harmonic (magnetic saturation) is equal to the mean value measured in the frequency band 50÷1000 Hz:

$$B_5=(0.108943\pm0.00078)T \qquad (54)$$

The number of spectral lines of the first harmonic is determined by the equation (45):

$$n_{B_5} = 6.2415063 \cdot 10^{18} \; B_5 \frac{1}{B_T} = \qquad (55)$$
$$= 6.2415063 \cdot 10^{18} \cdot 108943 \cdot 10^{-6} = 679968 \cdot 10^{12}$$

With an increment in the current of remagnetization within i=400÷500 mA the number of spectral lines does not change and equals to:

$$n_{B_{n5}}=679968 \cdot 10^{12}$$

This fact shows that the ferromagnet has an energy band (the fifth), with a finite number of electrons radiating photons of the fifth harmonic producing the spectral lines of the fifth harmonic. Since the number of electrons in the energy band is finite, current increment in the circuit of the magnetization winding 10 does not cause an magnetic flux density increment. Accordingly, the finite number of excited electrons in the fifth energy band corresponds to the same number of spectral lines of the fifth harmonic:

$$n_{e5}=n_{B5}=0.679968 \cdot 10^{18}$$

Example 3. Determination of the Number of Photons Producing the Spectral Lines of Electromagnetic Field Per Unit Time The regularity of connection between voltage module and the number of photons producing spectral lines and radiated per 1 s, is established on the basis of the conditions arising from equation (21):

$$U_{mn} = \frac{k_U n_{Bn} f h v_n}{2e}$$

In the indicated equation constant values: coefficient of proportionality $k_U$, Planck constant h and elemental charge e. Accordingly, direct connection between voltage module $U_{mn}$ and frequency f of AC in the circuit of the magnetizing winding will be provided with the constancy of the number of spectral lines $n_{Bn}$=constat and photons frequency $v_n$=constat. Then the results of experimental analyzing under the specified conditions are analyzed.

The winding without the ferromagnet. Experimental confirmation of the connection between voltage and frequency of photon excitation is carried out by analyzing and comparing voltage increment depending on increment of harmonics frequency.

Alternating electromagnetic field of the primary winding 14 with current without the ferromagnetic core produces only photons of a constant frequency $v_1$=1=constat, since there are no higher-order harmonics. Taking the value of the AC module i=200 mA=constat—this means the number of spectral lines of the electromagnetic field $n_{B1}$=constat. For this current value, frequency increment $\Delta f$ of electromagnetic field from the ratio of higher frequencies $f_m$ to the lowest frequency $f_1$ is determined:

$$\delta_f = \frac{f_m}{f_1}. \qquad (56)$$

Then voltage increment is computed from the ratio:

$$\delta_U = \frac{U_m}{U_1}. \qquad (57)$$

Here $U_m$—voltage module measured at each frequency increment of electromagnetic field, $U_1$—voltage measured at the lowest frequency of electromagnetic field. The result of the computations is compared in Table 13.

TABLE 13

Relationship between increment of frequency and voltage
i = 200 mA

| Frequency Hz | 50 | 150 | 250 | 500 | 1000 |
|---|---|---|---|---|---|
| $\delta_f$ | $\frac{50}{50}=1$ | $\frac{150}{50}=3$ | $\frac{250}{50}=5$ | $\frac{500}{50}=10$ | $\frac{1000}{50}=20$ |
| $\delta_U$ | $\frac{7.1 \cdot 10^{-4}}{7.1 \cdot 10^{-4}}=1$ | $\frac{21.3 \cdot 10^{-4}}{7.1 \cdot 10^{-4}}=3$ | $\frac{35.9 \cdot 10^{-4}}{7.1 \cdot 10^{-4}}=5$ | $\frac{71.0 \cdot 10^{-4}}{7.1 \cdot 10^{-4}}=10$ | $\frac{14.3 \cdot 10^{-3}}{7.1 \cdot 10^{-4}}=20$ |

Number value of voltage measured at five frequency modes of excitation of the electromagnetic field were used for computations.

It has been experimentally established (Table 13) that, with the constant current amplitude in circuit of the primary winding 14 and the absence of higher-order harmonics, frequency increment of alternating electromagnetic field in $\delta_f$=3, 5, 10, 20 times causes increment of voltage induced by this field in the measurement winding 15 in $\delta_U$=3, 5, 10, 20 times. Thus, quantization of AC with the frequency occurs with the spectral lines of electromagnetic field in the primary winding. This process proceeds as follows:

in the spectral lines of electromagnetic field produced by AC in the primary winding 14 without ferromagnet, photons with frequency ν=1 are directed one by one at the light velocity c, the time interval between them $t_1$, and the distance $\lambda_i$ determined by the frequency of AC f in circuit of the primary winding 14 (FIG. 2B) according to the equation:

$$\lambda_i = ct_i = c\frac{1}{2f} \tag{58}$$

The winding with the ferromagnet. Amplitude increment of the harmonic voltage depending on frequency increment of alternating electromagnetic field, which is produced by AC in the winding with the ferromagnet, is analyzed in tabular form. Table 14 contains the values of the first, the third and the fifth harmonics voltage at current i=500 mA. At this current value, the number of spectral lines is constant $n_{Bn}$=const, the harmonic phase at different frequency modes of remagnetization, coincides, therefore, when computing gain of voltage, the phase is not taken into account.

By using the formula (56), computed increment of current frequency $\delta_f$ occurs at times, and by using the formula (57) computed increment of harmonic voltage $\delta_{U_1}$, $\delta_{U_3}$, $\delta_{U_5}$ occurs at times, depending on increment of current frequency. Following regularity $U_n$ is observed from the results of computations given in Table 14.

In the process of remagnetization of ferromagnet in the mode of magnetic saturation (i=500 MA), frequency increment of electromagnetic field in $\delta_f$=1, 3, 5, 10, 20 times causes voltage increment of the first, the third and the fifth harmonics in $\delta_{U_p}$=1, 3, 5, 10, 20 times that is induced in the measurement winding by the spectrum of the electromagnetic radiation of the ferromagnet. This means that the spectral lines of the harmonic of the electromagnetic radiation of the ferromagnet 13 (FIG. 4) are quantized by photons of different frequencies, which are directed one by one at a distance $\lambda_i$, which is determined by the equation (58):

$$\lambda_i = ct_i = c\frac{1}{2f}$$

TABLE 14

Amplitude increment of harmonic depending on the frequency increment of alternating electromagnetic field

| i = 500 mA | | The first harmonic | | The second harmonic | | The fifth harmonic | |
| --- | --- | --- | --- | --- | --- | --- | --- |
| f Hz | $\delta_f$ | $U_1$ mV | $\delta_{U_1}$ | $U_3$ mV | $\delta_{U_3}$ | $U_5$ mV | $\delta_{U_5}$ |
| 50 | 1 | 12.4 | 1 | 10.9 | 1 | 10.82 | 1 |
| 150 | 3 | 37.3 | 3 | 32.68 | 3 | 32.40 | 3 |
| 250 | 5 | 62.0 | 5 | 55.00 | 5 | 54.05 | 5 |
| 500 | 10 | 123.9 | 10 | 110.0 | 10 | 107.9 | 10 |
| 1000 | 20 | 247.8 | 20 | 220.0 | 20 | 215.0 | 20 |

Thus, it has been experimentally established that the spectral lines of the first harmonic of electromagnetic field of the magnetization winding with AC and spectral lines of the higher-order harmonics of electromagnetic field radiated by the ferromagnet produce photons of different frequency, the number of which is determined by current magnitude—by the number of excited electrons in wire of the magnetizing winding, per unit of time. This empirically confirms the equation (20), which determines the number of photons $n_f$ producing the spectral lines per unit time t by frequency f of AC in magnetizing winding:

$$n_f = 2ft$$

Proceeding from equation (20) it follows that the scaling of photon wave is proportional to the frequency increment of AC in the magnetizing winding per unit time. As a result of increment of number of photons producing the spectral lines, the scale of photon wave increases vertically. In the present invention, this process is considered as "vertical scaling of the photons wave" in relation to horizontal scaling—increasing of the number of spectral lines.

The experimentally established horizontal and vertical scaling of the photons wave is the basis for the following statement:

alternating voltage induced in the measurement winding by electromagnetic field of equal frequency is a harmonic produced by the sum of scalable waves of the electrons that repeat the harmonic oscillation of single photons of the same frequency that interact with the electrons of conductor.

In the following examples, the definition of the structure of scaled photon wave by physical magnitudes characterizing the harmonic voltage is given, and since the structure of scaled photon wave does not differ from the structure of photon wave of single photon, the term "scaled" is not used.

Example 4. Determination of Frequency of the Photons

The frequency of photons wave is determined from the relation of the frequency of higher-order harmonic voltage to the frequency of the first harmonic voltage, or to the excitation frequency of elementary particles radiated by the photons:

$$v_n = \frac{U_n}{U_1} \tag{59}$$

Substituting in the formula (59) voltage value from equation (36) instead the voltage gives:

$$v_n = \frac{U_n}{U_1} = \frac{4.44 B_n f_n SW}{4.44 B_1 f_1 SW} = \frac{B_n f_n}{B_1 f_1} \tag{60}$$

Analysis of the Relation in the Right Side of the Expression (60)

Frequency increment of harmonic of electromagnetic radiation of the ferromagnet is caused by voluntary-selected frequency of AC in magnetizing winding and is expressed by the frequency increment $\Delta f$=1, 3, 5, 10, 20. The magnetic flux density of the same harmonic does not change when changing its frequency. Thus, the relation of magnetic flux density of n-th harmonic to magnetic flux density of the first harmonic at any frequency of harmonic is equal to one: $B_n/B_1$=1. Given the above, the expression transforms (60):

$$v_n = \frac{f_n}{f_1} = \frac{f_n}{f} \tag{61}$$

Here the frequency of the first harmonic is equal to the frequency of AC in the magnetizing winding: $f=f_1$.

Examples of determining the frequency of photons by using the formula (61). In the first column of Table 15, the frequency of remagnetization field produced by AC in magnetizing winding is indicated, and the frequencies of the first, third and fifth harmonics of electromagnetic field of the ferromagnet are included in the columns: 2, 4, 6; the relation of frequency of the harmonic to the frequency of remagnetization field, which is computed by using the formula (61)—in columns 3, 5, 7.

TABLE 15

Determination of the frequency of the photons producing the harmonic

| Current | The first harmonic | | | The third harmonic | | The fifth harmonic | |
|---|---|---|---|---|---|---|---|
| frequency f | $f_1$ | $v_1 = \dfrac{f_1}{f}$ | $f_3$ | $v_3 = \dfrac{f_3}{f}$ | $f_5$ | $v_5 = \dfrac{f_5}{f}$ |
| Hz | Hz | | Hz | | Hz | |
| 1 | 2 | 3 | 4 | 5 | 6 | 7 |
| 50 | 50 | 1 | 150 | 3 | 250 | 5 |
| 150 | 150 | 1 | 450 | 3 | 750 | 5 |
| 250 | 250 | 1 | 750 | 3 | 1250 | 5 |
| 500 | 500 | 1 | 1500 | 3 | 2500 | 5 |
| 1000 | 1000 | 1 | 3000 | 3 | 5000 | 5 |

Experimental data in Tables 15 represents the following fact: photons fluxes with frequency $v_1=1$ produce spectral lines of the first harmonic, photons fluxes with frequency $v_3=3$ produce spectral lines of the third harmonic, and photons fluxes with frequency $v_5=5$ produce spectral lines of the fifth harmonic.

With any change of current frequency f in magnetizing winding, the frequency of photons $v_n$ producing the harmonic of electromagnetic field of the ferromagnet remains unchanged.

Examples of Computing Photon Frequency Based on Data from Literature

When the main beam of a ruby laser (the beam causing the generation of any higher-order harmonic is called as the main one) whose wavelength is equal to $\lambda=6943$ Å, is directed to a quartz crystal, the second harmonic was obtained, the wavelength of which is equal to $\lambda_2=3471$ Å.

The formula (61) determines the frequency of the photons producing the second harmonic:

$$v_2 = \frac{6943}{3471} = 2 \qquad (62)$$

In the process of excitation of a mixture of metal vapor Na and buffer gas Xe with basic radiation, the length of which was equal to $\lambda=6943$ Å, indicated medium radiated an electromagnetic field containing the third harmonic $\lambda_3=2314$ Å.

According to formula (61), the frequency of photons producing the third harmonic is equal to:

$$v_3 = \frac{6943}{2314} = 3 \qquad (63)$$

Thus, formula (61) is used to determine the frequency of photons in all known frequency band of electromagnetic field: $10^1 \div 10^{21}$ Hz.

Example 5

Determination of the structure of the photon wave within the calibration length and in the interval of the calibration time by the wavelike structure of the AC. For this purpose, the equality (22) transforms:

$$\frac{[U_{mn}\sin(n_n\pi+\alpha_n)]_{met}}{[U_{mn}\sin(n_n\pi+\alpha_n)]_{ref}} = \frac{[k_U n_{Bn} f v_n \Phi_0 \sin(n_n\pi+\alpha_n)]_{met}}{[k_U n_{Bn} f v_n \Phi_0 \sin(n_n\pi+\alpha_n)]_{ref}} =$$
$$= \frac{[2\ k_U n_{Bn} fehv_n \sin(n_n\pi+\alpha_n)]_{met}}{[2\ k_U n_{Bn} fehv_n \sin(n_n\pi+\alpha_n)]_{ref}}$$

In equation (22), the left side represents the relation of the harmonic oscillations of measured alternating voltage to reference voltage, the middle part—the relation of the harmonic oscillations of magnetic flux quantum, and the right side—the relation of oscillations of photons waves interacting with the electrons of quantum system.

Proceeding from equation (22) it follows that the phase of photon wave $(n_n\pi+\alpha_n)$ remains unchanged while interacting of photon with electron and develops itself through the phase of oscillations of magnetic flux quantum and phase of voltage oscillations. This fact is the basis for determining the structure of the photon wave oscillations from the relation of oscillation of measured voltage to reference voltage.

The order of measurement of the relation of oscillations of measured voltage to reference voltage by the device (FIG. 3).

The analyzed harmonic voltage is applied to one input of the oscilloscope, reference voltage of the first harmonic is applied to the second one, which together produce two mutually perpendicular oscillations:

$$\frac{[n_{Bn} f v_n \Phi_0 \sin(n_n\pi+\alpha_n)]_{met}}{[n_{Bn} f v_1 \Phi_0 \sin(n_1\pi+\alpha_1)]_{ref}}$$

Frequency 50 Hz is set on voltage generator 16 and harmonic analyzer 17. Current is increased in magnetizing and bias windings of electromagnetic transducer 2 till obtaining paired and unpaired harmonic of voltage in measurement winding. The electromagnetic generator 23 producing reference voltage spectrum is actuated. The selector switch 28 is moved to the position "a". The block diagram of the device provides the following relations between the harmonic voltage.

Harmonic analyzer 5 allocates voltage of the first harmonic at frequency 50H, from the voltage spectrum produced by the generator 23. Through the selector switch 28, reference voltage is connected to oscilloscope plates, which deflect the electron beam in horizontal direction.

The input of harmonic analyzer 3 is connected to the measurement winding of the electromagnetic transducer 2. The output of analyzer 3 is connected through the selected switch 28 to oscilloscope plates 29, which deviate the electron beam in vertical direction. Frequency 50 Hz, 100 Hz and 150 Hz is set consistently by the selector switch of frequencies on the analyzer 3. As a result, the voltage of the first harmonic ($f_1=50$ Hz), the second harmonic ($f_2=100$ Hz) and the third harmonic ($f_3=150$ Hz) is connected consequently to the vertical deflection plates of the oscilloscope through the selective switch 28.

The relation in the cathode-ray tube of the first, the second and the third harmonics to voltage of the first harmonic was depicted on the screen in the form of Lissajous figures. FIG. 5A shows an oscillogram of the first harmonic 500*a*; FIG. 5B shows an oscillogram of the second harmonic 500*b*; and FIG. 5C shows an oscillogram of the third harmonic 500*c*.

Explanation of Measurement Results

Duration of time base at the screen of cathode-ray tube is determined by the production of scaled photon wave of first harmonic, which induces reference voltage, which is connected to the horizontal deflection plates. In relation to this time base of oscillogram scaled photon wave of the analyzed first harmonic looks like an ellipse (FIG. 5A), which is produced by two half-waves, which represent the movement of cathode ray under the action of two perpendicular electric alternating fields: reference and analyzed.

Since the time action of these fields is simultaneously quantized by time of producing of equal amplitude, photons of the first harmonic which are compared, cathode ray moves along the trajectory a then per time of quantization $t_{1q}=t_1 \div t_2$. In the second time interval $t_{1q}=t_2 \div t_3$, amplitudes of photons of the reverse polarity are compared, so the cathode ray moves along the trajectory b. Then all physical processes are periodically repeated, and on the oscilloscope screen a stable image of the ellipse is established. Thus, the axis x divides the ellipse into two amplitudes of the scaled photon wave of the first harmonic which have reverse polarity (FIG. 5B).

Photon wave of the second harmonic has two amplitudes of reverse polarity. This means that during the time base $t_{1q}=t_1 \div t_2$, polarity of the voltage induced in the conductor by photon of the second harmonic. As a result, cathode ray moves along a trajectory a under the act of two mutually perpendicular electric fields: reference field of first harmonic and analyzed field of the second harmonic (FIG. 5B). In the second time interval $t_{1q}=t_2 \div t_3$, the photons of the first and the second harmonics are compared, whose amplitudes have reverse polarity respectively to the polarity of the amplitudes of the previous pair of photons. Under the action of these fields, the cathode ray makes a motion along the curvilinear trajectory b (FIG. 5B).

Then all physical processes are periodically repeated, and on the oscilloscope's screen, the motion of the cathode ray draws the Lissajous figure—the image of waves of photon of the second harmonic. Respectively to the axis x, Lissajous figure is divided into two waves representing the structure of photons wave, which produce scaled waves of photons of the second harmonic.

The photon wave of the third harmonic carries out three oscillations during the time base $t_{1q}=t_1 \div t_2$, therefore, voltage polarity induced in the conductor by the third harmonic photon will be changed three times on the vertical deflection plates of the cathode-ray tube. As a result, cathode ray will move along a trajectory a under the action of two mutually perpendicular electric fields: reference field of first harmonic and analyzed field of the third harmonic. In the second time interval $t_{1q}=t_2 \div t_3$, the photons of the first and the third harmonics are compared, whose amplitudes have reverse polarity respectively to the polarity of the amplitudes of the previous pair of photons. Under the action of these fields, the cathode ray makes a motion along the curvilinear trajectory b (FIG. 5C). Then all physical processes are periodically repeated, and they are displayed on the oscilloscope screen in the form of Lissajous figures—model of the photon wave of the third harmonic photon. Relatively to the axis x, Lissajous figure is divided into two waves, representing an experimental model of the scaled waves of photon of the third harmonic.

Measurement of the photon wave parameters of the n-th harmonic relatively to the photons waves of the same number harmonic whose parameters do not change. For this purpose, the equality (22) transforms for the n-th harmonic:

$$\frac{[n_{Bn} f v_n \Phi_0 \sin(n_n \pi + \alpha_n)]_{met}}{[n_{B1} f v_1 \Phi_0 \sin(n_1 \pi + \alpha_1)]_{ref}}$$

The measurement is analogous to previous example measurements, only reference voltage has the same frequency as the measured voltage of harmonic. The results of measurements of the relation of magnetic flux spectra of the same frequency are represented by oscillograms photos, which have the appearance of Lissajous figure.

In FIG. 6 structure of photon wave of the first harmonic photon 600 is shown on the oscilloscope's screen in a form of single ellipse, in FIG. 7 structure of photon wave of the third harmonic 700 is shown on the oscilloscope screen in form of three combined ellipses, in FIG. 8 structure of photon wave of the third harmonic 800 is shown on the oscilloscope's screen in form of five combined ellipses.

Thus, in FIG. 5A, FIG. 5B, FIG. 5C, FIG. 6, FIG. 7, FIG. 8 examples of significant features of the invention are given.

Images of photons waves of the first, the third, the fifth harmonics within calibration length and in interval of calibration time are experimentally obtained by measuring sum oscillations of total two mutually perpendicular oscillations photons waves, structure of wave of which occur outwardly the parameters of altering voltage at the ends of the measurement winding.

When oscillographic measurement of relation of analyzed voltage of n–y harmonic to voltage of first harmonic on the oscilloscope identifies two waves, while a number of the amplitudes of these waves is equal to the frequency of photons that produce the n-th armonic and displacement between waves represents the change of initial phase of photons.

When the oscillographic measurement, the relation of the measured voltage of the n-th harmonic to voltage of the same number harmonic whose parameters do not change, combined ellipses (Lissajous figures) are allocated at the oscilloscope's screen, while the number of combined ellipses (Lissajous figures) is equal to the frequency of photons, and the spatial position of combined ellipses represents polarization of photons, which induces measured voltage.

Determination of the Structure of the Photons Waves within Scaled Calibration Length and Calibration Time According to the Relation of Measured Voltage to Reference Voltage The experimental results are shown in FIG. 9.

Measurement of oscillograms of photon wave within scaled calibration length and calibration time was carried out as follows.

Voltage in frequency, which is equal to frequency of remagnetization electromagnetic field $f_B=200$ Hz was fed to the oscilloscope 29 input from the analyzer output. Time of the time base which is equal to half of the period of the harmonic voltage oscillation with the frequency equal to $f_B=200$ Hz, was selected by means of adjusting knobs. One half-wave, which presents one wave oscillation (amplitude) of the photon within scaled calibration length and calibration time, was allocated on the screen of the cathode-ray tube of the oscilloscope. The curve is moved to the tracing paper from the oscilloscope screen a and is indicated in FIG. 9 by the symbol of the frequency of photons $v_{1B}=1$ producing remagnetization electromagnetic field. Then harmonic voltage was consistently fed to the oscilloscope 29 input from the harmonics frequency analyzer 3: of the first harmonic $f_1$=200 Hz, of the second harmonic $f_2$=400 Hz, of the third harmonic $f_3$=600 Hz, of the fourth harmonic $f_4$=800 Hz, of the fifth harmonic $f_5$=1000 Hz. The calibration photons waves of five harmonics representing their structure were allocates on the oscilloscope screen in the interval of the established scaled calibration time of the time base equal to the half of the period of the electromagnetic wave, which induces the voltage in frequency $f_B$=200 Hz. These waves are transmitted to the tracing paper and are indicated in FIG. 9 by the symbols of the frequencies of photons producing the harmonics: $v_1$=1 amplitude of the photon wave of first harmonic, $v_2$=2 amplitudes of the photon wave of second harmonic, $v_3$=3 amplitudes of the photon wave of third harmonic, $v_4$=4 amplitudes of the photon wave of fourth harmonic, $v_5$=5 amplitudes of the photon wave of fifth harmonic.

FIG. 9 shows that initial phase of photon wave of the first harmonic $v_1$ and photon wave of the fifth harmonic $v_5$ does not coincide with the initial phase of photon wave of the third $v_3$ and photon wave of the fourth $v_4$ harmonic.

Thus, in FIG. 9, the structure of photons waves within scaled calibration length and calibration time in the form of oscillograms is fixed.

Example 6. Determination of Elementary Particles Separation According to Energy Levels in the Quantum System Radiating Photons by Frequency of the Photons Internal photoconductive effect, when re-separation of electrons by semiconductor according to energy states occurs under the action of illumination, is known. "In the context of internal photoconductive effect, electromagnetic radiation, being absorbed in semiconductors and dielectrics, changes the energy state of electrons of these substances. Part of electrons from valence energy band passes into the conduction band, the concentration of current carriers within the body increases, which leads to the appearance of photoconductivity—increasing of electrical conductivity of the body with its illumination" [3, p. 455].

Further, a description of the experiment is given, where spectra of paired and unpaired harmonics were obtained, which established that a constant magnetic field changes the energy state of electrons in the ferromagnet, like the re-separation of electrons in semiconductors under the action of illumination. Measurements were carried out in the proposed system, the block diagram of which is shown in FIG. 3.

Measurement methods. DC in circuit of bias winding 12 (FIG. 2B) of the electromagnetic transducer 2 increased discretely in the following band of values: 2.5, 5, 10, 20, 40, 80, 160 mA. At the specified DC values, remagnetization of the ferromagnetic sample was carried out by alternating magnetic field, which produced AC in frequency f=50 Hz generated by the voltage generator 16 (FIG. 3) and which flows in the circuit of the magnetizing winding of the electromagnetic transducer 2. Alternating and constant magnetic fields excited the electrons in the ferromagnet, and the latter radiated the electromagnetic spectrum of paired and unpaired harmonics, which induced relevant voltage spectrum in the measurement winding 11 (FIG. 2B) of the electromagnetic transducer 2. The analyzer 3 allocated the components of harmonics voltage, whose amplitude was measured by a voltmeter 31, from the spectrum. Photons waves producing the harmonics of electromagnetic field were allocated from the components of harmonics voltage by oscillographic method.

Alternating voltages of the components of spectrum were measured: the first, the second, the third, the fourth, the fifth, the sixth and the seventh harmonics, and according to the formulas of Table 16, magnetic flux density the harmonics of electromagnetic fields was computed.

In addition, AC in the circuit of the magnetizing winding was measured through certain degrees of increment, from the minimum to the maximum value. The results of measurements of AC and harmonic voltage were processed according to the method and formulas given in Table 5 and Table 6.

Table 16 shows the formulas for computation of voltage and magnetic flux density values given in Table 5 and Table 6.

TABLE 16

Computation formulas of Table 5 and Table 6

| $i_m$ | $U_n(I_=)$ | $U_{nin}(I_=) = \dfrac{U_n(I_=)}{K_{n2}}$ | $B_n(I_n) = \dfrac{U_{nin}(I_=)10^6}{394.9\, f_n s}$ |
|---|---|---|---|
| mA | V | V | T |

To compute the true value of voltage at clamps of the measurement winding 11 (FIG. 2B), the measured values of voltage at the analyzer 3 output were divided into gain $K_{n2}$ of analyzer (the third column). The magnetic flux density of each harmonic was determined by true value of voltage (the fourth column) of the voltage.

Under symbols of designation of voltage $U_n$ and magnetic flux density $B_n$, symbol in brackets ($I_=$) indicates DC value in the bias winding 12 (FIG. 2B), in which measurement of amplitude of harmonics voltage. Each table is compiled for each DC value at which the harmonic voltage measurements were performed: ($I_=$)=2.5, 5, 10, 20, 40, 80, 160 mA.

The values DC ($I_=$) and magnetic flux density $B_n$ at AC $i_m$=80 mA, are transposed from the tables above to Table 17.

Figure 9A:
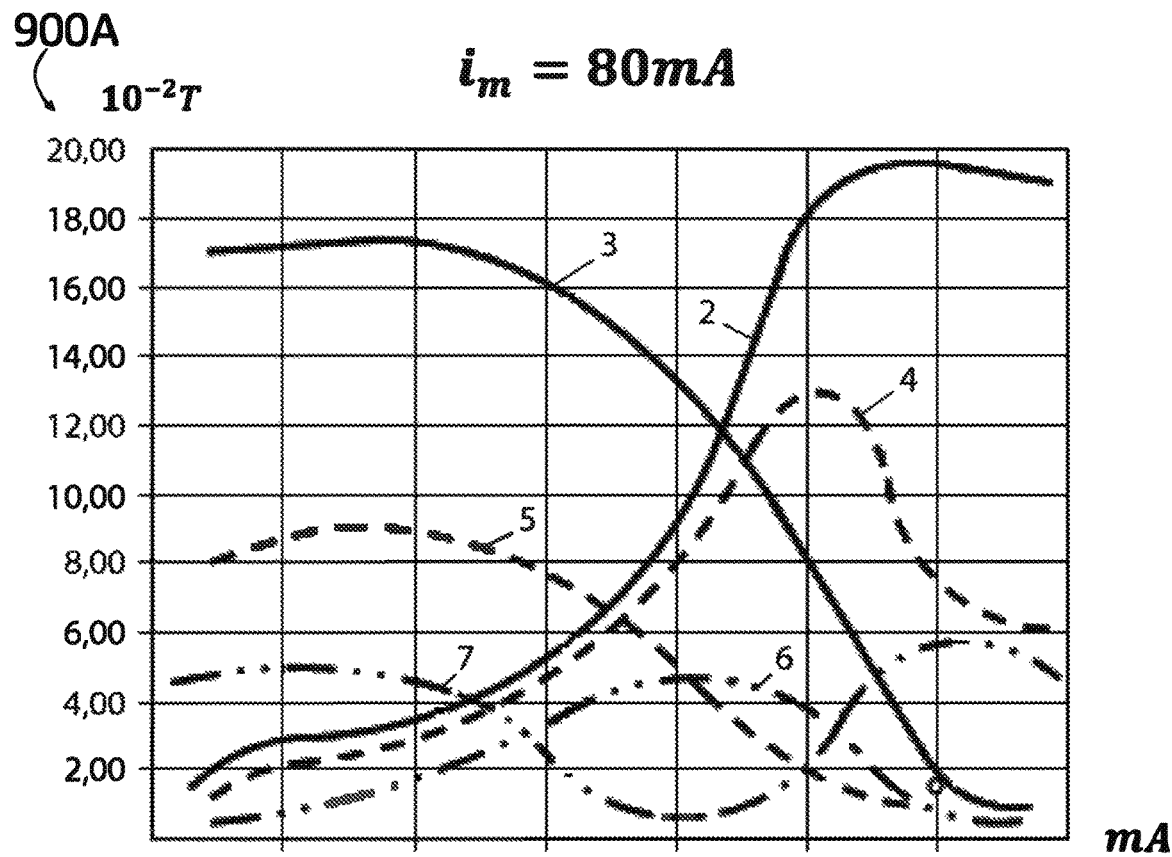
FIG. 9A shows overview of functional dependency of magnetic flux density of harmonic on DC increment, and oscillograms of photons waves structure.

Functional dependencies of the magnetic flux density of six harmonics on DC increment at constant value of AC shown in FIG. 9A were based according to number values of Table 17:

$$B_n = f(I_=) \text{ at } i_m = 80 \text{ mA} \tag{64}$$

TABLE 17

Relationship of magnetic flux density of six harmonics on DC value $i_m$ = 80 mA - const

| $I_=$ mA | $I_=$ mA | $I_=$ mA | $I_=$ mA | $I_=$ mA | $I_=$ mA | $I_=$ mA |
|---|---|---|---|---|---|---|
| 2.5 | 2.82 | 17.53 | 2.44 | 8.57 | 1.31 | 4.38 |
| 5.0 | 3.66 | 17.85 | 4.36 | 9.57 | 2.07 | 4.38 |
| 10.0 | 5.45 | 14.80 | 4.73 | 7.97 | 2.86 | 2. |
| 20.0 | 9.83 | 14.28 | 8.47 | 5.38 | 4.70 | 1.06 |
| 40.0 | 18.0 | 7.79 | 13.2 | 2.19 | 4.15 | 2.13 |
| 80.0 | 19.77 | 1.39 | 6.72 | 1.05 | 1.13 | 5.93 |
| 160.0 | 19.48 | 1.42 | 6.1 | 1.15 | 1.12 | 4.50 |

The number of the curve in FIG. 9A indicates the number of harmonic and index numbers of magnetic flux density: 2—second $B_2$, 3—third $B_3$, 4—fourth $B_4$, 5—fifth $B_5$, 6—sixth $B_6$, 7—seventh $B_7$ induction of higher-order harmonics.

Figure 9B:
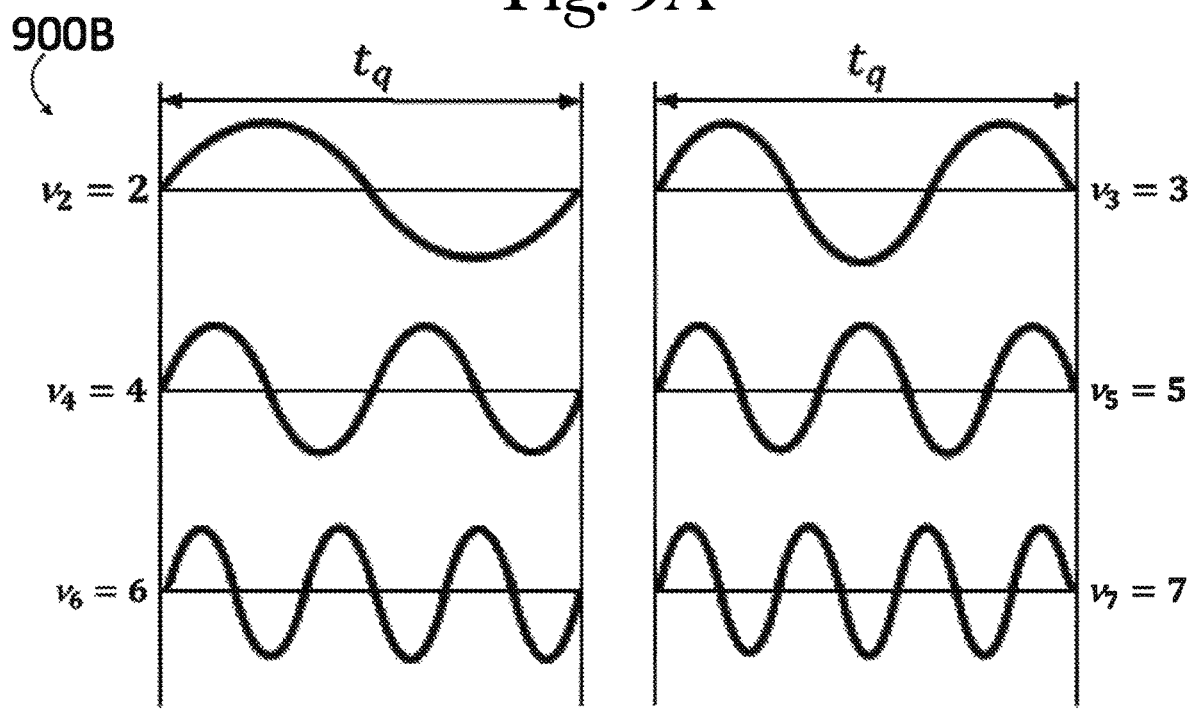
FIG. 9B shows overview of oscillograms of photons waves structure.

FIG. 9B shows oscillograms of the structure of photon wave allocated from the harmonics indicated in FIG. 9A by the oscillographic method in relation to a voltage in frequency f=50 Hz that is equal to the frequency of the first harmonic. In relation to scaled calibration length of wave, within which one amplitude of the first harmonic photons is produced, the structure of the second harmonic photons is represented at the oscilloscope screen as a wave with two amplitudes (half-periods) v=2, the third harmonic photon—as a wave with three amplitudes v=3, the fourth harmonic photon—as a wave with four amplitudes v=4, the fifth harmonic photon—as a wave with five amplitudes v=5, the sixth harmonic photon—as a wave with six amplitudes v=6, the seventh harmonic photon—as a wave with seven amplitudes (half-periods) v=7.

Further, an analysis of the experimental facts, which are shown in FIG. 9A and FIG. 9B, was performed.

The first fact. When the ferromagnet is remagnetized by alternating electromagnetic field, a spectrum of electromagnetic radiation is produced consisting only of unpaired harmonics, between which there is no connection. This means that the spectra of electromagnetic waves of different frequencies radiating electrons located in different energy bands, where they have different energies. Energy bands signed with numbers of unpaired harmonics, for example, the electrons of the first energy band radiate the first harmonic, of the third energy band—the third harmonic, etc.

The second fact. Paired harmonics appear in the spectrum of electromagnetic radiation of the ferromagnet when it is magnetized by its constant magnetic field and when it is re-magnetized by alternating magnetic field. In this case, there is a logical connection between paired and unpaired harmonics. FIG. 9A shows that at AC constant value $i_m$=80 mA and in the course of DC increment ($I_=$)=2.5, 5, 10, 20, 40, 80, 160 mA, magnetic flux density of the second harmonic (curve 2) increases in proportion to the decreasing of magnetic flux density of the third harmonic (curve 3). Analogous connection exists between magnetic flux density of the fourth and the fifth harmonics (curves 4 and 5), between magnetic flux density of the sixth and the seventh harmonics (curves 6 and 7). Thus, regular connection between paired and unpaired harmonics is experimentally established.

The established regularity shown in FIG. 9A is described by analyzing the frequency of photons whose oscillograms are shown in FIG. 9B.

At DC ($I_=$)=0 and at AC $i_m$=80 mA, the magnetic flux density of the third harmonic equals $B_3$=0.175T, of the fifth—$B_5$=0.085T, of the seventh—$B_7$=0.047T. This magnetic flux density represents the number of spectral lines of electromagnetic field, and, accordingly, the number of excited electrons in equilibrium state in the energy bands. With the gradual energy increasing of constant magnetic field (current increment ($I_=$), FIG. 9A), the number of electrons radiating third harmonic photons in the main energy state decreases (curve 3), and the number of electrons radiating the second harmonic photons (curve 2) is proportional to the decreasing of electrons in the main state. This means that constant magnetic field moves electrons from the energy level of main state to the free energy level in this energy band. Alternating electromagnetic field excites electrons at a new energy level, and they radiate photons in frequency v=2 instead of photons in frequency v=3 (the first series of oscillograms in FIG. 9B).

Thus, the third energy band has two energy levels—the main, filled with electrons, and the level of energy freed of electrons. Energy levels are signed by a number equal to the frequency of photons radiated by electrons at this level.

The frequency of the photons is equal to the number of harmonic, which is experimentally represented at oscillograms in FIG. 9B. Thus, according to the regularities of connections between the curves of paired and unpaired harmonics in FIG. 9A the regularities of connections between the number of electrons energy level and photons frequency radiated by these electrons.

Proceeding from the regularity of the connection between the magnitude of magnetic flux density of the fourth harmonic (curve 4) and the fifth harmonic (curve 5), it follows that there are two energy levels in the fifth energy band. The fourth energy level is free from electrons, and the fifth—is occupied by electrons. In the case of remagnetization of the ferromagnet by alternating magnetic field of a constant value and a gradual energy increment of a constant magnetic field (current increment ($I_=$), FIG. 9A), the number of excited electrons at the fifth energy level decreases (curve 5), and at the fourth energy level increases (curve 4) in proportion to their decreasing at the fifth energy level. Moving from the fifth to the fourth energy level, electrons radiate photons in frequency v=, instead of photons in the frequency v=5 (the second series of oscillograms in FIG. 9B).

Proceeding from the regularity of the connection between the magnitude of the magnetic flux density of the sixth harmonic (curve 6) and the seventh harmonic (curve 7), it follows that in the seventh energy band there are free sixth energy level and seventh energy level occupied by electrons. If the ferromagnetic is remagnetized by alternating magnetic field of constant magnitude and gradual increment of energy of constant magnetic field (current increment ($I_=$), FIG. 9A), an interconnected change of the number of excited electrons at the sixth and seventh energy levels occurs (curves 6 and 7). At the same time, moving from the seventh energy level to the sixth energy level, electrons radiate photons in frequency v=6, instead of the photon in frequency v=7 (the third series of oscillograms in FIG. 9B).

Thus, FIG. 9A shows the separation of electrons according to energy levels of energy in the three energy bands in the ferromagnet, and FIG. 9B shows the structure of waves of the photons whose frequency is a measure of photons energy and represents the separation of electrons according to energy levels in atoms.

Thereby, the experimental fact shown in FIG. 9A and FIG. 9B is the basis for determining the frequency of photons of the energy level at which the elementary particles in the quantum system are located at the moment of photons radiation.

An Example of Determining the Number of Electrons at the Energy Level

According to the formula (44) the number of electrons radiating photons at the second and the third energy levels at current ($I_=$)=20 mA is determined. In accordance with the data of Table 17, at this current, magnetic flux density of the second harmonic equals to $B_2$=0.0983 T, and magnetic flux density of the third—$B_3$=0.1428 T.

The number of electrons $n_{e_2}$ radiating photons at the second energy level is equal to the number of spectral lines of the second harmonic:

$n_{e_2} =$ $$n_{B_2} = 6.2415063 \cdot 10^{18} \; B_2 \frac{1}{B_T} = 6.2415063 \cdot 10^{18} \cdot 0.0983 = 6.1354 \cdot 10^{17}$$

The number of electrons $n_{e_3}$ radiating photons at the third energy level is equal to the number of spectral lines of the third harmonic:

$n_{e_3} =$ $$n_{B_3} = 6.2415063 \cdot 10^{18} \; B_3 \frac{1}{B_T} = 6.2415063 \cdot 10^{18} \cdot 0.1428 = 8.9128 \cdot 10^{17}$$

Example 7. Measurement of the Polarization (Phase) of Photons and the Determination of the Spatial Position of Orbits of Elementary Particles in Quantum System and the Connection Between this State and its Structure The concept of "polarization". "Let's consider two mutually perpendicular electrical oscillations that occur along the x and y axes, and which differ by phase on δ:

$$E_x = A_1 \cos \omega t, \; E_y = A_2 \cos(\omega t + \delta)$$

Overall strength E is a vector sum of strength $E_x$ and $E_y$. " . . . Two coherent flat-polarized light waves whose surface areas of oscillation are mutually perpendicular, when applied one by one, give an elliptically-polarized light wave. At a phase difference δ equal to zero or π, the ellipse degenerates into a straight line and plane-polarized light comes out. At δ=±π/2 and equitation of waves amplitudes of the folding waves ellipse turns into a circumference—light polarized circle-wise comes out.

The right and the left polarizations are differentiated depending on shifting direction of the vector E" [10, p. 420]

Analogously, a point with coordinates moves, which are determined by the expressions:

$$B_{ny} = \frac{1}{4.44 f_n SW} [U_{mn} \sin(n_n \pi + \alpha_n)]^{met} \quad (65)$$

$$B_{nx} = \frac{1}{4.44 f_n SW} [U_{mn} \sin(n_n \pi + \alpha_n)]^{ref}$$

that is, the end of the vector $B_n$ moves along the ellipse.

Measurement of the initial phase of photons in the phase of harmonic voltage, which is induced in the measurement winding by the components of electromagnetic radiation spectrum of the ferromagnet.

To measure the photon phase, an oscillographic method with the linear and the sinusoidal time bases (described above) was used. At the linear time base, the frequency of reference voltage is equal to the frequency of the magnetizing electromagnetic field, and in the case of the sinusoidal time base, the frequency of reference voltage is equal to the frequency of the measured harmonic voltage.

Analysis was carried out on a set of devices presented in FIG. 3.

The Elimination of Errors Made by Devices During Phase Measurement

The phase shift, introduced by the analyzer 3 at its multiple switching to the harmonics, is constant, since switching to different frequencies is fixed. The magnitude of the phase shift φ' for each harmonic is established preliminarily and is shown in FIG. 24 in the form of Lissajous figures.

In case of measuring the true value of the harmonic phase, the phase shifter 24 is set to a position in which fixed phase shift φ' is introduced by the analyzer 3. Then, at a certain value of current in the magnetizing winding, the phase shifter 24 is shifted to an angle equal to the phase shift φ', and thus the Lissajous figure is changed in such a way that it corresponds to the true value of the harmonic phase.

The measurement of the harmonic phase is carried out as follows.

FIG. 24 shows a comparison of signal phase at the input and output of an analyzer. The frequency 50 Hz is set at the voltage generator 16, the harmonic analyzer 3 and the harmonic analyzer 5, and the selector switch 28 is brought to the position "a" (FIG. 3). Then current is increased in the circuit of the magnetizing winding up to 500 mA (magnetic saturation of the ferromagnet). At this current, the analyzer 3 is switched to frequency 150 Hz (other one is possible) and an oscillogram of the form which would represent a zero phase shift between analyzed and reference voltages, is produced using a phase shifter 24. In accordance with FIG. 24 for the third harmonic, the indicated phase shift is equal to zero when its oscillogram has the form shown in 1000B (with reference to FIG. 10). Then, at this current in the magnetizing winding and at unchanging phase of the reference voltage, analyzer 3 is switched to the frequency 50 Hz and 250 Hz and oscillograms of the harmonic of the specified frequency are fixed. 1000A shows an oscillogram of the first harmonic, and 1000C—an oscillogram of the fifth harmonic.

Figure 11:
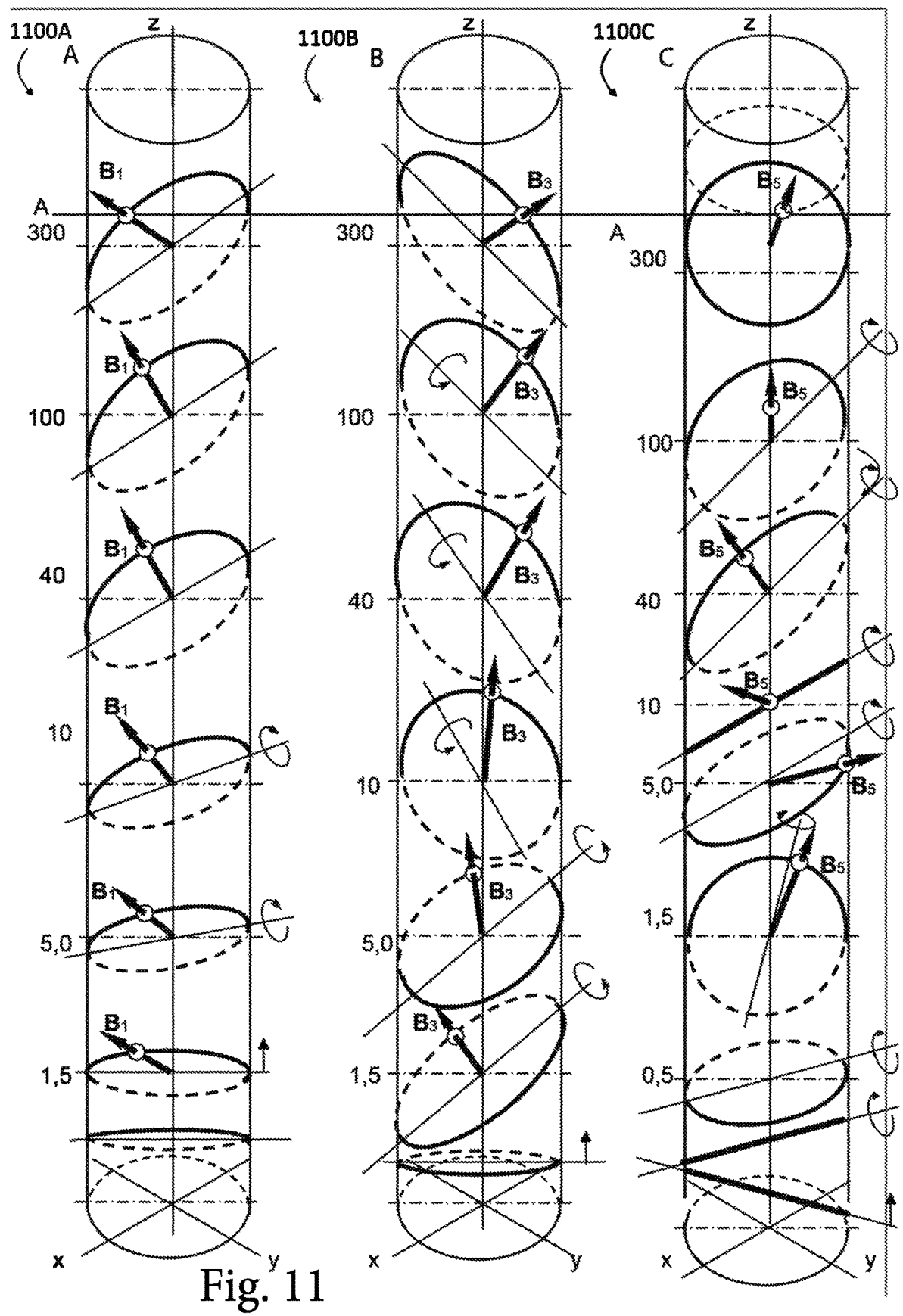
FIG. 11 shows overviews of oscillograms of the first, the third, the fifth harmonic of the sinusoidal time base, which represent polarization of scaled photons waves.

Further, in case of constant reference voltage, current in the circuit of the magnetizing winding is decreased gradually and for the various number values of the current oscillograms of the three harmonics are fixed. In FIG. 11, 1100A the oscillograms of the first harmonic are shown, 1100B—of the third harmonic, and 1100C—of the fifth harmonic, which are fixed at current 1.5, 5.0, 10.0, 40.0, 100.0, 300.0, 500.0 mA and Table 19 shows the number values of the phase of the three harmonics measured at the specified above values of current. The phase changes of each harmonic were fixed in relation to their phase at current 500 mA, which was taken equal to zero. The designations in Table 19 are as follows: $\varphi_1$—phase of the first harmonic, $\varphi_3$—phase of the third harmonic, $\varphi_5$—phase of the fifth harmonic.

TABLE 19

| | Number values of harmonic phase | | | | | |
|---|---|---|---|---|---|---|
| i mA | $\varphi_1$ deg | $\varphi_3$ deg | $\varphi_5$ deg | α deg | β deg | θ deg |
| 300 | 0 | 0 | 0 | 90 | 55 | 35 |
| 100.0 | 0.0 | 18.0 | 20.0 | 78.0 | 35.0 | 40.0 |
| 40.0 | 0.0 | 24.0 | 55.0 | 65.0 | 0.0 | 65.0 |
| 20.0 | 1.0 | | | | | |
| 10.0 | 10.0 | 45.0 | 90.0 | 50.0 | 27.0 | 80.0 |
| 5.0 | 20.0 | 63.0 | 125.0 | 45.0 | 47.0 | 90.0 |
| 1.5 | 30.0 | 90.0 | 180.0 | 42.0 | 78.0 | 125.0 |

Measuring the change of harmonic phase in case current decreases in the circuit of the magnetizing winding was carried out as follows.

At magnetic saturation of the ferromagnet by rotation of the phase shifter 24, curves producing Lissajous figure were combined on the screen of the oscilloscope in one curve. The position of the phase shifter 24 arm (the phase shifter has a scale division 1° and the needle indicator) in this case is taken as the output, and its readings—as a zero value. In case current decreases in the circuit of the magnetizing winding, the curvilinear lines of Lissajous figure are shifted relative to each other, due to the change of harmonic phase relatively to the phase of reference voltage. At some fixed current value, phase shifter is rotated until the curves on the oscilloscope 29 screen are combined in one curve, or, in case of the first harmonic, in one line. The number of divisions at the scale reflecting rotation angle of the phase shifter is counted, and this number is multiplied by the number of analyzed harmonic.

In the linear time base, the number of harmonic indicates in how many times the phase shift readings are less than the true change of the harmonic phase. Consequently, in order to eliminate the error introduced by the oscilloscope in measured phases, it is necessary to multiply phase shifter readings by the number of analyzed harmonic.

Measurement of Phase Shift Between Harmonics

The phase shift between the third and the fifth harmonics is determined in the mode of magnetic saturation (current in the circuit of the magnetization winding 500 mA).

The third harmonic oscillogram (1000B) shows, taking into account the error of the analyzer (FIG. 24), a zero phase shift between voltage of the third harmonic and reference voltage. The fifth harmonic oscillogram (1000C), taking into account the error of the analyzer (FIG. 24), represents displacement of the fifth harmonic voltage in relation to reference voltage at angle equal to 35°. And since the phase shift between the third harmonic voltage and reference voltage is zero, then, the phase shift between voltage of the fifth and third harmonics is also equal to 35°.

The determination of the phase shift between the voltage of the first and higher-order harmonics was carried out by bringing the oscillograms of the harmonics to the same kind on the basis of common reference voltage.

The same form of oscillograms of harmonics is obtained with the sinusoidal time base. For this purpose, the analyzer 5 of harmonics is switched to the frequency equal to the frequency of analyzed harmonic. In this case, the frequency of reference voltage is equal to the frequency of analyzed voltage and harmonics oscillogram will have the form of ellipses or circles.

Connection of harmonics oscillograms with each other, with the sinusoidal time base, is provided as follows.

Common reference voltage of the linear time base is chosen and in relation to it, the phase shifter exhibits the form of the oscillogram of the reference voltage of the sinusoidal time base, similar to the oscillogram of the analyzed harmonic, which was obtained earlier in the linear time base. And then, in relation to reference voltage of the sinusoidal time base, the oscillogram of the measured harmonic is determined. These measurements were carried out on the device shown in FIG. 3.

Current is set in the circuit of the magnetizing winding 500 mA (magnetic saturation of the ferromagnet), the frequency selector switch at the analyzer 3 is switched to the frequency 50 Hz at the analyzer 5—to the frequency of analyzed harmonic, for example 250 Hz, and the switch 28 in position "b". At the specified switchings, the first harmonic voltage ($f_1$=50 Hz) from the analyzer 3 output is derived to the horizontal deflection plates of the cathode-beam ray and acts as common reference voltage of the linear time base. Reference voltage of the sinusoidal time base ($f_5$=250 Hz) from the analyzer 5 output is derived to the vertical deflection plates of the cathode-beam ray of the oscilloscope. The screen depicts an oscillogram of the fifth harmonic in the form of two closed curves. The rotation of the phase shifter 24 leads to the transformation of reference voltage oscillogram of the linear time base into the form of the analyzed fifth harmonic oscillogram, as depicted in 1000C. Then the frequency selector switch at the analyzer 3 is switched to frequency 250 Hz, and selector switch 28 is set in a position "a". As a result, reference voltage of the sinusoidal time base, the phase of which is exposed in relation to common voltage of the first harmonic, enters to the horizontal deflection plates, and analyzed voltage is derived to the vertical deflection plates. The oscilloscope screen depicts an oscillogram whose shape is fixed in 1000F (circuit).

Then the analyzing passes to measuring the change of the phase of the fifth harmonic voltage in case the energy of the magnetizing electromagnetic field decreases. For this purpose, current is reduced in the circuit of the magnetizing winding to the values given in Table 19 and oscillograms for each value of current is fixed. In 1100C, these oscillograms are fixed, the numbers near oscillograms indicate the value of current in mA.

In the same way, the third harmonic voltage phase is measured.

The selector switch of frequency at the analyzer 3 is switched to the frequency 50 Hz, at the analyzer 5—at the frequency of analyzed third harmonic $f_3$=150 Hz, and the selector switch 28—in the position "b". The rotation of the phase shifter 24 leads to the transformation of oscillogram of the reference voltage of the linear time base into the form of the analyzed third harmonic shown in 1000B. Then the selector switch of frequency at the analyzer 3 is switched to the frequency 150 Hz, and the selector switch 28 is set to "a". The oscilloscope screen depicts an oscillogram of third harmonic in 1000F.

Then the change of the phase of the third harmonic voltage is measured in case the energy of the magnetizing electromagnetic field decreases. 1100B shows the oscillograms of the third harmonic for different values of current in the circuit of the magnetizing winding indicated at oscillograms.

Analogously, the phase of first harmonic voltage, whose oscillograms are shown in 1000D and in 1100A, are also measured.

An Overview of Measurement Results of the Harmonic Phase

1. Regularities of the connection between the spatial position of the orbits of electrons in the energy band and the polarization (phase) of the photons radiated by these electrons.

Oscillograms of 1000D-F are interconnected by common reference voltage of the first harmonic, in respect of which reference voltage phase of the sinusoidal time base. Thus, the above waveforms represent the phase shift between voltage of three harmonics. The following phase shift is experimentally established.

To combine oscillograms of the first harmonic (ellipse, 1000D) with the oscillogram of the third harmonic (1000E) it was necessary to return the arm of the phase shift to an angle equal to 90°. Thus, the phase shift between the voltage of the first and the third harmonics is equal to $\alpha$=90°.

To obtain the kind of the fifth harmonic (ellipse 1000D) from the first harmonic (1000F), it was needed to return the phase shifter knob at an angle equal to 55°. And this means that the phase shift between the voltages of the first and fifth harmonics is equal to β=55°. To obtain the kind of the third harmonic (ellipse 1000E) from the fifth harmonic (circuit in 1000F), it was needed to return the phase shifter knob at an angle equal to 35°. Therefore, the phase shift between the voltages of the third and the fifth harmonics is equal to θ=35°.

Above, by the oscillograms of the third (1000B) and the fifth harmonic (1000C), was established that the angle between the voltage of the third and the fifth harmonics is equal θ=35°. Thus, oscillograms obtained on the basis of the linear time base also represent the phase shift between harmonic voltage.

Magnetic induction of the electromagnetic magnet is indicated through the vector $B_0$ and it magnetizes the ferromagnet through the vector $B_1$—the magnetic induction of the first harmonics photons, through the vector $B_3$—the magnetic induction of the third harmonic photons, through the vector $B_5$—the magnetic induction of the fifth harmonics photons. Based on the fact that the voltage phase directly represents the phase of the photons by which this voltage is induced, in 1000D-F vectors of magnetic induction of the photons of the three harmonics inclusive of phase shift between the voltage, and, hence, between the vectors of magnetic induction of three harmonics, are shown.

Then, the vector diagram of the vectors of magnetic induction of three harmonics photons is constructed (1000G) inclusive of phase shift between the voltages of the harmonics. 1000H illustrates a simple cubic lattice with three axes of symmetry [100], [110], [111]. Proceeding from the crystallography it is known that the angle between the axes [100] and [110] is α=90°, the angle between the axes [110] and [111] is θ=35°, and the angle between the axes [100] and [111] is β=54.7°. Thus, there is a complete coincidence of the vectors of magnetic induction of the three harmonics photons of the electromagnetic field with the crystallographic axes of the cubic lattice.

It is also known that for monocrystal of pure iron and transformer steel, the direction of easy magnetization is the axis [100], of mean magnetization—axis [110] and of hard magnetization—axis [111]. Proceeding from this fact the magnetic induction vector of the first harmonics photons $B_1$ coincides with the direction of easy magnetization, which is parallel to cube edge 100, the magnetic induction vector of the third harmonic photons $B_3$ coincides with the direction of mean magnetization, which is parallel to the face diagonal 110, and the vector of magnetic induction of the fifth harmonic photons $B_5$ coincides with the direction of hard magnetization, which is parallel to the space diagonal 111.

The coincidence of magnetic induction vectors $B_1$, $B_3$, $B_5$ with crystallographic axes [100], [110], [111] indicates the absence of certain groups of electrons which in case of magnetic saturation radiate photons of different harmonics, whose initial phase represents angle between these crystallographic axes. Since the crystallographic axis [100], [110], [111] are normals to corresponding atomic surface area {100}, {110}, {111}, then it follows that vectors of moments quantity of certain groups of electrons motion of different energy levels, also are normals according to indicated atomic surface area. And obviously, in case of excitation of this groups of electrons, they radiate photons, the phase of which represents orientation direction of vectors of moments quantity of electrons motion. This means that the electrons, radiation of which represents the magnetic induction vector of the first harmonic $B_1$ photons, refer to atomic surface area {100}, electrons, radiation of which represents magnetic induction vector $B_3$—refer to atomic surface area {110}, and electrons, radiation of which represents magnetic induction vector $B_5$—refer to atomic surface area {111}.

Thus, according to the oscillograms in 1000A-H, vectors of magnetic induction $B_1$ of the three harmonic photons represent the spatial orientation (polarization) of vectors of moments quantity of electrons movement at three energy bands.

Figure 12:
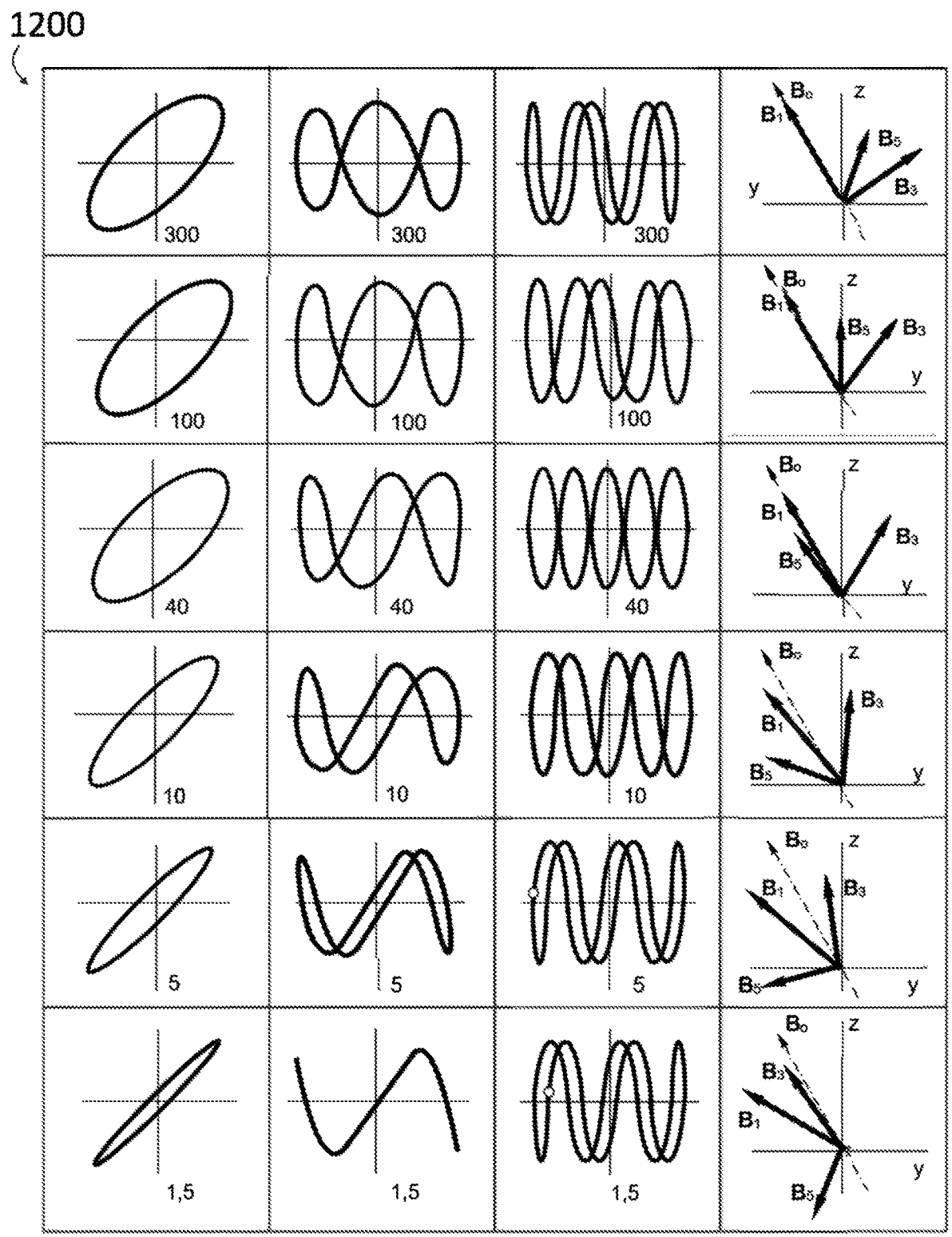
FIG. 12 shows overview of oscillograms of wave structure of scaled photons waves of the first, the third, the fifth harmonic at invariable reference current and current reduced in stepwise manner in a circuit of magnetizing winding.
Figure 13:
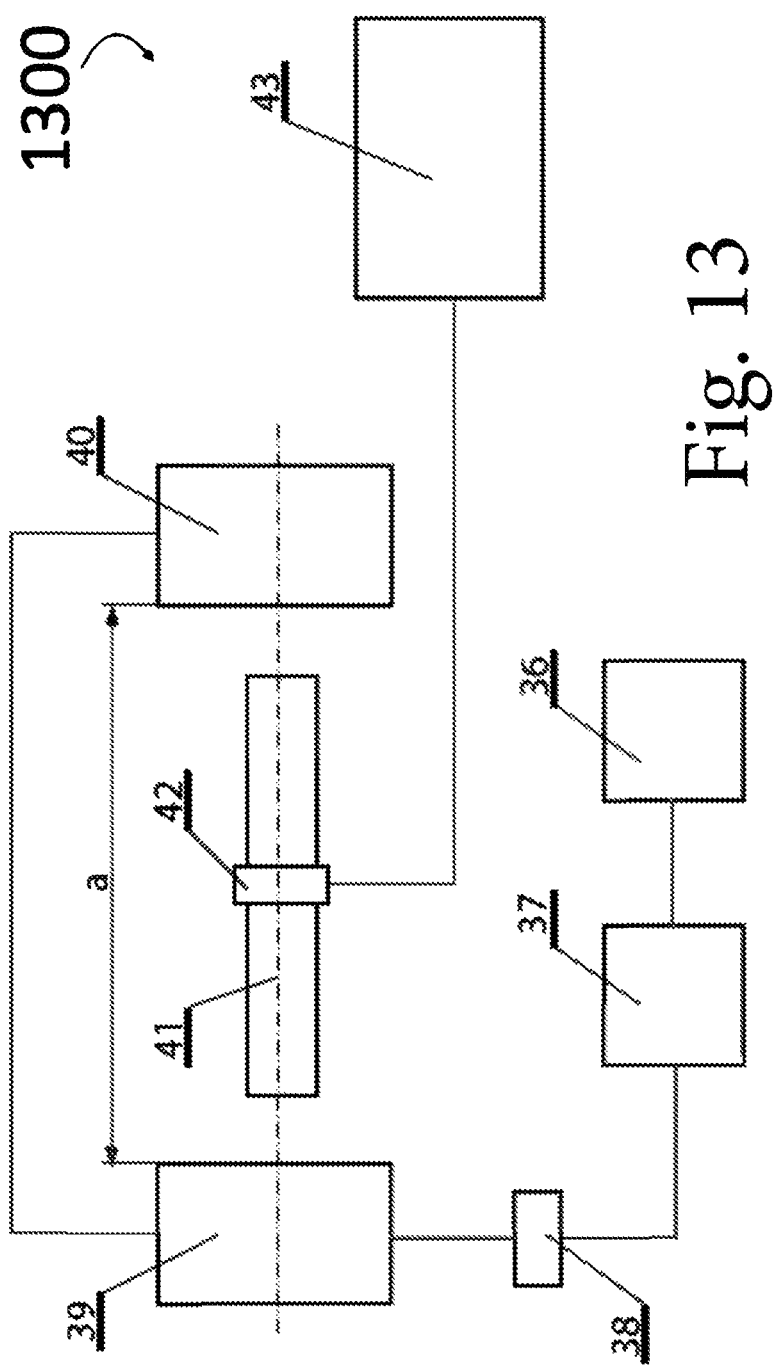
FIG. 13 shows overview of a schematic of a device for experimental analysis of samples is schematically

Based on established regularity, oscillograms obtained at reducing of current in the circuit of magnetizing winding presented in FIG. 11 and FIG. 12 are described.

2. Determination of the vector orientation of photons magnetic induction in time and in plane space at different values of current.

It is known that the value determining the direction and displacement at a given time is the phase of oscillations.

In FIG. 12 at the change of the appearance of oscillograms of the third and the fifth harmonic, it is clear that the displacement of two interconnected curves relatively to each other, is always going in the same surface space by magnitude proportional to the change of the phase between voltage and reference current of analyzed harmonic. Based on this fact, the displacement of the curves on the oscilloscope screen is considered as the rotation of vectors projections of the magnetic induction B of photons in a certain surface space yz. Then, vector diagrams from the vectors projections of magnetic induction of the three harmonics photons are constructed.

The vector diagram in 1000G is taken as the starting point for constructions of vector diagrams by oscillograms, which are fixed at other current values. Moving vector diagram of magnetic induction from 1000G to FIG. 12 is performed as follows.

Along with the oscillograms obtained at the current 300 mA, the coordinate axes yz are applied in FIG. 12. The vector yz is implemented in surface space yz at an optional angle to the axis z, for example, at an angle 20°. At magnetic saturation, the vectors of the magnetic induction of the photons of remagnatazing field and the first harmonic coincide, so the vector $B_1$ is combined with the vector $B_0$. Further, the vector of magnetic induction of the third harmonic $B_3$ is implemented at the angle α=90° to the vector $B_1$, and the vector of magnetic induction of the fifth harmonic $B_5$—at the angle β=55°. Vector diagram of the vector projections of magnetic induction of three harmonics photons is constructed only for current 300 mA.

In case the current is reduced to 100 mA, the phase of the third and the fifth harmonics voltage, which is represented by the displacement of interconnected curves relatively to each other on the oscillograms in FIG. 12, is changed. Table 19 shows the number values of phase change of this harmonics. Using tabular data, rotation in surface space yz is performed in the direction towards the vector $B_0$ of the magnetic induction and the third harmonic $B_3$ at the angle $\varphi_3$=18°, and the fifth harmonic $B_5$ at the angle $\varphi_5$=20°. As a result, a vector diagram of vectors projections of the magnetic induction of three harmonics photons radiated by a ferromagnet at current 100 mA is constructed.

In case the current is reduced to 40 mA the phase of the first harmonic voltage does not change, the phase of the third harmonic changes at the angle $\varphi_3$=24°, and the phase of the fifth harmonic changes at the angle $\varphi_5$=55°. The rotation of the vectors $B_3$ and $B_5$ is performed corresponding to indicated angles, resulting in obtaining the vector diagram of vectors projections of the three harmonics magnetic induction radiated by the ferromagnet at current 40 mA.

In case the current is reduced to 10 mA the phase of the first harmonic voltage changes to the angle $\varphi_1$=10°, the third harmonic phase changes to the angle $\varphi_3=45°$, and the fifth harmonic phase changes to the angle $\varphi_6=90°$. The rotation of the vectors $B_1$, $B_3$ and $B_5$ is performed corresponding to indicated angles, resulting in obtaining vector diagram of vectors projections of the three harmonics magnetic induction radiated by the ferromagnet at current 10 mA.

Then, analogously, vector diagrams for oscillograms obtained at current 5 mA and current 1.5 mA are constructed.

The vector diagrams in FIG. 12 occurs in the same surface space yz of the two-dimensional space, which means that vectors of magnetic induction represent the polarization of the photons.

The photons of remagnetizing field emit along axis of the winding in all range of current changes, and their phase does not change. Thus, in case the energy of remagnetizing field decreases, the orientation of the vector $B_0$ remains unchanged, and the vectors of the harmonic magnetic induction rotate relatively to the vector of magnetic induction $B_0$ due to the phase shift of the harmonics.

The phase of the photons forming the harmonics represents the spatial position of the orbits of electrons in the energy bands, therefore, according to polarization of the photons the orientation of vector of impulse moment of electron relatively to the spatial structure of quantum system is determined.

Example 8. Determination of the Structure of the Material by Residual Induction, Coercivity and Phase of Photons, Measured at the Time of the End of a Jump Phase Change The residual magnetic field is characterized by two physical magnitudes: coercivity $H_c$ and residual magnetic flux density $B_r$.

Coercivity is equal to the magnitude of the strength of the external electromagnetic field of inversed polarity at the moment of complete demagnetization of previous magnetized ferromagnet. Coercivity will be considered as a measure of energy of the electromagnetic field in which the electrons overcome the energy barrier.

The residual induction quantitatively displays the magnitude of the residual magnetic field of the ferromagnet after its magnetization to magnetic saturation. Thus, for the experimental confirmation of residual magnetism formation phenomenon, it is necessary to establish the internal connection between the coercivity $H_c$, residual induction $B_r$ of the ferromagnet, on the one hand, and energy of the external field, magnetic flux density of the fifth harmonic, which are measured at the end of the abrupt change of phase on the other hand. With a view to establish this connection special samples in steel 40H were made, which were quenched at T=850° (oil) and tempering, in order to change their structure in a given direction (Table 21) to obtain different residual magnetization. The chemical composition of steel 40H is shown in Table 20.

TABLE 20

Chemical composition of steel 40H

| Steel grade | Content of elements in % | | | | | | | |
|---|---|---|---|---|---|---|---|---|
| | C | Si | Mn | S | P | Cr | Ni | W |
| 40H | 0.43 | 0.31 | 0.70 | 0.025 | 0.028 | 1.02 | 0.005 | — |

TABLE 21

Tempering temperature and results of metallographic analysis of structure of samples in steel 40H

| No. of sample | Tempering temperature C.° | Rockwell hardness, HRC | Vickers hardness | Micro-structure |
|---|---|---|---|---|
| 1 | 200 | 50 | 560 (50 HRC) | Tempered martensite |
| 2 | 240 | 50 | 560 (50 HRC) | Bainite |
| 3 | 300 | 48 | 493-503 (48 HRC) | Bainite |
| 4 | 350 | 44 | 442 (44 HRC) | Troostite |
| 5 | 400 | 40-41 | 387-397 (40-41 HRC) | Troostite |
| 6 | 450 | 39 | 383 (39 HRC) | Troostite |
| 7 | 500 | 34-35 | 327-333 (35-36 HRC) | Sorbite |
| 8 | 550 | 31 | 289-294 (31 HRC) | Sorbite |
| 9 | 600 | 30-31 | 312 (34 HRC) | Sorbite |
| 10 | 650 | 28-29 | 287-306 (30-33 HRC) | Sorbite |
| 11 | 700 | 24-25 | 240-255 (24-25 HRC) | Sorbite-like perlite |

Coercivity $H_c$ and residual induction of the samples were measured by a coercivity meter KIMF—1. Sizes of samples: length l=95 mm, width b=14.79 mm, thickness δ=2.97 mm.

Description of the Block Diagram of the Device

The block diagram of the device for conducting an experimental analysis of the samples is shown in FIG. 13.

List of units: 33—regulated power supply unit of AC and DC; 34—band-stop filter for higher-order harmonic in the AC circuits; 35—DC and AC measuring unit; 36 and 37 electromagnetic energy transducers (magnetizing and bias coils); 38—analyzed sample; 39—flip coil, number of loops W=30, transducer PEL—0.21; 40—measurement unit EMID—4M.

Units 33—37 belong to the electromagnetic defectoscope EMID—4M, and the measurement unit 40 is composed of the devices shown in FIG. 3. The magnetizing coils 36 and 37 were installed at the distance 140 mm from each other ensure that their electromagnetic fluxes were summed up. The analyzed samples 38 with flip coil 39 which were remagnetized by resultant electromagnetic field propagating through two large gaps, were installed between the magnetizing coils. This method of the remagnetization of samples due to the fact that in case the sample is found inside the winding the first jump of fifth harmonic phase it is difficult to observe it because under the action of intensive field electrons of sample overcome the energy barrier quickly. In case the sample is remagnetized by electromagnetic field, some of which is scattered in space, energy of field that crosses the sample increases slowly and change process of the abrupt phase of the harmonic is observed in time at the screen of oscilloscope.

Defectoscope characterization. Electromagnetic induction defectoscope EMID—4M is designed for non-destructive testing of steel products quality. Measurement limits of current in circuit of sensor from 0 to 15 A. Frequency of the remagnetizing electromagnetic field: f=50 Hz. Diameter of the holes of coils (of sensors)—20 mm.

Measurement

Voltage and phase of the fifth harmonic were measured at the clamps of the flip coil, which was located directly on the sample, and together with the latter was placed in remagnetizing electromagnetic field. In purpose of determining the energy of remagnetizing field, the voltage was measured at the ends of the flip coil without a sample placed in the field. The limits of current increase in the circuit of magnetizing coils (of sensors) were determined by the completion of the first jump of the fifth harmonic phase.

Measurement results of the voltage amplitude of the fifth harmonic $U_5$ and voltage amplitude $U_0$, which induced by remagnetizing field in the flip coil without sample gathered in the format of Table 22 in the second column. The first column of this tabular format shows value of the magnetizing current in which this voltage is measured.

Figure 14:
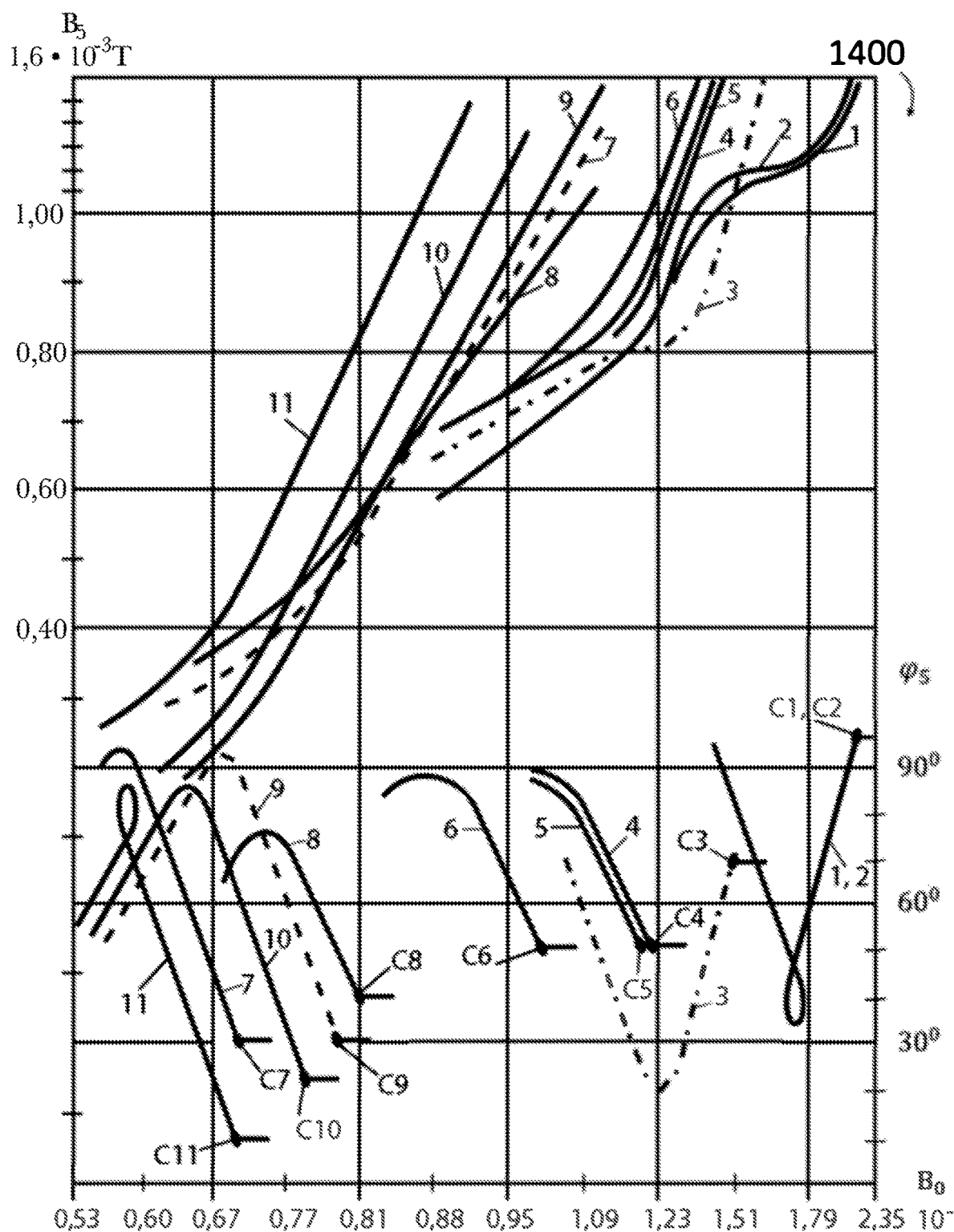
FIG. 14 shows overview of the changes in phase of the fifth harmonic.

The phase was measured by the oscillographic method by changing Lissajous figure. Helically-formed spatial rotation of Lissajous figure is shown in 1100C. The number value of abrupt phase change is shown in FIG. 14. The completion of phase jump is fixed on curved with points C1÷C11.

Processing of Measurements Results

The value of operating voltage at the clamps of the flip coil was determined by the formula:

$$U_{in} = \frac{U_n}{K_{30}} \qquad (66)$$

where $K_{30}$—gain of harmonic analyzer at setting suspectability dB=30.

In case frequency $f_v$=50 Hz is set at the analyzer, gain is $K_{30}$=819 and at frequency $f_5$=250 Hz is set—gain is $K_{30}$=1524. Therefore, when filling in the format of Table 22 and Table 23 numeral values of the operating voltage of the fifth harmonic were entered to the third column and calculated by using the formula:

$$U_{5in} = \frac{U_5}{1524} \qquad (67)$$

The operating voltage, induced in the flip coil by remagnetizing field at the analyzer input, was determined by using the formula:

$$U_{0in} = \frac{U_0}{819} \qquad (68)$$

Magnetic flux density is computed by the equation (36):

$$B_n = \frac{U_n}{4.44 f_n SW}.$$

Number of loops W=30. Flip coil is wound in one layer on a very thin frame, which covered the sample, so the cross section of the coil equates to the cross section of the sample, and in relation to this section, computations are made:

$$S_c = S_s = b\delta = 0.01479 \cdot 0.00297 = 43.926 \cdot 10^{-6} \text{ m}^2$$

Then the values W and $S_c$ in the equation (36) are substituted.

For the frequency f=50 Hz equation (36) takes the form:

$$B_0 = \frac{U_{nin} 10^6}{292547} K \qquad (69)$$

For frequency $f_5$=250 Hz of equation (36) takes the form:

$$B_5 = \frac{U_{5in} 10^6}{1462735} K \qquad (70)$$

where $K = \frac{s}{m^2}$ – is the coefficient of dimension.

The number values of the magnetic flux density, computed by the formula (69), are entered into Table 23, and by the formula (70)—in Table 22.

Specified tables are filled in by the following form.

TABLE 22

Form of the table for computing the amplitude of the voltage and the magnetic flux density of the fifth harmonic.

| i | $U_5$ | $U_{5in} = \frac{U_5}{1524} K$ | $B_5 = \frac{U_{5in} 10^6}{1462735} K$ |
|---|---|---|---|
| A | V | V | T |

TABLE 23

Form of the table for computing the voltage amplitude and the magnetic flux density of the remagnetizing field.

| i | $U_0$ | $U_{0in} = \frac{U_0}{819} K$ | $B_0 = \frac{U_{0in} 10^6}{292547} K$ |
|---|---|---|---|
| A | V | V | T |

Representing of results of measuring magnetic flux density and phase of the fifth harmonic using graphs.

Table 24 and Table 25 show the number values of magnetic flux density of samples $B_5$ and $B_0$ measured at current values i when there is a abrupt change of the fifth harmonic phase of the fifth harmonic.

TABLE 24

Number values of magnetic flux density $B_5$ and $B_0$, for the construction of functional dependency $B_5 = f(B_0)$ (samples 1 ÷ 5)

| i mA | $B_0$ $10^{-2}$T | $B_1$ $10^{-3}$T | $B_2$ $10^{-3}$T | $B_3$ $10^{-3}$T | $B_4$ $10^{-3}$T | $B_5$ $10^{-3}$T |
|---|---|---|---|---|---|---|
| 0.25 | 0.17 | 0.08 | 0.08 | 0.09 | 0.10 | 0.09 |
| 0.5 | 0.33 | 0.17 | 0.17 | 0.20 | 0.22 | 0.21 |
| 0.75 | 0.50 | 0.26 | 0.26 | 0.32 | 0.37 | 0.35 |
| 1.0 | 0.67 | 0.38 | 0.38 | 0.45 | 0.51 | 0.49 |
| 1.25 | 0.83 | 0.56 | 0.56 | 0.60 | 0.65 | 0.65 |
| 1.50 | 1.02 | 0.71 | 0.71 | 0.74 | 0.75 | 0.74 |
| 1.75 | 1.25 | 0.83 | 0.86 | 0.80 | 0.89 | 0.85 |
| 2.00 | 1.28 | 0.94 | 0.98 | 0.86 | 1.10 | 1.07 |
| 2.25 | 1.47 | 1.07 | 1.11 | 1.07 | 1.60 | 1.52 |
| 2.50 | 1.52 | 1.14 | 1.16 | 1.48 | 2.00 | 1.90 |
| 3.00 | 1.96 | 1.34 | 1.34 | 2.60 | 3.10 | 3.00 |
| 3.50 | 2.29 | 1.74 | 1.79 | 3.27 | 3.60 | 3.50 |

FIG. 14 shows functional dependencies $B_5=f(B_0)$ and $\varphi_5=f(B_0)$ for samples in steel 40H, which have been tempered at temperature 850° C. and subsequently temper within temperature intervals T=(200°±700°) C. in each 50° C. The amplitude and phase dependencies (curves in FIG. 14) have the number of analyzed samples (1÷11).

The curves of magnetic flux density $B_5$ of the fifth harmonic (FIG. 14) represent the number of spectral lines of the electromagnetic field radiated by the excited electrons of the fifth energy band of the crystals of analyzed steel samples. Since each periodically excited electron forms its spectral line, each point of the magnetic flux density $B_5$ curve corresponds to a certain number of excited electrons.

Thus, the curves of magnetic flux density $B_5$ an idea of a certain number (expressed through the units of magnetic flux density) of the excited electrons falling the energy band, which is then called as the electronic concentration of the energy band, is gotten.

TABLE 25

Numerical values of magnetic flux density $B_5$ and $B_0$, for constructing functional dependency $B_5 = f(B_0)$ (samples 6 ÷ 11)

| i mA | $B_0$ $10^{-2}$T | $B_6$ $10^{-3}$T | $B_7$ $10^{-3}$T | $B_8$ $10^{-3}$T | $B_9$ $10^{-3}$T | $B_{10}$ $10^{-3}$T | $B_{11}$ $10^{-3}$T |
|---|---|---|---|---|---|---|---|
| 0.25 | 0.17 | 0.10 | 0.10 | 0.10 | 0.10 | 0.10 | 0.08 |
| 0.50 | 0.33 | 0.23 | 0.22 | 0.23 | 0.23 | 0.21 | 0.19 |
| 0.75 | 0.50 | 0.35 | 0.34 | 0.36 | 0.37 | 0.35 | 0.35 |
| 1.00 | 0.67 | 0.49 | 0.42 | 0.49 | 0.46 | 0.43 | 0.50 |
| 1.25 | 0.83 | 0.58 | 0.64 | 0.62 | 0.62 | 0.74 | 0.98 |
| 1.50 | 1.02 | 0.74 | 1.12 | 0.96 | 1.09 | 1.57 | 1.79 |
| 1.75 | 1.25 | 1.06 | 1.79 | 1.5 | 1.70 | 2.40 | 2.58 |
| 2.00 | 1.28 | 1.61 | 2.42 | 2.15 | 2.4 | 3.4 | 3.6 |
| 2.25 | 1.47 | 2.15 | 3.1 | 2.8 | 3.,20 | 4.7 | 4.7 |
| 2.50 | 1.52 | 2.60 | 3.7 | 3.3 | 3.80 | 5.4 | — |
| 3.00 | 1.96 | 3.4 | — | — | — | — | — |
| 3.50 | 2.29 | 3.9 | — | — | — | — | — |

The abrupt change of the fifth harmonic phase was determined by the oscillographic method of abrupt change of Lissajous figure. Each point of the phase curves presents the spatial position of the orbits of surface space of individual groups of electrons or the spatial orientation of their orbital moment. This means that the phase curves present the spatial state of the orbital moving of the excited electrons in the energy band, in the process of overcoming the energy barriers by the electron group, and the dependency of this process on the change of the steel structure. Then the structure of analyzed samples in interconnection with the curves is described in FIG. 14.

The curves with the number 1 correspond to tempered martensite structure, obtained as a result of tempering of the sample 1 at 200°. The curves with the number 2 correspond to the structure of bainite, obtained at tempering of the sample 2 at. 240° C. The structure of the sample changed slightly, but the hardness remained almost unchanged (50HRC). The curves of magnetic flux density and phase curves with the numbers 1 and 2 coincide (FIG. 14). To obtain the abrupt phase change, a magnetic flux density of magnetizing field having the maximum value in relation to the magnetic flux density of other samples is required. The curves of magnetic flux density 1 and 2 correspond to the largest number of electrons that overcame the energy barrier.

The curves with the number 3 correspond to the structure of the bainite obtained as a result of tempering of the sample 3 at 300°. The structure of the sample did not changed, and the hardness decreased (48HRC). The abrupt phase change occurs with at smaller number value of the magnetic flux density of magnetizing field, the phase curve 3 differs slightly from the phase curve 2, the magnetic flux density after the completion of the phase jump (point C3) represents the decreasing of the number of electrons that overcame the energy barrier.

As a result of three samples tempering, respectively, at 350° C., 400° C. and 450° C. there was a transformation of martensite into tempered troostite (fine-dispersed ferrite-cement mixture). The hardness of the samples decreased accordingly (44HRC, 41HRC, 39HRC). Three phase curves and magnetic flux density curves, which are identified with numbers 4, 5, 6, correspond to the structure of the troostite. Phase curves 4, 5, 6, representing the abrupt overcoming of the energy barrier by electrons, are similar, but differ sharply from other phase curves. The abrupt phase change occurs at different values of magnetic flux density of magnetizing field, and magnetic flux density of the fifth harmonic at the completion of the phase jump (points C4, C5, C6) is slightly different (FIG. 14) and represents further decreasing of the number of electrons that overcame the energy barrier.

As a result of the tempering of four samples, respectively, at 500° C., 550° C., 600° C. and 650° C. tempered sorbite was produced, ferrite-cement mixture, more than troostite. The hardness of the samples decreased even more (34HRC, 31HRC, 29HRC). The four phase curves and the magnetic flux density curves under the numbers 7, 8, 9, 10 correspond to the structure of sorbite. Phase curves 7, 9, 10 are identical, curve 8 is slightly different. The abrupt phase change occurs at a minimum value of magnetic flux density of remagnetizing field (0.7÷0.8T). The magnetic flux density of the fifth harmonic at completion of the phase jump (points C7, C8 C9, C10) differs slightly (FIG. 14) and represents down to the minimum of number of electrons that overcame the energy barrier.

The curves with number 11 correspond to the structure of sorbite-like perlite obtained as a result of tempering of sample 11 at 700° C. Hardness is the lowest (24HRC). The phase curve 11 differs from the other phase curves and represents the process of abrupt overcoming of the energy barrier by the electrons at a small value of magnetic flux density of remagnetizing field. Magnetic flux density of the fifth harmonic at completion of the phase jump (point 11) represents the lower limit of the number of electrons that overcame the energy barrier.

Thus, the explicit dependency of the hop-like phase change of the fifth harmonic on the change in the structure of the steel samples 40H is experimentally established. This makes possible to determine the coercivity and induction at the time of the completion of the jump of the fifth harmonic phase, and then to compare the values obtained with the general coercivity and residual induction of samples, measured by other methods and instruments.

Determination of Coercivity at the Time of Completion of the Abrupt Phase Change of the Fifth Harmonic For this purpose, a formula known in theoretical electrical engineering is used, which expresses the connection between the strength of electromagnetic field and the density of magnetic flux in the space filled with the substance:

$$H = \frac{B}{\mu\mu_0} \tag{71}$$

To determine the coercivity at the time of completion of the jump of the fifth harmonic jump, the expression (72) is written as follows:

$$H_{C5} = \frac{B_{0C}}{\mu\mu_0} \tag{73}$$

where $H_{C5}$ strength of remagnetizing field, at which the abrupt phase change of the fifth harmonic completes; $B_{0C}$ value of magnetic flux density of remagnetizing electromagnetic field, measured at the moment of completion of abrupt phase change of the harmonic, $\mu_0 = 12.56 \cdot 10^{-7}$ H/m—magnetic constant; $\mu$—magnetic permeability characterizing the magnetic properties of the material.

The magnetic permeability of steel 40H was determined as follows.

The sample of the measurement winding was placed inside the sensor. AC (50 Hz) in the circuit of the winding of the sensor gradually increased from zero to 15A and, through a certain current increase, the voltage amplitude $U_1$ of the first harmonic (50 Hz) was measured. Then these same measurements were repeated, but only the voltage was measured in circumstances excepted sample. The formulas given in Table 23 compute magnetic flux density of the first $B_1$ harmonic and remagnetizing field. Magnetic permeability is computed from the ratio:

$$\mu = \frac{B_1}{B_0} \quad (74)$$

Table 26 shows the results of computations of magnetic permeability in the range of magnetic flux density change $(0.69 \div 1.96)10^{-2}$T.

Magnetic permeability for analyzed samples is defined: $\mu = 10$.

Magnetic permeability value is substituted in formula (73):

$$H_{C5} = \frac{B_{0C}10^7}{125.6} K_{\mu_0} \quad (75)$$

where $K_{\mu_0} =$ H/m—coefficient that matches the dimension in the equation (74).

TABLE 26

Number values of magnetic permeability

| $\mu$ | $B_0$ $10^{-2}$T | $B_1$ $10^{-2}$T | i A |
|---|---|---|---|
| 10.3 | 0.69 | 7.1 | 1.0 |
| 10.1 | 1.02 | 10.3 | 1.5 |
| 9.94 | 1.96 | 19.5 | 3.0 |

For further computations, the dimension of coercivity is brought to the following units. Meters are expressed in centimeters: $A/m = A/10^2$ cm and formula (75) is rewritten as follows:

$$H_{C5} = \frac{B_{0C}10^5}{125.6} K_{\mu_0}, \frac{A}{cm} \quad (76)$$

Number values of the coercivity computed by the formula (75) are listed in Table 27.

The residual induction of the fifth harmonic is determined by the voltage measured at the moment of completion of the abrupt phase change:

$$B_{r5} = B_{5C} = \frac{U_{5C}}{4.44 f_n SW} \quad (77)$$

Magnetic flux density $B_{5C}$ values corresponding to the moment of completion of the fifth phase jump of the fifth harmonic are determined from equation (77), and are listed in Table 27.

Measurement of coercivity $H_C$ and residual induction $B_r$ of analyzed samples by instruments KIMF—1 and KRM—Ts.

Measurement of coercivity $H_C$. The results of measurements of analyzed samples coercivity by special devices are given in Table 28.

TABLE 27

Number values of coercivity

| No. of sample | Tempering temperature, °C | $B_{5C}$ $10^{-3}$T | $B_{0C}$ $10^{-2}$T | $H_{C5} = \frac{B_{0C}10^5}{125.6} K_{\mu_0}$ A/cm |
|---|---|---|---|---|
| 1 | 200 | 1.34 | 1.96 | 15.6 |
| 2 | 240 | 1.34 | 1.96 | 15.6 |
| 3 | 300 | 1.07 | 1.47 | 11.7 |
| 4 | 350 | 0.84 | 1.23 | 9.79 |
| 5 | 400 | 0.86 | 1.19 | 9.47 |
| 6 | 450 | 0.74 | 1.02 | 8.12 |
| 7 | 500 | 0.44 | 0.69 | 5.49 |
| 8 | 550 | 0.58 | 0.80 | 6.36 |
| 9 | 600 | 0.49 | 0.78 | 6.20 |
| 10 | 650 | 0.49 | 0.74 | 5.89 |
| 11 | 700 | 0.52 | 0.69 | 5.49 |

Coercimeter KIMF—1 is designed to measure the coercivity in residual magnetization. Demagnetization current is measured, and coercivity is determined by the formula, which is in the instructions on the device.

The sample was installed on Π-like sensors and was magnetized to saturation by constant magnetic field. Then the magnetization was stopped, and magnitude of demagnetization current $i_d$ was increasing till zero readings of the device, which records the residual magnetization of the sample, was obtained. The value of demagnetization current $i_d$ for each sample was listed in Table 28, and the coercivity was determined by the magnitude of current $i_d$.

A digital coercimeter KRM—Ts is designed to measure local coercivity. Rod-type sensor. Magnetization is impulsive. Readings of device is digital, directly in A/cm.

TABLE 28

Results of measurements of the coercivity of analyzed samples by special devices

| Samples | | Device | | Device KIMF - 1 | | |
|---|---|---|---|---|---|---|
| No. In order | Tempering temperature, °C | KRM - Ts $H_C$ A/cm | $i_d$ $10^{-3}$A | $H_C$ A/cm | $B_c$ Scale division ($N_{sd}$) left | right |
| 1 | 200 | 22.9 | 86.4 | 21.50 | +77 | — |
| 2 | 240 | 22.9 | 86.2 | 21.44 | +70 | — |
| 3 | 300 | 19.5 | 68.0 | 16.38 | +23 | — |
| 4 | 350 | 13.2 | 50.0 | 11.38 | — | −68 |
| 5 | 400 | 12.8 | 50.0 | 11.38 | — | −70 |
| 6 | 450 | 12.0 | 48.0 | 10.83 | — | −87 |
| 7 | 500 | 10.0 | 44.0 | 9.72 | — | −100 |
| 8 | 550 | 10.6 | 45.0 | 10.00 | — | −98 |
| 9 | 600 | 10.6 | 46.0 | 10.00 | — | −98 |
| 10 | 650 | 12.0 | 49.0 | 11.10 | — | −90 |
| 11 | 700 | 12.2 | 48.5 | 10.83 | — | −90 |

Measurement of Residual Magnetic Flux Density of Analyzed Samples

An induction saved in a ferromagnet after magnetization by its constant magnetic field, whose strength then decreases to zero, is called as residual induction $B_r$.

The residual magnetic flux density of analyzed samples was measured by coercimeter KIMF—1. The samples were installed on Π-like sensor and magnetized to magnetic saturation, then the magnetizing current in the windings producing constant magnetic field, decreased to zero. The residual magnetic field of the samples was compared with the reference magnetic field of reverse polarity, which produced the demagnetizing current $i_d$=64 mA flowing in the magnetizing windings. The difference between the measured and the reference magnetic fields was converted by flux-gate meter (not shown) into an electrical signal that was responded by a microamperemeter. With the above-mentioned demagnetizing current, the microamperemeter needle was deflected at the limits of the device scale when measuring the residual induction of all analyzed samples. Since device scale is not laid out in magnetic flux density units, the measured relative residual induction of samples is presented in Table 28 in the scale divisions $N_{sd}$. The scale of the microampermeter has a zero in the middle, so the direction of deflection of needle is indicated by "+" and "−", which stand before the numbers indicating the number of scale's divisions of device by one ("+"), and on the other ("−") side from zero.

Graphic Imaging of Measurement Results

Figure 15:
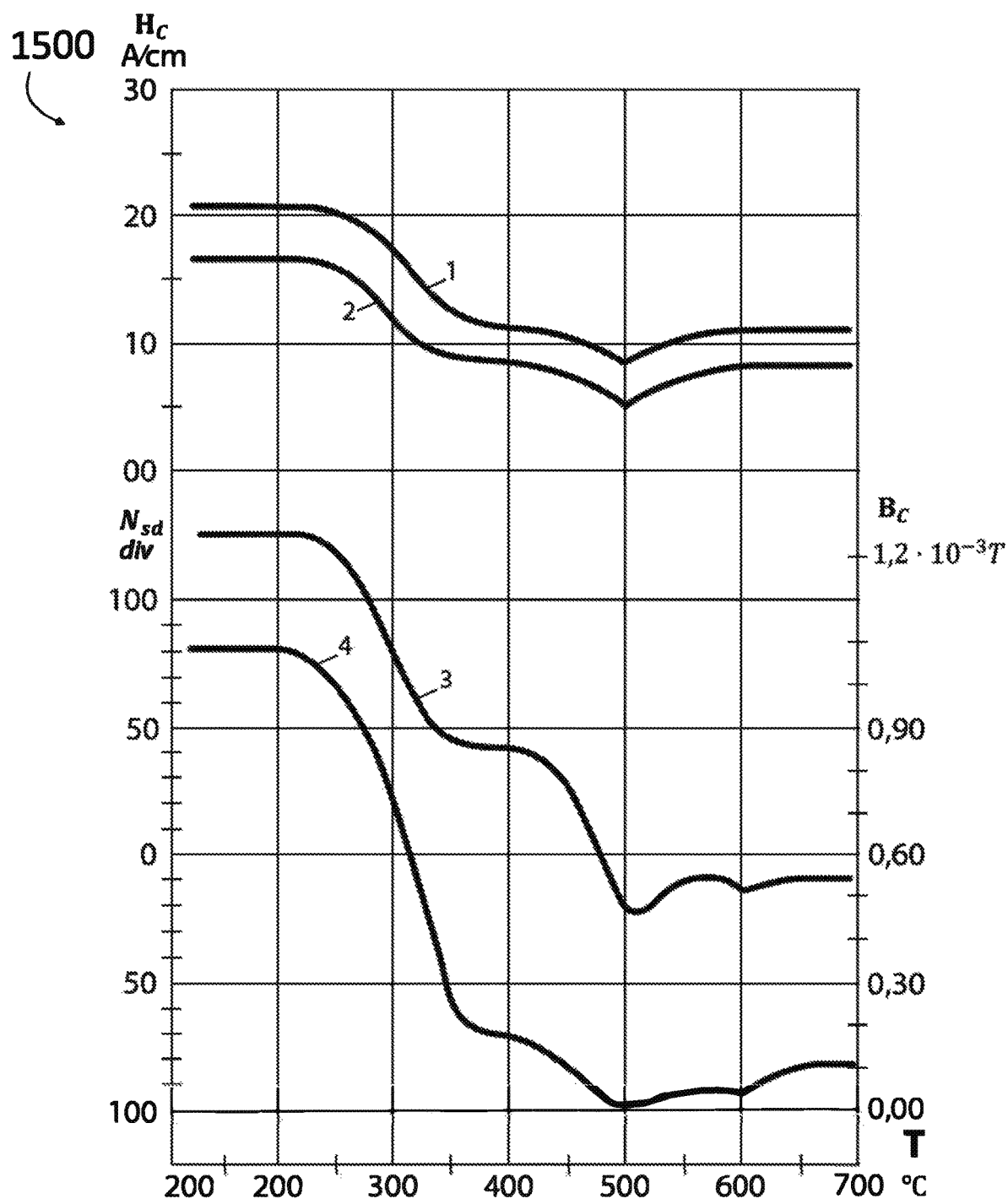
FIG. 15 shows overview of a dependency of coercivity and magnetic flux density on tempering temperature of samples.

The curves showing the dependency of the coercivity and magnetic flux density measured with different methods on tempering temperature (structure) of samples are shown in FIG. 15:

1—the dependency of coercivity $H_C$ measured at zero residual induction on tempering temperature of the samples;
2—the dependency of the coercivity $H_{C5}$ measured at the completion moment of jump of the fifth harmonic phase on tempering temperature;
3—the dependency of the fifth harmonic induction $B_{5c}$ measured at the completion moment of the jump of the fifth harmonic phase on tempering temperature of the samples;
4—the dependency of residual induction $B_r$ measured after magnetization by constant magnetic field on tempering temperature of the samples.

An Overview of the Measurements Results of Coercivity and Magnetic Flux Density

Comparing the curves 1 and 2, and then the curves 3 and 4 (FIG. 15), there is a complete analogy between them.

The behavior of strength of remagnetizing field that moves electrons through the energy barrier (curve 2) accurately represents the behavior of coercivity of samples with different structure (curve 1).

The behavior of induction of the fifth harmonic electromagnetic field which is radiated by electrons having overcame the energy barrier (curve 3), accurately represents the behavior of the residual induction of samples with different structures (curve 4).

Regular connection between strength of remagnetizing field that moves electrons through the energy barrier and the coercivity of induction between induction of the fifth harmonic and residual magnetic flux density (FIG. 15) is experimentally deduced, which gives a reason to believe that electrons locked by energy barrier in excitement state causes producing of residual magnetic field in ferromagnets.

Microscopic (elementary) magnetic fields arise around energy barriers in nuclear surface areas of grains—crystallites forming a ferromagnetic body. In its summation, the microscopic magnetic fields represent a residual magnetic field of the body.

This finding is experimentally deduced by the curves in FIG. 15. The dependency of residual magnetic flux density and, accordingly, the coercivity on the change of ferromagnetic samples structure, which is represented by the curves 1, 2, 3, 4, may be explained by the fact that structural changes in the steel cause changes in the level (threshold) of energy barriers in the nuclear surface area. The largest level (threshold) of energy barriers in nuclear surface area determines the structure of martensite and troostitomartensite (200° C., 240° C.). And this barrier holds out the largest group of electrons in the fifth energy band in an excited state. As a result, a large difference of potential, which causes a relatively significant residual magnetic flux density in the analyzed steel, is formed relatively to the largest energy barrier. The lowest level (threshold) of energy barriers determines the structure of sorbitol (500° C. and above). Low energy barrier holds the smallest group of electrons in the fifth energy band in an excited state, and therefore the residual induction is minimal.

Technical and Economic Efficiency of the Invention

By the use of the present method and the device, the structure of the electromagnetic field and the material of analyzed object, which had not been determined before, may be measured and determined.

The application of the method and the device in practice allows fast testing of the structure of the material during the production of products at any stage of its processing procedure, as well as in the process of further exploitation of products, while testing time of the product is several tens of seconds.

Examples of Technical and Economic Efficiency

In the electrotechnical industry, increasing of efficiency in steel using allows testing of the magnetic properties of finished products at different stages of the technological process, and, depending on testing results, adjust this process. However, existing methods and instruments of testing do not allow high accuracy and productivity for determination of the most informative characteristics of the finished electrical products and workpieces. This problem is solved by the application of the invention.

Below the exponents of the invention compared to the exponents taken to measure the magnetic and electrophysical characteristics of magnetically soft materials in constant magnetic fields are given.

Iron-nickel alloys. "The first group includes alloys with the highest values of magnetic permeability and the minimum values of coercivity. This group includes alloys of type 74NMD, 76NHD, 77NHD 79NM, 79NMU, (79NMA), 80NM, 80NH, 80NHS and others. These alloys contain approximately 75÷80% of nickel and have low values of saturation induction, which are in the boundaries from 0.6T to 0.85T ". [11, p. 38]

The reference properties of alloy 80NCS at DC under testing are given in Table 29.

TABLE 29

Characteristics of the alloy 80NCS

| Alloy grade | $\mu_{ini}$ | $\mu_{max}$ | $H_c$ A/m | $B_s$ T | $B_r/B_m$ | $\rho$ $\mu\Omega \cdot$ cm |
|---|---|---|---|---|---|---|
| 80HXC | $(3\text{-}7) \cdot 10^4$ | $(1.5\text{-}3) \cdot 10^5$ | 0.8-1.6 | 0.65 | — | 62 |

[11,p,39]

Exponents of the invention for the testing of alloy 80NCS properties and structure.

Magnetic induction of saturation of the alloy 80NCS at AC. Magnetization at crystallographic axes.

The vector of magnetic induction of the first harmonic saturation coincides with the direction of easy magnetization [100] (1000H), and the module equals:

$B_{S1}=0.557418T$

The vector of magnetic induction of the third harmonic saturation coincides with the direction of the average magnetization [110] (1000H), and the module equals:

$B_{S3}=0.184481T$

The vector of magnetic induction of the fifth harmonic saturation coincides with hard magnetization [111] (1000H), and the module equals:

$B_{S5}=0.108943T$

Total magnetic flux density of saturation:

$B_S=B_{S1}+B_{S3}+B_{S5}$

The number value of the total magnetic flux density is:

$B_S=0.557418+0.184481+0.108943=0.85T$

The number of free electrons producing the main crystallographic surface areas is determined by the magnitude of the magnetic flux density of saturation of the first, third and fifth harmonics.

Crystallographic Surface Area (100):

$n_{(100)}=n_{B1}=3.479127 \cdot 10^{18}$

Crystallographic Surface Area (110):

$n_{(110)}=n_{B3}=1.151439 \cdot 10^{18}$

Crystallographic Surface Area (111):

$n_{(111)}=n_{B5}=0.679968 \cdot 10^{18}$

The separation of electrons at the energy levels in the crystallographic surface area is determined by the frequency of the photons and the main magnetizing curve (FIGS. 9A-B).

The spatial orientation of the orbits of free electrons in the nuclear surface area is determined by the polarization of the photons (1100A-C).

Non-Destructive Testing (NDT)—Testing of the Reliability of the Main Working Properties and Parameters of the Object or its Individual Elements/Nodes, which does not Require the Making the Object Inoperative or its Disassembling Proceeding from FIG. 15 that the coercivity and the residual magnetic flux density of steel 40H measured in constant magnetic field can not be used as characteristics for testing of the steel structure throughout the band of tempering temperature. The method based on magnetic phenomena is limited.

Proceeding from FIG. 14 the coercivity and the residual magnetic flux density measured at the moment of the phase jump can be used along with the phase characteristics for testing of the steel structure according to the parameters of the fifth harmonic throughout the band of tempering temperature. Whereby, the underlying phenomena occurring in the depths of a crystal lattice are analyzed: the interaction of electrons with structural defects, the separation of electrons in the energy band, the spatial orientation of the electron orbits, the number of electrons at different energy levels. For this purpose, the magnetizing curve, the magnetic flux density of saturation, the phase of photons are measured in an alternating magnetic field, in different modes of magnetization and for various harmonics, for example, the first, the third and others. This means that the invention may be used for multi-parameter testing of materials in automatic control subsystems of the production and operation of products process.

Thus, a transition from the measurement of magnetic and electro-physical characteristics of the magnetic materials in constant magnetic fields to the measurement of characteristics in alternating magnetic fields and the determination of the electronic structure of quantum material systems that provides high accuracy, reliability and productivity of testing is performed. Therefore, the use of the invention will contribute solving problems which retain the introduction of automatic control subsystems by the production of products, not only from electro-technical steels but also from other materials.

Figure 16:
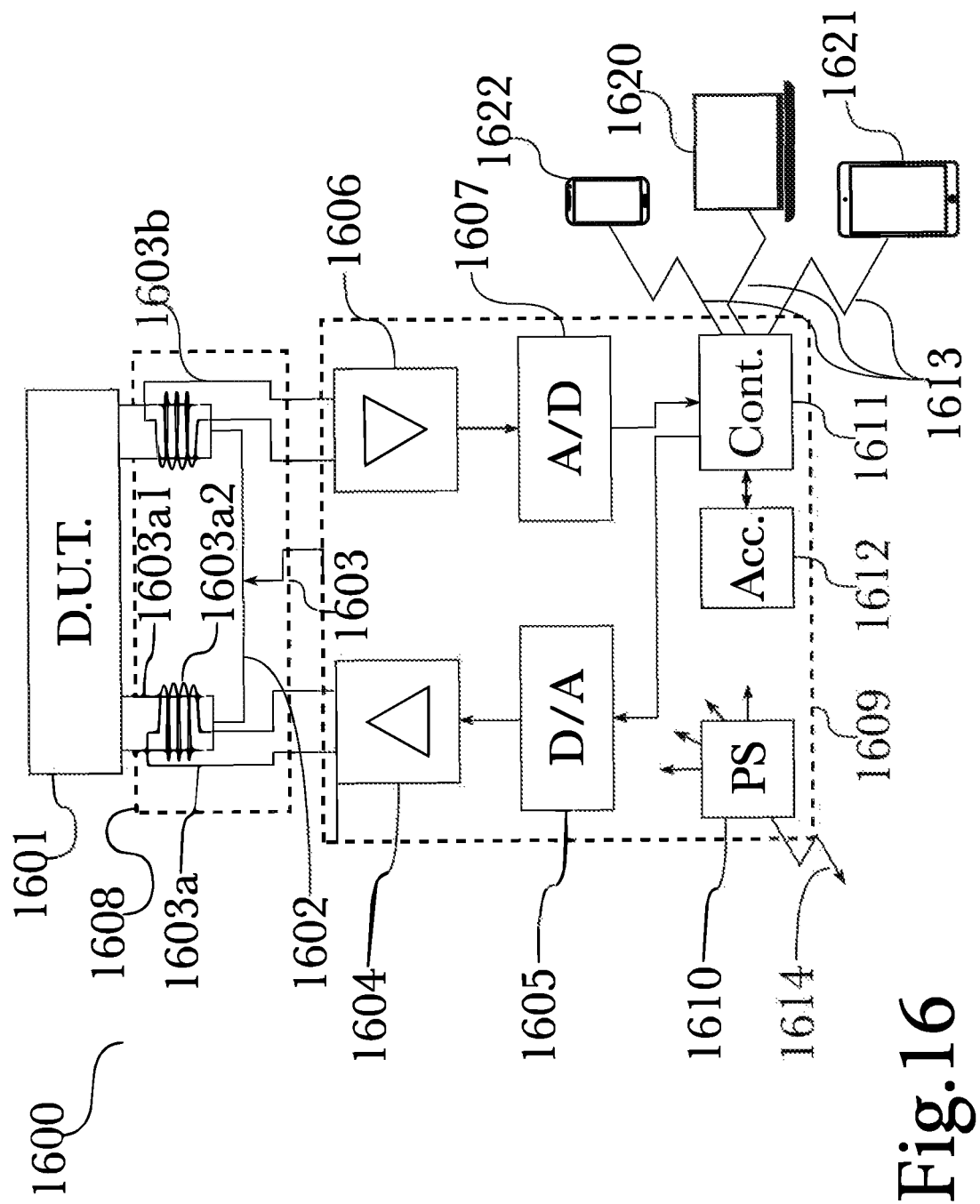
FIG. 16 shows a more simplified system overview.

FIG. 16 is a simplified overview 1600 of a combination of FIGS. 2A, 2B, and 3. At the top it shows the pickup device 1602 with the windings 1603a2 and 1603b and the core 1603a consisting of the core 1603a1 and the windings 1603a2 simplified inductor and analogous 1603b. Also shown is the mechanical holder 1603 that allows the user to accept pressure onto the device under test (DUT) 1601. This entire unit is the assembly 1608 (exemplary implementation) that is a hand held unit to fit onto the DUT 1601 with pressure on both ends. 1609 is a simplified view of the signal generation and processing hardware of FIG. 3. It has a controller 1611 that communicates over the network with the main computer 1620. It may also communicate with additional devices such as tablets 1621 or phones 1622. The controller has additional accessories 1612 (such as non-volatile memory (NVM) for program, etc. and whatever is necessary) that make the controller a complete system. Further, programs such as the operating system and applications are stored, typically in the NVM, and are also not shown for clarity. Also shown is power supply system 1610 that supplies power to all the parts. Power supply system 1610 may contain a battery for independent operation or it may be connected to a power supply 1614. Power supply system 1610 supplies power to all the units that are necessary including controller processor 1611—however in many cases controller 1611 may be a system on a chip or small controller board that contains a standard microprocessor and all the communication input output devices necessary. Connected to these (I/O) are the digital to analog (DAC) converter 1605, a power amplifier 1604 to drive the output coil assembly 1603a, the input amplifier 1606 that received the signal from the pickup coil 1603b, and the input analog to digital converter (ADC) 1607. In some cases in the accessory box 1612 there may be a hardware lookup table that simplifies the lookup and conversion for the signal analysis that allows Fourier-transforms or other algorithms as needed to perform the analysis on harmonics and their phase shifts. The data is then transferred through connection 1613 to computer 1620 which contains (not shown) additional software that processes further and displays the data as needed (and in some cases, sends the data to a larger database for storage and comparison with historic data of other samples, etc.).

Figure 17:
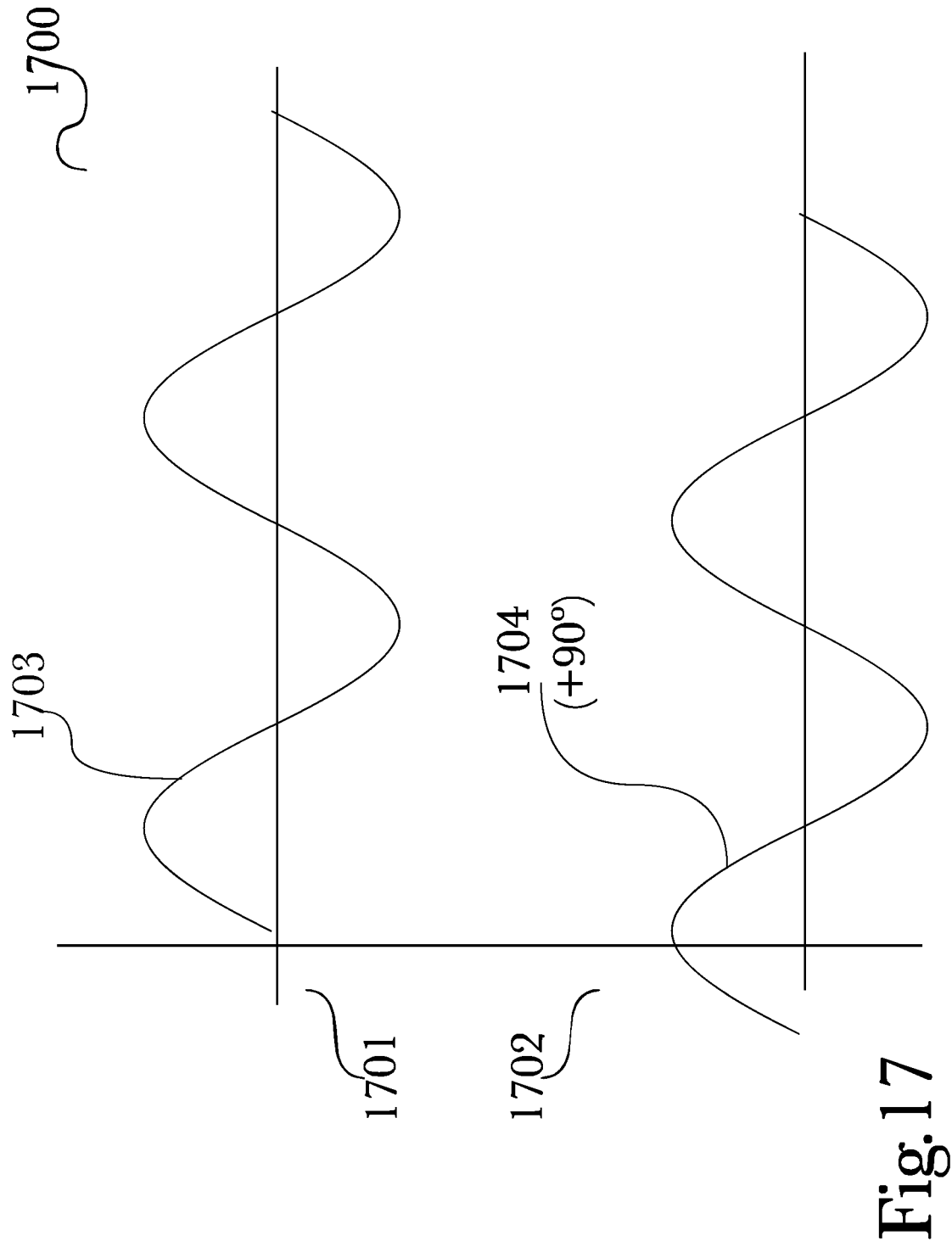
FIG. 17 shows a simplified overview of the phase shift phenomenon that occurs based on the type of problems found in the material.

FIG. 17 shows an example 1700 of an effect that may occur when a signal 1703 is sent in 1701 the received signal 1702 on the other coil may have a phase shift 1704 depending on which harmonic of the signal is looked. The phase shift may change depending on whether the material has some defects or not. More details will be shown in FIGS. 18 and 19, where groups of phase shifts change based on damage to the material. For example with different samples, sample 01, 03, and 05, in FIG. 18 one can see the transition or the spread of the transitions to different harmonics is much smaller in the samples without damage as compared to sample 05 that has damage, both in FIG. 18 and FIG. 19. This spread is linked to the disruption of the crystalline structure that leads to a disruption in the transport of the harmonic waves and therefore results in distortion of the transported harmonic waves.

Figure 10:
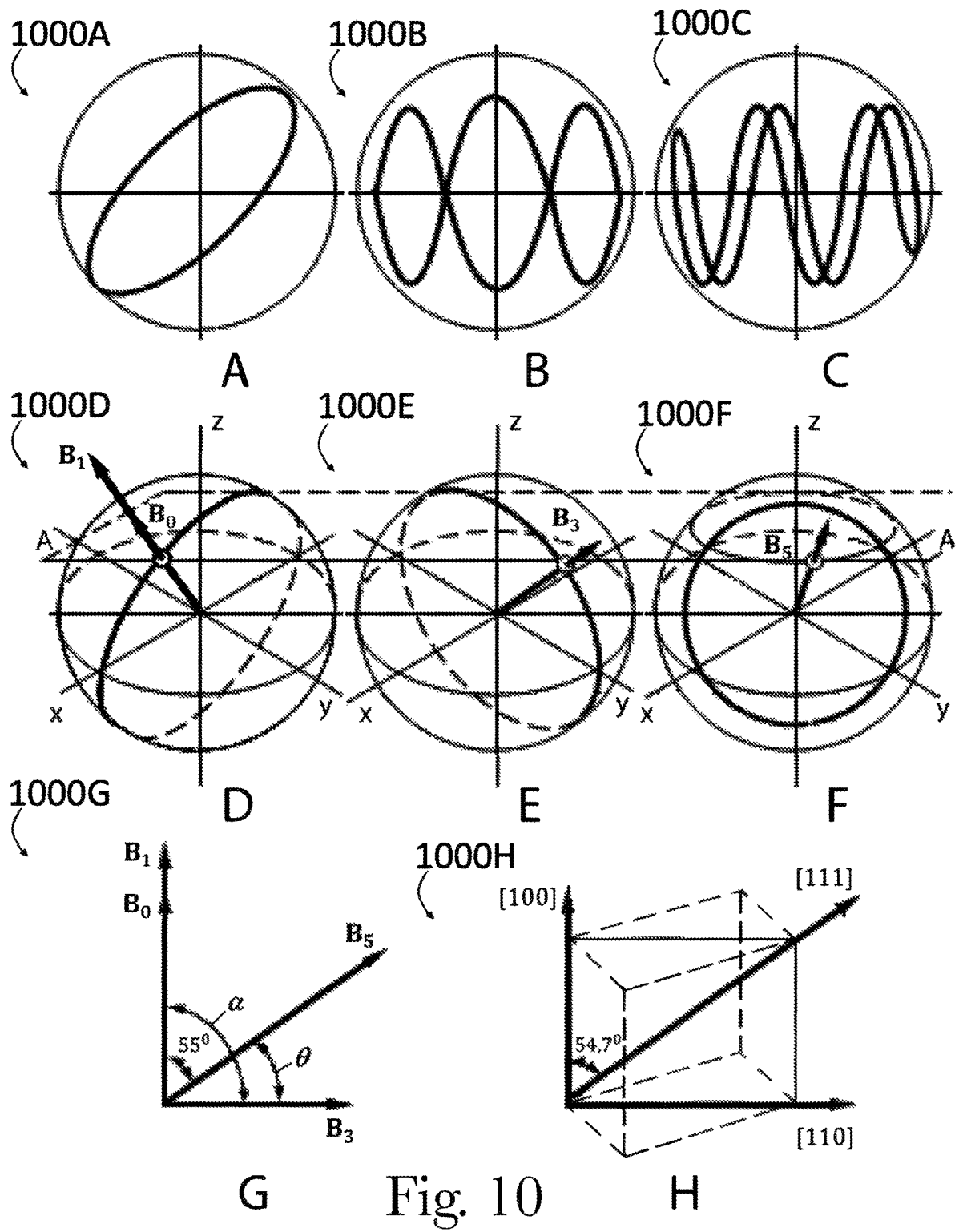
FIG. 10 shows overviews of harmonic phase measurement.
Figure 18:
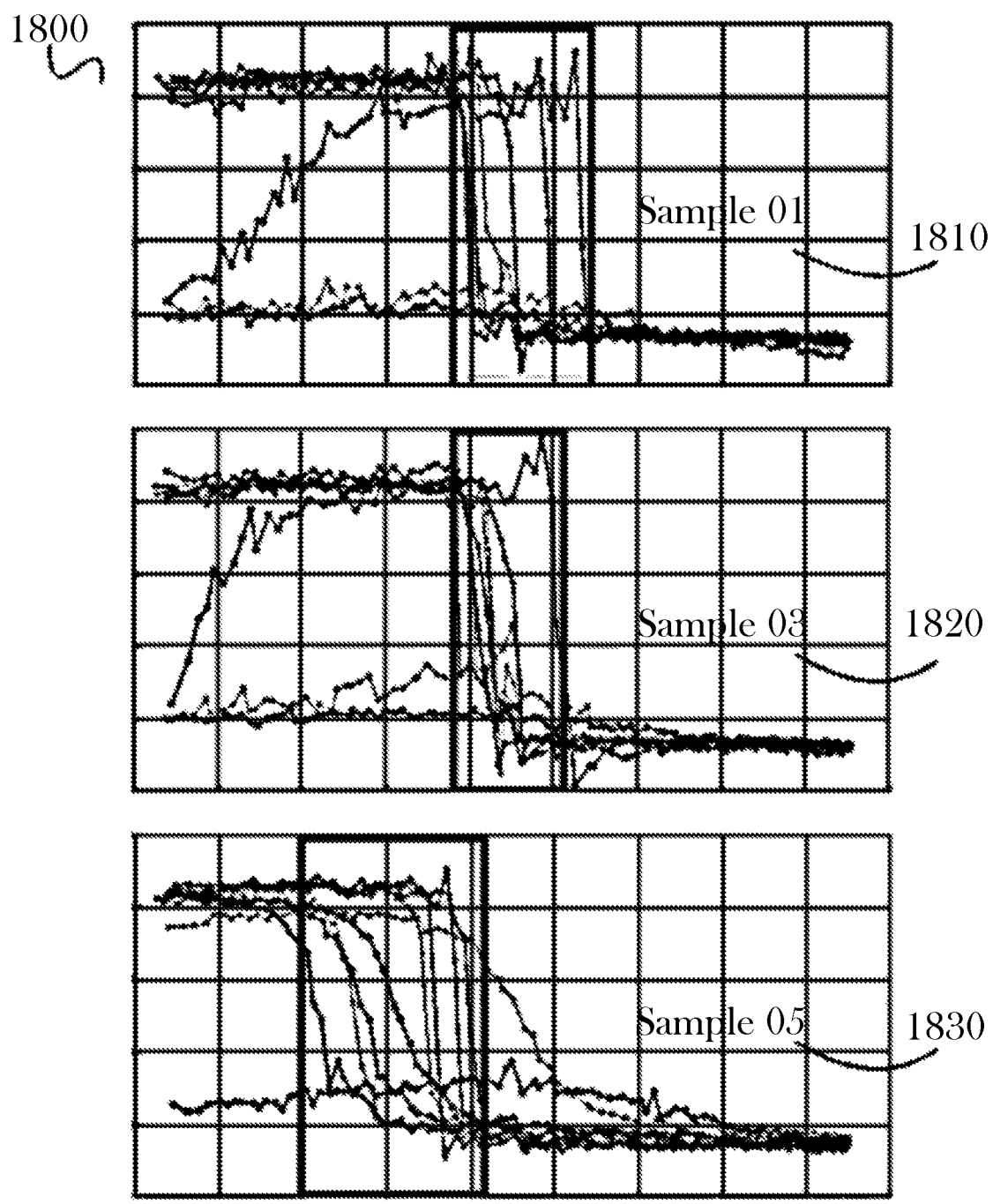
FIG. 18 shows overview of graphs depicting the changes of the response signals of 5-th harmonic initial phase, depending on the position of the Sensor on the Samples 01, 03, 05.

FIG. 18 shows overview 1800 of graphs depicting the changes of the response signals of 5-th harmonic initial phase, depending on the position of the Sensor on the Samples 01 1810, 03 1820, 05 1830. It is observed that the changes in the values of the initial phases of the three Samples 1810, 1820, 1830 occur in the same range, but at different values of the excitation signal amplitude. The unloaded Sample 03 1820 has the narrowest range of excitation signal amplitudes (approximately 5V), with a significant change in the initial phases, Sample 01 1810 (10,000 Stress Cycles) has a slightly wider amplitude range, with the beginning of these ranges being approximately 135V, except for the positions of the Sensor Mark 24, Mark 27, Mark 30, when the thickening of the sample begins to affect (FIG. 10). The range of change of amplitude of sample 05 1830 (25,000 Stress Cycles) is twice 'wider'—approximately 10V, and significant changes of the initial phases values are completed at mark 135V, except Mark 27 and Mark 30.

The phenomena of the difference in the excitation signal amplitude for different samples are explained by the different state of mechanical stress of these samples due to pulsating load, especially for the Sample 05, when in the fatigue zone the effects of a significant change in mechanical stress and boundary effects at the places of break occur simultaneously.

Figure 19:
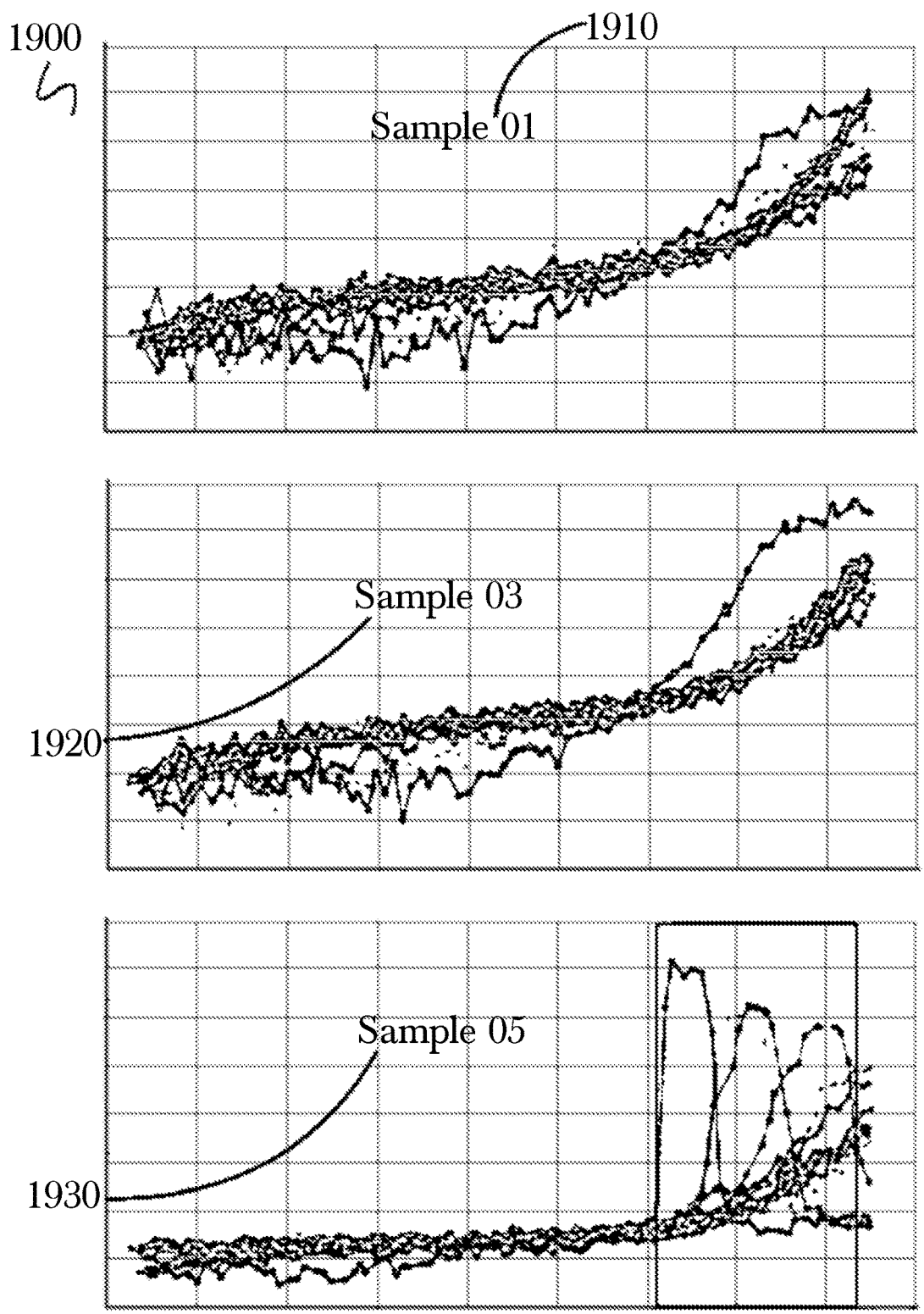
FIG. 19 shows overview of graphs depicting the changes of the response signals of 9-th harmonic initial phase, depending on the position of the Sensor on the Samples 01, 03, 05.

FIG. 19 shows overview 1900 of graphs depicting the changes of the response signals of 9-th harmonic initial phase, depending on the position of the Sensor on the Samples 01, 03, 05. For example with different samples, sample 01 1910, 03 1920, and 05 1930, one can see the transition or the spread of the transitions to different harmonics is much smaller in the samples without damage as compared to the sample 05 that has damage, both in FIG. 18 and FIG. 19. This spread is linked to the disruption of the crystalline structure, which leads to a disruption in the transport of the harmonic waves and therefore results in distortion of the transported harmonic waves. For the harmonic 9 it is incorrect to calculate the phase integral, but there is a parabolic nature of the Sample 05 initial phase change at the Sensor position e on the Mark 15, 18, 21, 24. This is the position where the sensor approaches directly to the destructive fatigue crack. After Mark 24, the effect of the sample thickening effect begins.

Figure 20:
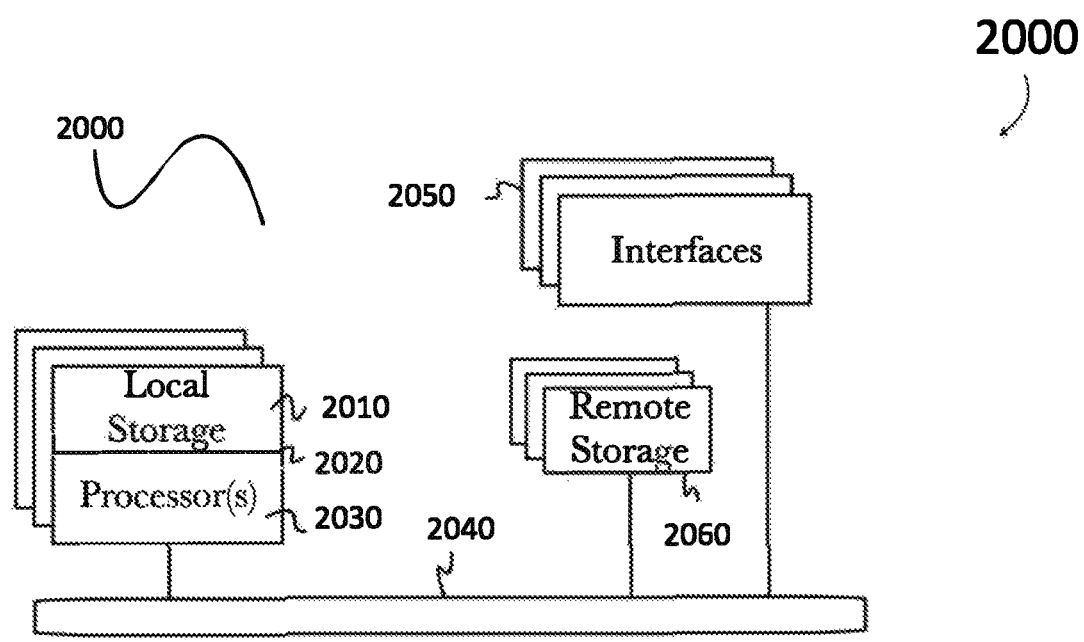
FIG. 20 illustrates a basic computing device for implementing one or more of the aspects used herein.

FIG. 20 shows a block diagram depicting an exemplary basic computing device 100 suitable for implementing at least a portion of the features or functionalities disclosed herein. Computing device 2000 may be, for example, any one of the computing machines listed in the previous paragraph, or indeed any other electronic device capable of executing software- or hardware-based instructions according to one or more programs stored in memory.

Computing device 2000 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 2000 includes one or more central processing units (CPU) 2020, one or more interfaces 2050, and one or more busses 2040 (such as a peripheral component interconnect (PCI) bus). When acting under the control of appropriate software or firmware, CPU 2020 may be responsible for implementing specific functions associated with the functions of a specifically configured computing device or machine. For example, in at least one aspect, a computing device 2000 may be configured or designed to function as a server system utilizing CPU 2020, local memory 2010 and/or remote memory 2060, and interface(s) 2050. In at least one aspect, CPU 2020 may be caused to perform one or more of the different types of functions and/or operations under the control of software modules or components, which for example, may include an operating system and any appropriate applications software, drivers, and the like.

CPU 2020 may include one or more processors 2030 such as, for example, a processor from one of the Intel, ARM, Qualcomm, and AMD families of microprocessors. In some aspects, processors 2030 may include specially designed hardware such as ASICs, electrically erasable programmable read-only memories (EEPROMs), field-programmable gate arrays (FPGAs), and so forth, for controlling operations of computing device 2000. In a particular aspect, a local memory 2010 (such as non-volatile random access memory (RAM) and/or read-only memory (ROM), including for example one or more levels of cached memory) may also form part of CPU 2020. However, there are many different ways in which memory may be coupled to system 2000. Memory 2010 may be used for a variety of purposes such as, for example, caching and/or storing data, programming instructions, and the like. It should be further appreciated that CPU 2020 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 2050 are provided as network interface cards (NICs). Generally, NICs control the sending and receiving of data packets over a computer network; other types of interfaces 2050 may for example support other peripherals used with computing device 2000. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 2050 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 20 illustrates one specific architecture for a computing device 2000 for implementing one or more of the aspects described herein, it is by no means the only device architecture on which at least a portion of the features and techniques described herein may be implemented. For example, architectures having one or any number of processors 2030 may be used, and such processors 2030 may be present in a single device or distributed among any number of devices. In one aspect, a single processor 2030 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 2060 and local memory 2010) configured to store data, program instructions for the general-purpose network operations, or other information relating to the functionality of the aspects described herein (or any combinations of the above). Program instructions may control execution of or comprise an operating system and/or one or more applications, for example. Memory 2060 or memories 2010, 2060 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system.

Figure 21:
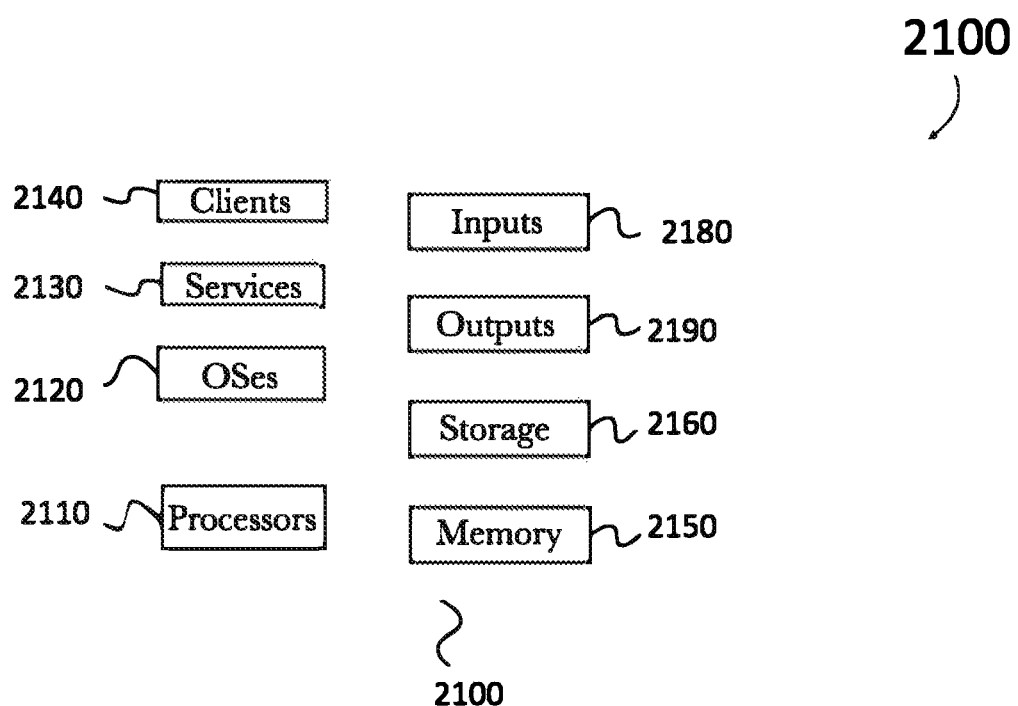
FIG. 21 shows overview of a block diagram depicting a typical exemplary architecture of one or more aspects or components thereof on a standalone computing system.

FIG. 21 shows a block diagram depicting a typical exemplary architecture of one or more aspects or components thereof on a standalone computing system. Computing device 2100 includes processors 2110 that may run software that carry out one or more functions or applications of aspects, such as for example a client application 2140. Processors 2110 may carry out computing instructions under control of an operating system 2120 such as, for example, a version of MICROSOFT WINDOWS™ operating system, APPLE macOS™ or iOS™ operating systems, some variety of the Linux operating system, ANDROID™ operating system, or the like. In many cases, one or more shared services 2130 may be operable in system 2100, and may be useful for providing common services to client applications 2140. Services 2130 may for example be WINDOWS™ services, user-space common services in a Linux environment, or any other type of common service architecture used with operating system 2110. Input devices 2180 may be of any type suitable for receiving user input, including for example a keyboard, touchscreen, microphone (for example, for voice input), mouse, touchpad, trackball, or any combination thereof. Output devices 2190 may be of any type suitable for providing output to one or more users, whether remote or local to system 2100, and may include for example one or more screens for visual output, speakers, printers, or any combination thereof. Memory 2150 may be random-access memory having any structure and architecture known in the art, for use by processors 2110, for example to run software. Storage devices 2160 may be any magnetic, optical, mechanical, memristor, or electrical storage device for storage of data in digital form. Examples of storage devices 2160 include flash memory, magnetic hard drive, CD-ROM, and/or the like.

In some aspects, systems may be implemented on a distributed computing network, such as one having any number of clients and/or servers.

Figure 22:
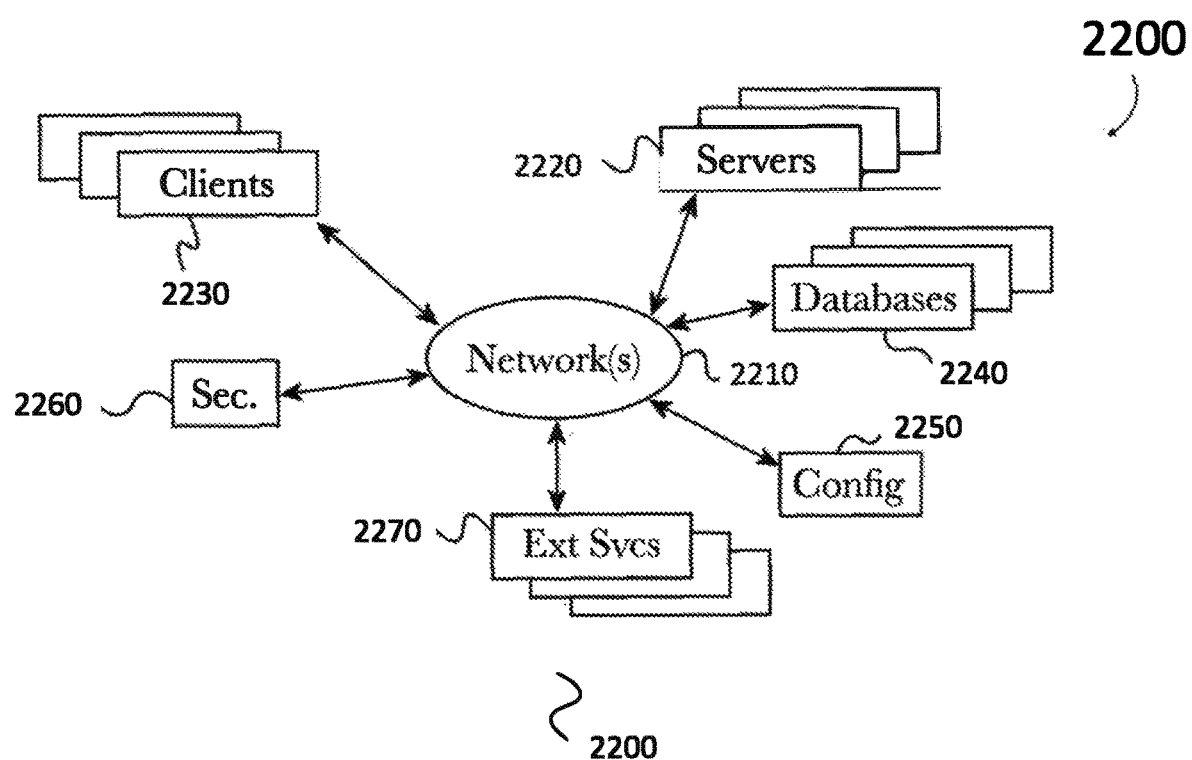
FIG. 22 shows overview of a block diagram depicting an exemplary architecture for at least a portion of a system according to one aspect on a distributed computing system or network.

FIG. 22 shows a block diagram depicting an exemplary architecture 2200 for implementing at least a portion of a system according to one aspect on a distributed computing system or network. According to the aspect, any number of clients 2230 may be provided. Each client 2230 may run software for implementing client-side portions of a system; clients may comprise a system 2000 such as that illustrated in FIG. 20. In addition, any number of servers 2220 may be provided for handling requests received from one or more clients 2230. Clients 2230 and servers 2220 may communicate with one another via one or more electronic networks 2210, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 2210 may be implemented using any known network protocols, including for example wired and/or wireless protocols.

In addition, in some aspects, servers 2220 may call external services 2270 when needed to obtain additional information, or to refer to additional data concerning a particular call. Communications with external services 2270 may take place, for example, via one or more networks 2210. In various aspects, external services 2270 may comprise web-enabled services or functionality related to or installed on the hardware device itself. For example, in one aspect where client applications 2240 are implemented on a smartphone or other electronic device, client applications 2240 may obtain information stored in a server system 2220 in the cloud or on an external service 2270 deployed on one or more of a particular enterprise's or user's premises.

In some aspects, clients 2230 or servers 2220 (or both) may make use of one or more specialized services or appliances that may be deployed locally or remotely across one or more networks 2210. For example, one or more databases 2240 may be used or referred to by one or more aspects. It should be understood by one having ordinary skill in the art that databases and or blockchains 2240 may be arranged in a wide variety of architectures and using a wide variety of data access and manipulation means. For example, in various aspects one or more databases 2240 may comprise a relational database system using a structured query language (SQL), while others may comprise an alternative data storage technology such as those referred to in the art as "NoSQL", permissioned, non-permissioned etc. (for example, HADOOP CASSANDRA™, GOOGLE BIGTABLE™, and so forth, ETH compatible, BTC, EOS asf). In some aspects, variant database architectures such as column-oriented databases, in-memory databases, clustered databases, distributed databases, or even flat file data repositories may be used according to the aspect. Further, Blockchains, may be used as an inherently secure form of database in lieu or in addition to all these databases mentioned throughout. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" or "Blockchain" as used herein may refer to a physical database machine, a cluster of machines acting as a single database system, or a logical database within an overall database management system, as well distributed, managed and unmanaged Blockchains. Unless a specific meaning is specified for a given use of the term "database", it should be construed to mean any of these senses of the word, all of which are understood as a plain meaning of the term "database" by those having ordinary skill in the art. Unless a specific meaning is specified for a given use of the term "blockchain", it should be construed to mean any of these senses of the word, all of which are understood as a plain meaning of the term "blockchain" by those having ordinary skill in the art.

Similarly, some aspects may make use of one or more security systems 2260 and configuration systems 2250. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 2260 or configuration system 2250 or approach is specifically required by the description of any specific aspect.

Figure 23:
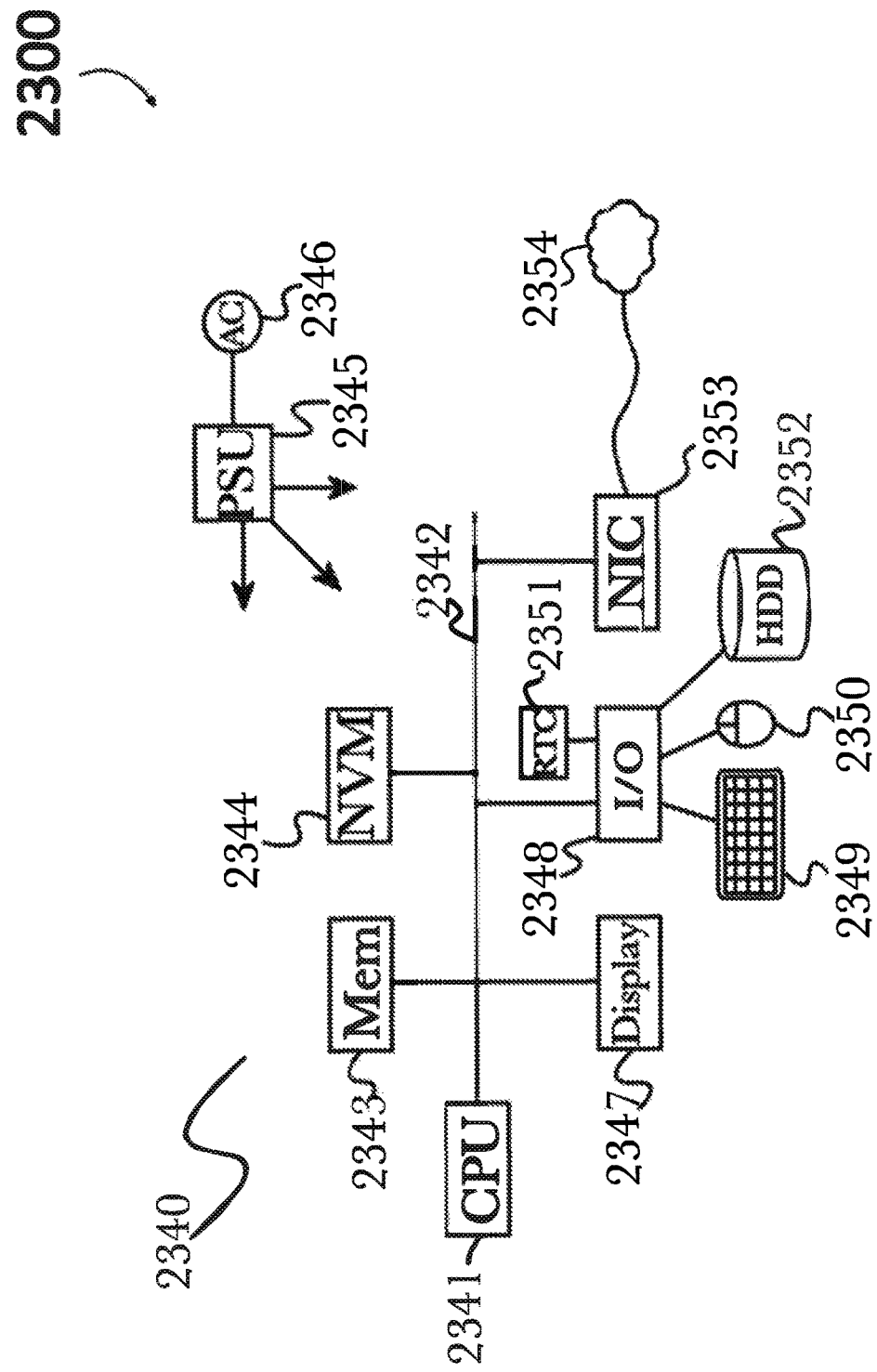
FIG. 23 shows an exemplary overview of a computer system as used throughout herein.

FIG. 23 is another block diagram illustrating an exemplary hardware architecture of a computing device. Overview 2300 shows an exemplary overview of a computer system 2340 as may be used in any of the various locations throughout the system. It is exemplary of any computer that may execute code to process data. Various modifications and changes may be made to computer system 2340 without departing from the broader scope of the system and method disclosed herein. Central processor unit (CPU) 2341 is connected to bus 2342, to which bus is also connected memory 2343, nonvolatile memory 2344, display 2347, input/output (I/O) unit 2348, and network interface card (NIC) 2353. I/O unit 2348 may, typically, be connected to keyboard 2349, pointing device 2350, hard disk 2352, and real-time clock 2351. NIC 2353 connects to network 2354, which may be the Internet or a local network, which local network may or may not have connections to the Internet. Also shown as part of system 2340 is power supply unit 2345 connected, in this example, to a main alternating current (AC) supply 2346. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

What is claimed is:

1. A method for determining the effects of materials and their structure using electromagnetic fields and harmonic waves, comprising the steps of:
    exciting, using an electromagnetic transducer, the quantum system of a material sample to be analyzed;
    measuring a first electromagnetic field, wherein the first electromagnetic field is produced by the excited quantum system;
    measuring a second electromagnetic field, wherein the second electromagnetic field is produced by the electromagnetic transducer during excitation;
    comparing the measurements of each of the first and second electromagnetic fields;
    isolating, based on the comparison, a plurality of photons from the electromagnetic waves;
    analyzing the properties of each of the isolated photons; and
    determining, based on the analyzed photon properties, the structure of the quantum system being excited.

2. The method of claim 1, wherein the measurement of the electromagnetic field comprises determination of a true value of the electromagnetic field's physical magnitude.

3. The method of claim 2, wherein the properties of each of the isolated photons comprises at least one of: wavelike structure within a calibration length during a calibration interval of time, frequency, polarization, spectral lines, or number of photons per spectral line.

4. The method of claim 3, wherein the structure of the quantum system is determined to be one of atom, atomic nucleus, molecule, or crystal.

\* \* \* \* \*